United States Patent [19]
Solberg et al.

[11] Patent Number: 6,134,338
[45] Date of Patent: Oct. 17, 2000

[54] COMPUTER AUTOMATED SYSTEM AND METHOD FOR CONVERTING SOURCE DOCUMENTS BEARING SYMBOLS AND ALPHANUMERIC TEXT RELATING TO THREE DIMENSIONAL OBJECTS

[75] Inventors: Stephen J. Solberg, La Crosse; Curt D. Szymanski, Mukwonago, both of Wis.

[73] Assignee: Solberg Creations, Inc., La Crescent, Minn.

[21] Appl. No.: 09/087,706

[22] Filed: Jun. 1, 1998

Related U.S. Application Data

[63] Continuation-in-part of application No. 08/445,687, May 22, 1995, Pat. No. 5,761,328.

[51] Int. Cl.$^7$ .................................................... G06K 9/00
[52] U.S. Cl. ........................................... 382/113; 707/502
[58] Field of Search .................................. 382/100, 113, 382/197, 198, 200, 286, 154; 707/502; 345/419, 440, 442, 443

[56] References Cited

U.S. PATENT DOCUMENTS

| | | |
|---|---|---|
| 4,193,087 | 3/1980 | Altman . |
| 4,489,389 | 12/1984 | Beckwith et al. . |
| 4,661,811 | 4/1987 | Gray et al. . |
| 4,737,916 | 4/1988 | Ogawa et al. . |
| 4,829,295 | 5/1989 | Hiroyuki . |
| 4,843,569 | 6/1989 | Sawada . |
| 4,845,643 | 7/1989 | Clapp ...................................... 364/518 |
| 4,852,020 | 7/1989 | Morita . |
| 4,881,067 | 11/1989 | Watanabe et al. . |
| 4,939,670 | 7/1990 | Frieman et al. . |
| 4,949,388 | 8/1990 | Bhaskaran ............................... 382/100 |
| 4,953,106 | 8/1990 | Ganser et al. . |

(List continued on next page.)

FOREIGN PATENT DOCUMENTS

WO 96/37861  11/1996  WIPO .

OTHER PUBLICATIONS

Stevenson, Paula J., M.S., "Scanning for Automated Data Conversion of Cartographic Documents", (Apr. 1994), pp. 1–95.

(List continued on next page.)

*Primary Examiner*—Phuoc Tran
*Attorney, Agent, or Firm*—Craig A. Fieschko, Esq.; DeWitt Ross & Stevens S.C.

[57] ABSTRACT

The computer automated system and method of converting a digitized raster image of a scanned source document, bearing alphanumeric text relating to a plurality of physical dimensions and to a plurality of edges of a three dimensional object and of a moiety a symbol represents and of an insertion point of the moiety into the three dimensional object, at least one orthographic drawing view having a plurality of lines oriented in a direction to each other and corresponding to the edges of the three dimensional object, and the symbol, into mathematically accurate three dimensional vectors corresponding to the physical dimensions and the edges of the object and moiety and into a mathematically accurate computer drawing file. The digitized raster image is organized into an orthographic viewpoint file corresponding to the view. The file is imported into a corresponding orthographic viewport in a CAD drawing file having three dimensional vector generating capability in an existing CAD system having a COGO subroutine and using an OCR and an OSR operating within the CAD system. The alphanumeric text relating to the symbol is recognized by the OCR and an attributed symbol vector file is created using CAD block attribution techniques. The alphanumeric text relating to the plurality of physical dimensions and to the plurality of edges of the three dimensional object and the insertion point is recognized by the OCR; the symbol is recognized by the OSR. The recognized alphanumeric text and recognized symbol and the attributed symbol vector file are converted by the COGO subroutine into mathematically accurate vectors which can be used for producing accurate drawings and for Computer Assisted Manufacturing. Mechanical, engineering and architectural drawing (plans) are converted by the present invention.

26 Claims, 19 Drawing Sheets

U.S. PATENT DOCUMENTS

| | | |
|---|---|---|
| 4,964,066 | 10/1990 | Yamane et al. . |
| 5,001,677 | 3/1991 | Masters . |
| 5,050,222 | 9/1991 | Lee . |
| 5,073,819 | 12/1991 | Gates et al. . |
| 5,111,514 | 5/1992 | Ohta . |
| 5,123,087 | 6/1992 | Newell et al. . |
| 5,164,996 | 11/1992 | Pastor . |
| 5,179,645 | 1/1993 | Tanimori . |
| 5,197,120 | 3/1993 | Saxton et al. ............ 395/139 |
| 5,204,944 | 4/1993 | Wolberg et al. . |
| 5,233,357 | 8/1993 | Ingensand et al. . |
| 5,258,855 | 11/1993 | Lech et al. ............ 358/462 |
| 5,268,998 | 12/1993 | Simpson . |
| 5,276,784 | 1/1994 | Ohki . |
| 5,353,393 | 10/1994 | Bennett et al. . |
| 5,357,602 | 10/1994 | Ohta . |
| 5,369,508 | 11/1994 | Lech . |
| 5,386,508 | 1/1995 | Itonori et al. . |
| 5,517,578 | 5/1996 | Altman . |
| 5,568,566 | 10/1996 | Hori . |
| 5,761,328 | 6/1998 | Solberg et al. . |

OTHER PUBLICATIONS

Dixon, James, Deed Plotter +™, Series III, "Your Program is so easy to use.", 8 pages.

With The AUDRE™ Conversion System, AUDRE, Inc., San Diego, California, 1 page.

Information + Graphics Systems Inc., "Tracer™ +Recognizer™ for AutoCAD® Drawing Conversion & Recognition Software", (1993), 3 pages.

Silk Scientific, "UN–SCAN–IT™" (Postcard).

Autodesk, Inc., "AUTOCAD", (1993), pp. 47–50.

Omura, G., "Mastering AutoCAD® 13 for DOS®", SYBEX, California, (1995), pp. 455–480.

ANSI Y14.5 M–1982, (1983) pp. 29–34, 129–133 "American National Standard Dimensioning and Tolerancing"; ANSI Y14.5 M–1982, N.Y, N.Y.

ANSI Y14.6–1978 (1978) pp. 7–13 "American National Standard, Screw Thread Representation", ANSI Y14.6–1978, N.Y., N.Y.

ISO 724–1978 (E) pp. 72–73, ISO 263–1973(E) pp. 146–150, ISO 725–1978(E) pp. 151–153, International Organization for Standardization, (1984) Switzerland, ISO Standards Handbook 18, Fasteners and Screw Threads.

Earle, J.H., "Graphic for Engineers" Addison Wesley Publishing Co., (1996), Reading MA, pp. Appendices A–6, A–7, A–8, A–14.

French et al. "Mechanical Drawing CAD–Communications", 12th Ed. pp. 308–309, 723, Glencoe–McGraw–Hill Company, NY, NY (1997)

French, T.E. and Vieck, C.J., "Engineering Drawing and Graphic Technology", 12th Ed. McGraw Hill Book Company, New York, NY (1978) pp. 253–256, Appendix C, pp. A48–A49, A55.

Giachino, J.W., et al. "Engineering Technical Drafting" 4th Ed. American Technical Society Publication, Chicago, IL (1978) pp. 702, 704, 705.

Giesecke et al., "Engineering Graphics" MacMillan Publishing Co., Inc., 3rd Ed. New York, NY (1985) pp. 357–359, 370–373, 834–836, 843.

Schumaker, T.E., et al., "AutoCad and its Application", The Goodheart–Wilcox Company, Inc., Tiinley Park, IL (1993) pp. G–1, 18–60, 18–61, 18–32, 18–33, 18–31, 18–37, 24–21, 24–23, 24–26, 24–32, 24–33, Figs. 24–28 and 24–29.

"Inside AutoCAD 13c4" for Windows® 95, Windows NT™, Windows 3.1, New Riders Publishing, Indianapolis, IN (1996) Cover page, Chapter 7, pp. 268, 270, 271, 277, 279, 288, 290, 293 and 295.

Graphikon GmbH Symbol Recognition for VECTORY, Product Overview, Product range/Prices, Graphikon (1997) 6 pages http://www.graphikon.com/vectory/.

Interactive Image Technology Demo: Map Symbol Recognition http://www.crim.ca/sbc/english/itt/demo/MapSymbol, 8 pages.

I/SCR MS—Intergraph Symbol/Character Recognition, 2 pages, Intergraph Corporation, Huntsville, AL (1995) http://www.intergraph.com/iss/products/mapping/scanning/.

"Image Tracer™ Professional, Image Edit, Image Map, Image Tracer", 8 pages Hitachi Software Boulder, CO.

Hitachi Software Announces New Line of Imaging Products for AutoCAD® R14, 2 pages Hitachi Software Boulder, CO (1997) http://www.hitachisoft–co.com/Press/PressR14Product.htm.

Image Series for AutoCad® Commonly Asked Questions, 5 pages, Hitachi Software Boulder, CO http://ww.hitachisoft-co.com/AutoCAD/ACADCOMMON.htm.

"A Classification of Kanji Characters for Use in Multifont Printing" UMEDA, PRU–78–13 (1987) 8 pages (English abstract only).

Deed Plotter+™ Series III Users Manual (1993), Greenbriar Graphics Inc..

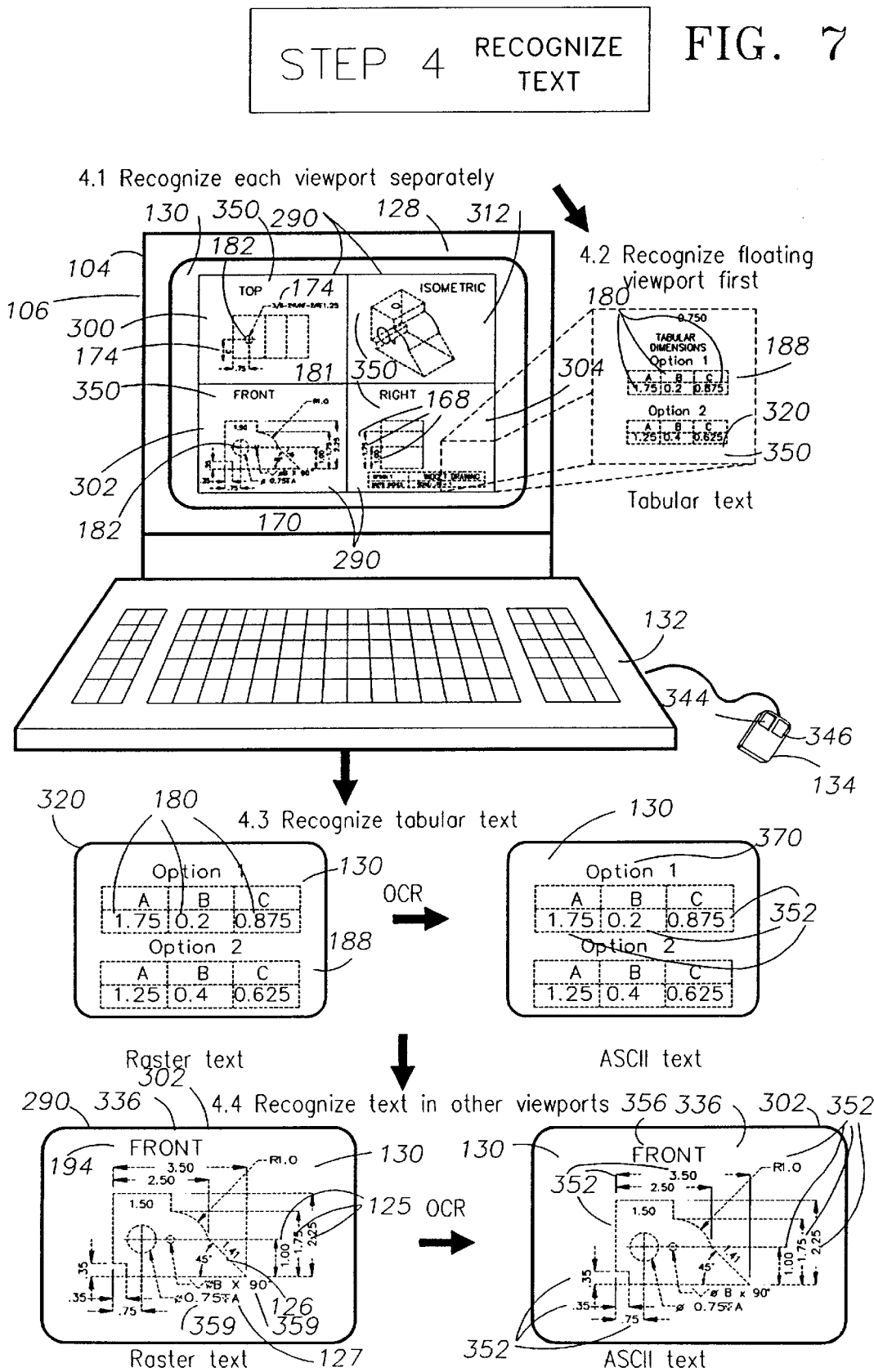

FIG. 8

STEP 5 RECOGNIZE SYMBOLS 5.1 Call up symbol library

Default symbol library contains simple, content & attributed symbols 1 1/2-6NC-3 LH
3/8-24UNF-2A   1.25
⌵ ØB X 90°
Ø 0.75 ▽ A
1/4-20 UNC-2A TRIPLE
9/16-18 UNF-2B
1 3/4 UN-2A 1 1/2-6NC-3 LH =

Ø 0.75 ▽ A =

Preset drawings of specified dimensions are linked to each attributed symbol 5.2 Add to or modify symbol library 5.3 Create attributed symbols

SYMBOL?  OBJECT?
Ø 0.75 ▽ A  =
A = ?

TABULAR DIMENSIONS
Option A
| A | B | C |
|---|---|---|
| 1.75 | 0.2 | 0.875 |

Option B
| A | B | C |
|---|---|---|
| 1.25 | 0.4 | 0.625 |

TOP    ISOMETRIC
FRONT  RIGHT 5.4 Choose viewport to be recognized 5.5 Recognize attributed symbols with OSR FRONT (Raster symbols & text) → OSR → FRONT (Vector symbols) → OCR → FRONT (ASCII text)

5.6 Recognize text simultaneously if desired

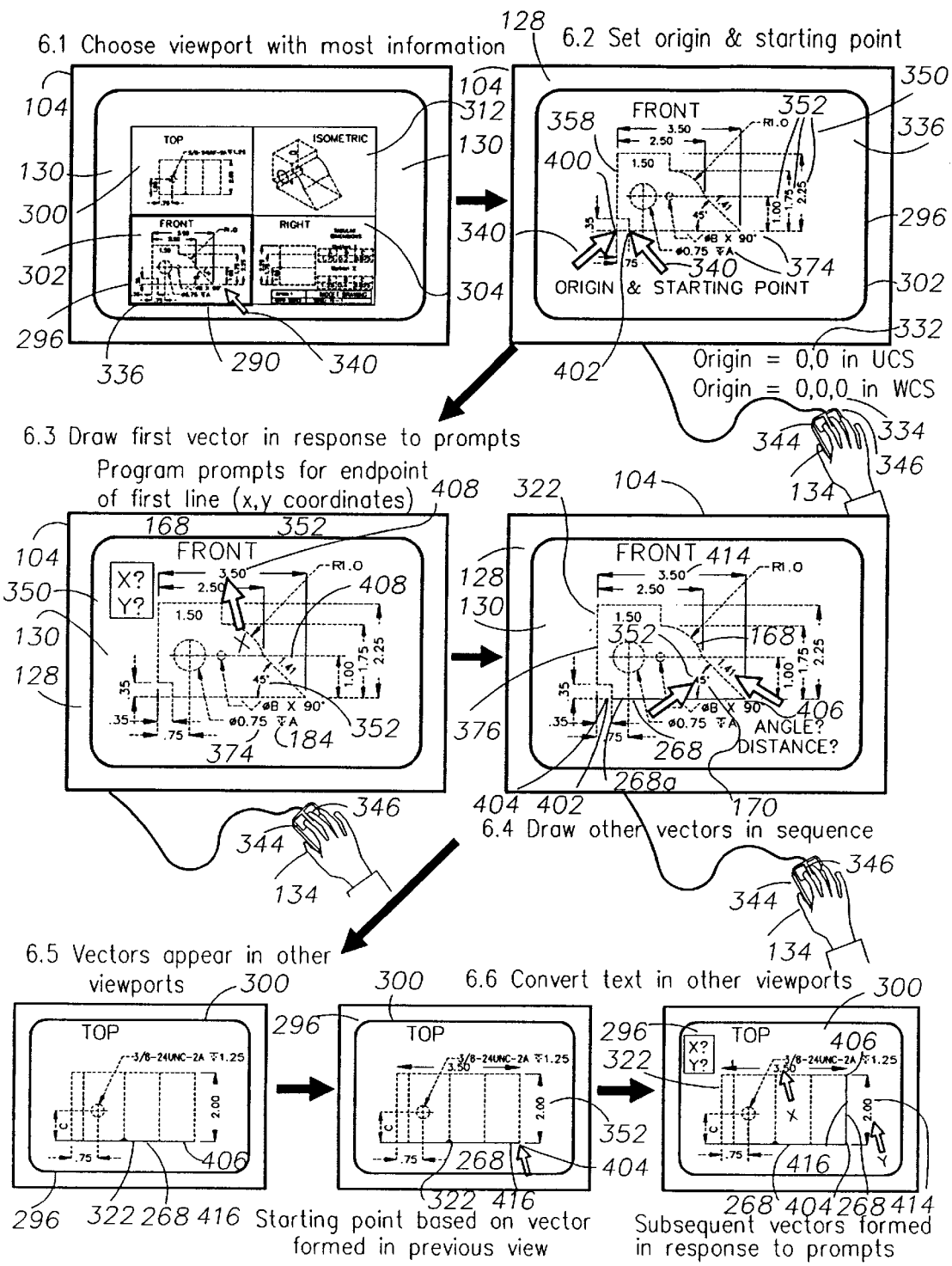

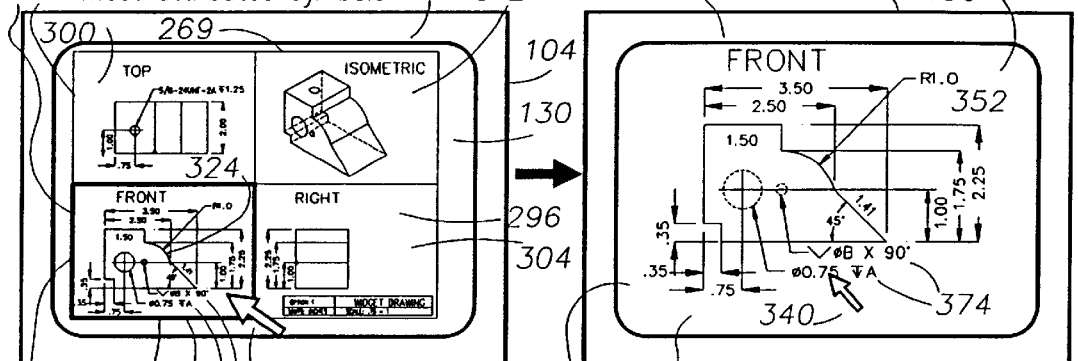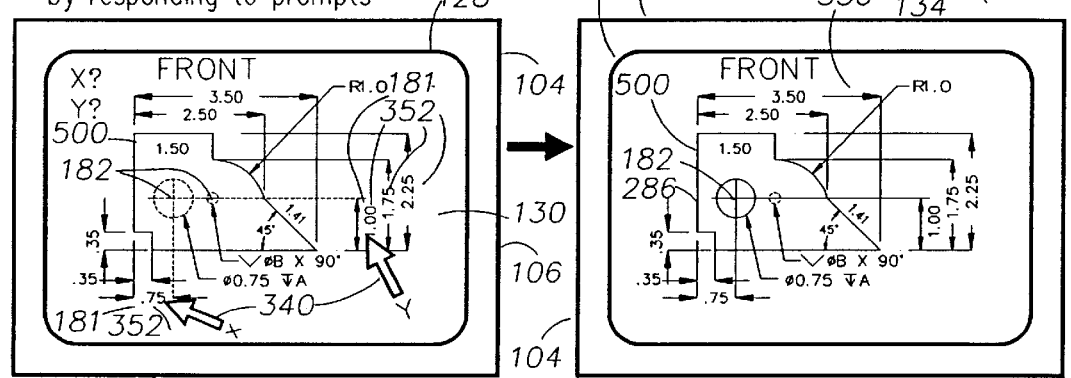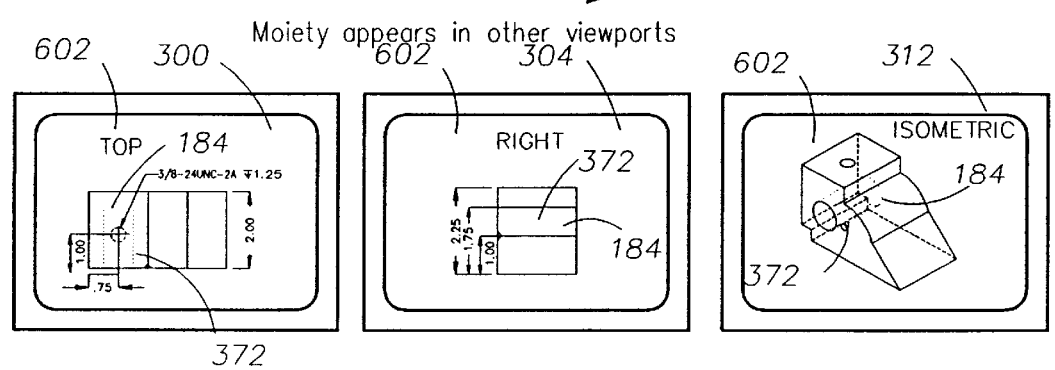

FIG. 12
STEP 2 SET UP DRAWING
2.1 Start new drawing file
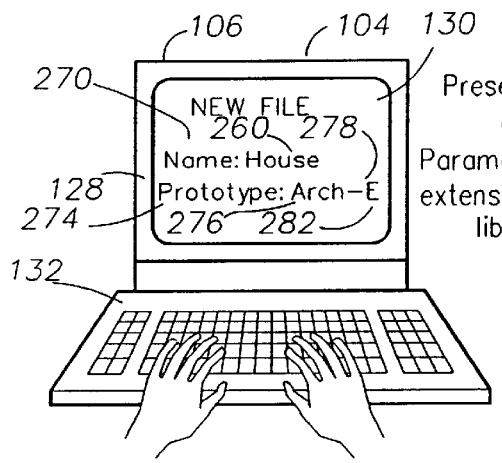
Preset parameters
Parameters include extensive symbol library
2.2 Customize parameters (if necessary)
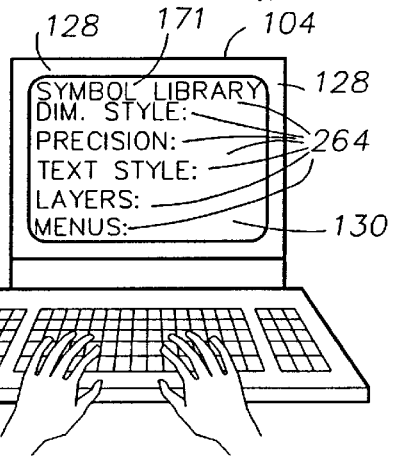
2.3 Customize viewports
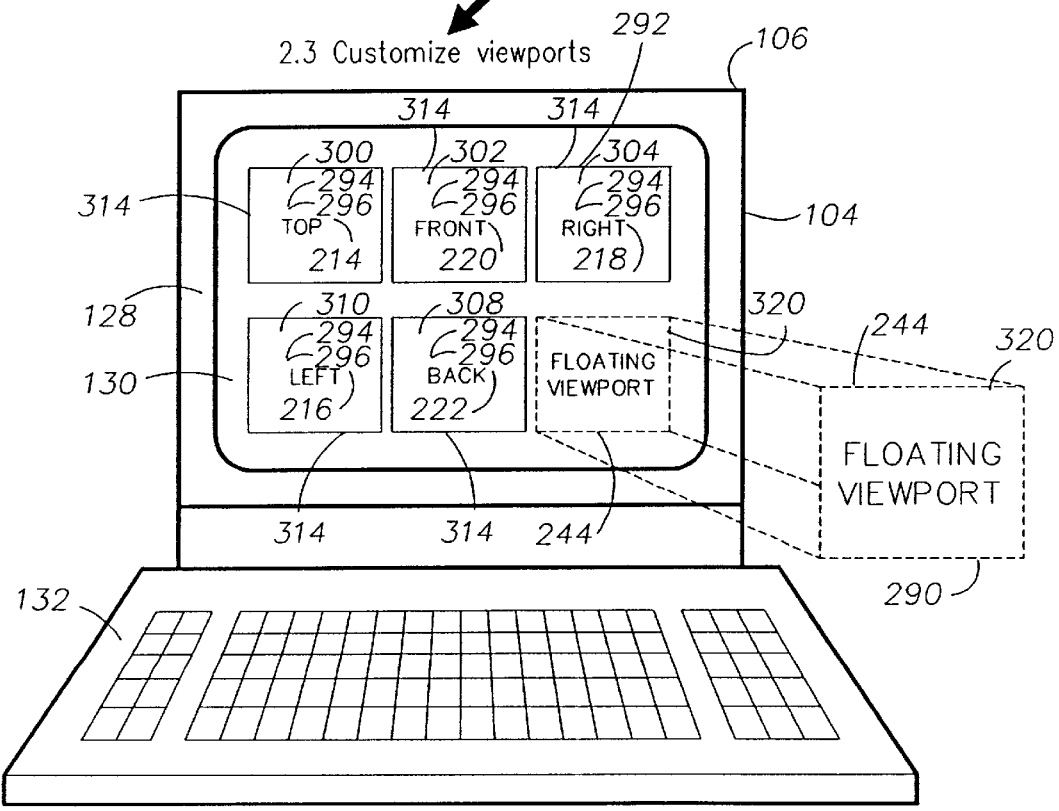

FIG. 17
STEP 7 CONVERT SYMBOLS
7.1 Choose viewport with most attributed symbols
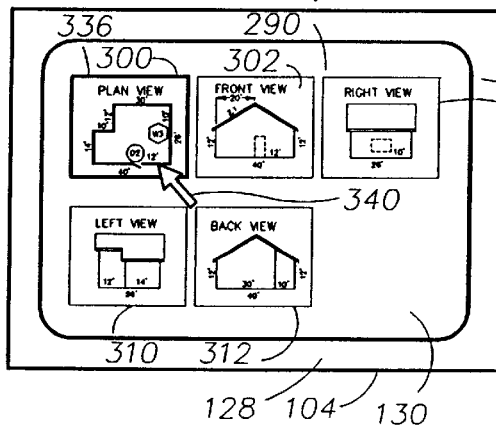
7.2 Pick attributed symbol to be converted
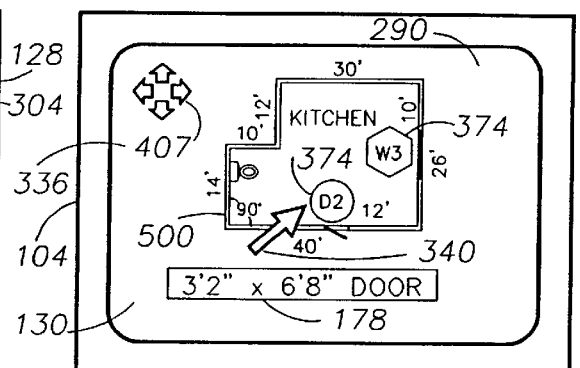
7.3 Locate symbol based moiety by responding to prompts
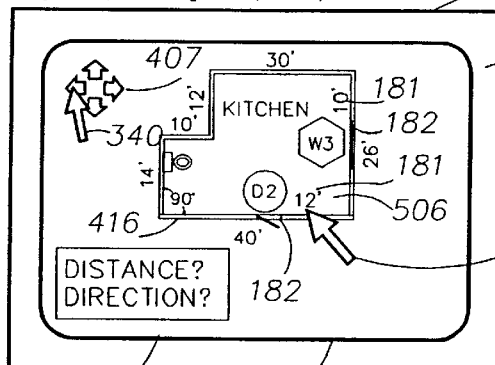
7.4 Insert moiety into drawing file
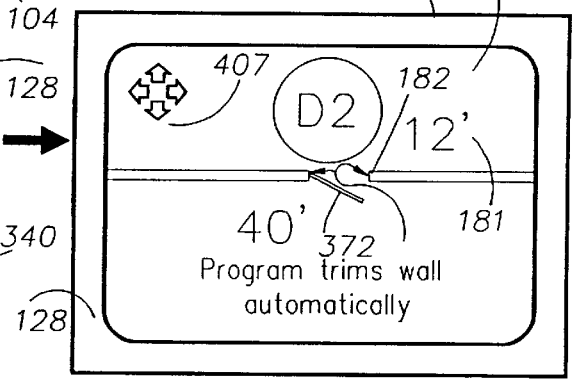
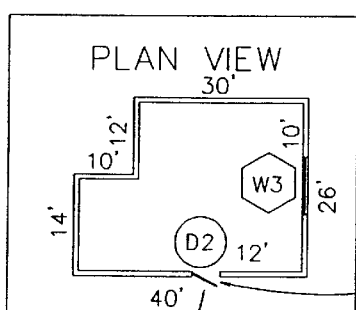
Object appears in other viewport
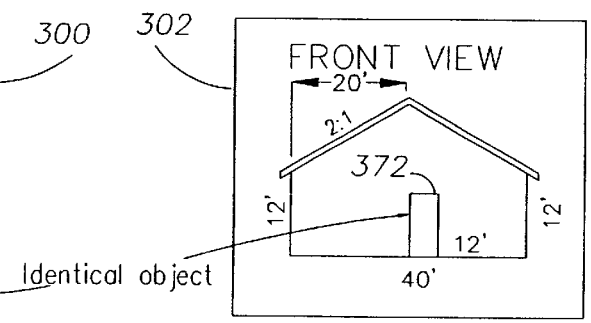
Identical object

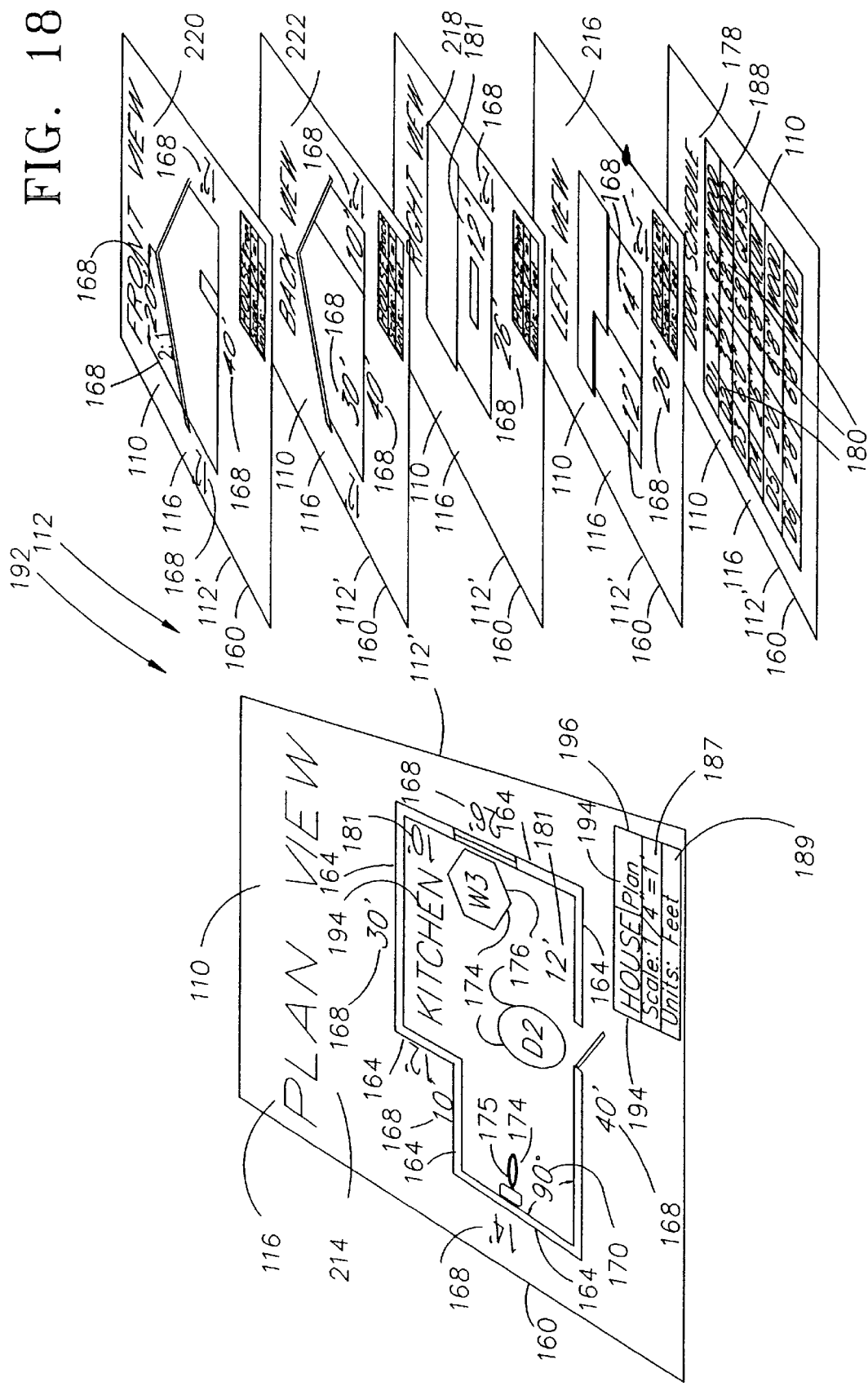

COMPUTER AUTOMATED SYSTEM AND METHOD FOR CONVERTING SOURCE DOCUMENTS BEARING SYMBOLS AND ALPHANUMERIC TEXT RELATING TO THREE DIMENSIONAL OBJECTS

CROSS-REFERENCE TO RELATED APPLICATIONS

This application is a continuation-in-part of U.S. application Ser. No. 08/445,687 filed May 22, 1995, now U.S. Pat. No. 5.761,328.

STATEMENT REGARDING FEDERALLY SPONSORED RESEARCH OR DEVELOPMENT

Not Applicable

BACKGROUND OF THE INVENTION

This invention relates generally to a computer automated system and method for converting a hard copy source document bearing alphanumeric text and symbols relating to the physical dimensions and edges of a three dimensional object and of symbol properties of the symbol used in association with the three dimensional object into a drawing file consisting of three dimensional coordinates and vectors and corresponding to the physical dimensions and edges of the object and to the symbol properties of the symbol, and in particular, to a computer automated system and method for converting engineering drawings and architectural plans. The invention is particularly well-suited for utilizing and converting a raster image of a scanned source document bearing a drawing view, symbols and alphanumeric text relating to heights, widths, depths (lengths), and angles of edges of the three dimensional object and of the symbols into mathematically accurate vector computer drawing files based on the symbols and alphanumeric text scanned from the source document. The invention is also well suited for utilizing a raster image produced by scanning an engineering drawing document having a having at least one view thereon showing the edges of a three dimensional object and having alphanumeric text relating to the lengths and directions of lines and curves corresponding to the edges of the object, where the invention constructs a mathematically accurate drawing of the view from the raster file. The present invention is also well-suited for scanning a hard copy architectural plan bearing symbols and alphanumeric text relating to the size, shape, location and elevation of various structural components, such as, but not limited to, walls, windows, and doors and converting the symbols and alphanumeric text into a mathematically accurate computer drawing of the architectural plan.

With the development of various interactive Computer Aided Drafting (also often referred to as Computer Aided Design) (hereinafter, CAD) software, architects, engineers, their draftspersons, and/or technicians (collectively, hereinafter "users") are able to produce architectural plans and engineering drawings using computer drawing files more easily, quickly and accurately than using traditional hand drafting techniques. Besides the ease, speed and accuracy of producing these plans and drawings, the resultant computer drawing files are easier to edit and alter to create new drawings and plans. They are easier to store; they are easier to share with other technicians; and the drawing files can be exported to other computer applications. In the case of architectural plans/drawings, for example, the finished drawings can be rendered in different views, materials lists can be generated, loads can be calculated and structural members can be tested for integrity. In the case of engineering drawings, for example, structural calculations can be made testing the integrity of design elements and the drawing can be exported to a Computer Aided Manufacturing (CAM) environment. In the CAM environment, exact instructions from the computer program related to the dimensions of an object can be fed to an external manufacturing machinery which in turn produces the object ported in the drawing file. The overall advantages of being able to rapidly test and alter designs is well known in the art.

Revising the CAD drawings is easier and more accurate than revising hand drafted drawings. In CAD, the lines on the drawings are represented as vectors. CAD vectors can be manipulated electronically. With the click of a mouse button, lines can be copied, erased, bisected, offset or rotated. The same operations in a hand drawing environment would involve the use of several tools such as erasers, pencils, protractors, scaling rulers and straight edges. But, what makes CAD qualitatively different from hand drawing, is that the vectors representing the lines in the drawing are actually mathematical expressions and not mere representations of the dimensions of the lines. Therefore, any CAD operation performed on an accurately constructed vector would produce mathematically meaningful results. Complex geometric functions can be performed by manipulating vector entities.

Unfortunately, CAD use is relatively new, having become a significant drafting modality in the past 15 years. Even today, only about 50% of the architectural plans and engineering drawings are being produced in this manner. It is estimated that about 80% of drawings and plans exist in the form of hard copy paper documents.

One of the major tasks facing industry, business and government is organization and storage of architectural and engineering information for further utilization. Currently, much of the information is stored in the form of hand drawn hard copy source documents, e.g., mechanical drawings, such as, engineering drawings and architectural plans/drawings, having various formats and scales. These documents, which are commonly drawn on paper, typically contain a scaled hand drawing of various views and components of the three dimensional (3D) object. As used hereinthroughout, the term "3D" means three dimensional; and the term "2D" means two dimensional. The 3D object may be, but is not limited to, an article of manufacture as drawn in an engineering drawing, or to a structure as drawn in an architectural drawing. As is known in the art, each view (e.g., graphical representation/drawing) reveals information about the shape of the 3D object, showing a plurality of edges of the 3D object and any penetrations within the 3D object. Since each drawing view is 2D, the edges and the penetrations are typically depicted by lines and/or curves. Along with the lines and curves recorded on the view, is alphanumeric text relating to the actual physical dimension and edge of the 3D object, any penetration within the 3D object, and symbol property information regarding any symbol on the drawing. The alphanumeric text which is recorded on the document is frequently written, typed or printed on the document. The alphanumeric text provides information relating to the heights, widths, depths (lengths), radius of curvature (if the line is curved), as well as, directions and locations of these lines and curves. Sometimes, the direction of the line is implicit from the drawing view, as when a pair of adjacent lines are orthogonal to or collinear with each other (e.g. at 90°, 180° or 270° to each other).

Symbols may also be present on the view. The symbols include, but are not limited to, symbols for placement of moieties within the 3D object e.g., windows, doors, toilets, electrical outlets, or other features, or symbols for the sizes and shapes of apertures which may fully or partially penetrate the 3D object, or symbols which are indicia of certain shapes of cuts or surface features of the 3D object.

A vexatious problem, largely unattended in the art, is the lack of an accurate easy, quick and cost effective conversion of these hand drawn hard copy source documents depicting 3D objects into computer based drawings which are mathematically accurate and based on the recorded alphanumeric text present on the hard copy source document. Conversion is the process of taking a analog hard copy source document and changing it into a digital format suitable for use in a digital computer environment.

Some prior art has attempted to respond to some of the problems of converting this paper based information into a usable, reliable computer file. Unfortunately current methods are too slow, too inaccurate, too costly (because of labor intensiveness) or useful only for two dimensional representations. The prior art methods can be grouped into two major categories: manual entry and automated methods.

Manual entry of drawing information into a CAD program is slow and labor intensive and requires the user to read the alphanumeric text and symbols from sometimes a large unwieldy paper drawing and enter it into the computer. The user must constantly go back and forth between paper document and computer. This slow process is subject to possible error and delay. The advantages of the manual entry method are accuracy, when done correctly, and avoiding the costs of the hardware and software required by automated methods. Because it is labor intensive, it is not well suited for performing large volumes of conversions.

A number of automated methods are known in the art of conversion of cartographic documents (describing two dimensional (2D) land areas surveyed) for inputting hard copy document survey data into a computer file, manipulating the data using known coordinate geometry (COGO) software and CAD software packages to produce vectorized computer drawings. The most popular methods fall into two categories: the "manual digitizing method," and the "scanning method used with a vectorization of the graphics." [See, P. J. Stevenson, Scanning for Automated Data Conversion of Cartographic Documents, 1994, titled "Report No. 426 Department of Geodetic Science and Surveying, The Ohio State University, Columbus, Ohio/Report No. CFM-R-94-101, The Ohio State University Center for Mapping Columbus, Ohio", pp. 1–95, the disclosure of which is incorporated herein by reference; G. Omura, Mastering AUTOCAD B for DOS, SYBEX, Alameda, Calif. 1995, pp. 452–480]. The scanning method used with a vectorization of the graphics typically uses heads-up digitizing, line following and automated raster vectorization for converting scanned raster files to vector files. Major problems with using these methods include inaccurate drawing of the area surveyed on the hard copy document, scaling errors, typographical errors in keying typing in text, and scanner distortion of the information on the face of the hard copy document. Both the aforementioned manual digitizing method and automated methods for use with cartographic documents are described in detail along with the limitations of each method, in U.S. patent application Ser. No. 08/445,687 filed May 22, 1995, page 3, line 20 through page 5, line 27, the disclosure of which is incorporated herein by reference.

Also known in the art is an apparatus and method for manipulating scanned documents in CAD. [see, e.g. U.S. Pat. No. 5,353,393 to Bennett et al.] CAD generated images are overlaid over scanned raster images. The 2D CAD image is generated by tracing over the raster image or by using standard CAD commands. This is basically a 2D technique, since 3D CAD drawing packages were unknown at that time. The creation of the resultant 2D CAD drawing view has potential inaccuracy due to using a scaled raster drawing (which itself may be inaccurately drawn or may suffer from scanner distortion) or the data may be typed in incorrectly by the user in response to the CAD queries, or may be misread by the user of the CAD program.

Also optical character recognition has been most effective when recognizing text that is perfectly horizontal and of a standard font type. Recently, non-standard fonts and hand written text are recognized by the OCR. In a typical drawing or map to be converted, the alphanumeric text of concern is often written along the same angle as the line to which it refers. Techniques for recognizing hand drawn graphic symbols on scanned engineering drawings to produce vectorized graphic data, are known in the art. [See, Bhaskaran (U.S. Pat. No. 4,949,388).] Likewise, methods of processing information from scanned hard copy documents containing text or text and graphics and use of OCR recognized text is known. (Lech et al., U.S. Pat. No. 5,258,855). However this recognition process ignores the meaning behind the symbols and the text. It simply replaces the raster entity with either a vector representation or an ASCII based text string.

The same limitation exists with Optical Symbol Recognition (OSR). OSR works by comparing raster images of symbols with a pre-established library of symbols. The OSR recognizes the raster symbol and converts the raster symbol into a vector version of the same symbol and then places the vector version of the symbol in approximately the same location on the raster drawing image as the raster image of the symbol. The user is still left to relate a symbol property to the symbol. By "symbol property" or "symbol property information" are meant hereinthroughout a physical dimension(s) and shape of a moiety that the symbol represents. The user must locate the symbol property and manipulate the drawing to incorporate this information into the drawing.

Recently a computer automated system and method for converting source documents bearing alphanumeric text relating to the length and directions of the bounding lines of an area surveyed using OCR recognition of the alphanumeric text has been discovered.(WO 96/37861). The alphanumeric text relating to the length and direction of the bounding lines of a land area surveyed treats only a two dimensional (2D) representation, e.g. the bounding lines are treated as in the same XY plane.

Engineering drawings and architectural plans are significantly different from the bounding lines of a land area surveyed because the lines (and/or curves) designating the edges of a surface of the 3D object are not necessarily in the same plane, although on the drawing (or plan) which is a 2D representation of the 3D object, they may appear to be so. The aforementioned inaccuracies of automated methods are particularly critical in a three dimensional environment because various edges of the surface of the 3D object must fit together exactly. Therefore, conventional automated conversion strategies are, at best, only capable of producing two dimensional results.

Also engineering drawings and architectural plans further differ from land survey maps in that the former have symbols thereon which are also associated with physical three dimensional symbol properties related to the moiety the symbol represents and to the placement of the moiety in the 3D object. The symbols may also have associated alphanumeric text providing the physical dimensions of the symbol property.

Despite recognition and study of various aspects of hard copy source document conversion to digital format, the prior art has produced very little in the way of providing an accurate computer automated system and method of converting a raster file of a scanned hard copy source document bearing a drawing view, symbols and alphanumeric text relating to the physical dimensions and edges of the 3D object being rendered, as well as the symbol associated with the 3D object, into mathematically accurate 3D vectors of the 3D object and of moiety the symbol represents and into a mathematically accurate vector computer drawing file based on the drawing, the symbol and alphanumeric text which was scanned from the source document.

BRIEF SUMMARY OF THE INVENTION

The present invention responds specifically to the long-felt need heretofore unmet by the prior art and especially with a way to overcome the intrinsic inaccuracies of converting a raster file image of a scanned hard copy source document depicting 3D objects into computer based drawings which are mathematically accurate and based on the recorded alphanumeric text, the graphical drawing, the symbol (if present) present on the hard copy source document. The present invention provides an accurate easy, quick and cost effective conversion of these scanned hard copy documents. The present invention lends itself to use by those with certain disabilities since there is no need to manually type any recognized alphanumeric text, since this is easily accomplished by "picking" the recognized alphanumeric text. The unique attributed symbols of the present invention advantageously provide time and cost savings eliminating the need for the user to draw the moiety the symbol represents in each of the views in the converted hard copy source document.

The foregoing, and other advantages of the present invention, are realized in one aspect thereof in a computer method of converting alphanumeric text relating to a plurality of physical dimensions and to a plurality of edges of a three dimensional object, from a hard copy source document having recorded thereon the alphanumeric text and a plurality of drawing views of the three dimensional object, into mathematically accurate vectors corresponding to the physical dimensions and the edges of the three dimensional object. The method comprising the steps of: (a) acquiring a computer useable raster image of the document having a plurality of drawing views thereon of a three dimensional object having a plurality of physical dimensions and a plurality of edges; the drawing views having a plurality of lines corresponding to the edges of the three dimensional object; the lines oriented in a direction to each other; and alphanumeric text relating to the plurality of physical dimensions and to the plurality of edges of the three dimensional object and recorded on the drawing view in association with the lines on the drawing view; and organizing the raster image according to an orthographic viewpoint raster file for each of the drawing views by selecting one of the drawing views and the alphanumeric text associated with the lines on the drawing view; (b) setting up a drawing file in a CAD applications program in a computer; the CAD applications program having a plurality of orthographic viewports, a coordinate geometry subroutine for creating three dimensional vectors, and an optical character recognition subroutine, and selecting one of the orthographic viewports to correspond in orthogonality to one of the orthographic viewpoint raster files; (c)importing one orthographic viewpoint raster file into one orthographic viewport which corresponds in orthogonality one drawing view; (d) repeating step (c) for each drawing view on the document; (e) recognizing the alphanumeric text in the optical character recognition subroutine in each of the orthographic viewports separately; (f) converting the recognized alphanumeric text in the coordinate geometry subroutine into the mathematically accurate three dimensional vectors corresponding to the alphanumeric text recorded on the document. The document for use in step (a) is a mechanical drawing or an engineering drawing or an architectural plan having a plurality of drawing sheets.

In another aspect, the present invention provides a computer method of converting alphanumeric text relating to a plurality of physical dimensions and a plurality of edges of a three dimensional object, relating to a plurality of physical dimensions and a plurality of edges of a moiety represented by a symbol and a symbol property and used in association with the three dimensional object, and relating to an insertion point of the moiety the symbol represents within the three dimensional object, from a hard copy source document having recorded thereon a plurality of drawing views of the three dimensional object, the alphanumeric text, and the symbol, into mathematically accurate vectors corresponding to the physical dimensions and the edges of the three dimensional object and the moiety the symbol represents. The method comprising the steps of: (a) acquiring a computer useable raster image in a raster file of the document having (i) a plurality of drawing views thereon of a three dimensional object having a plurality of physical dimensions and a plurality of edges, the drawing view having a plurality of lines corresponding to the edges of the three dimensional object, the lines oriented in a direction to each other; (ii) at least one symbol disposed on at least one drawing view, the symbol having a symbol property, the symbol associated with a moiety in the three dimensional object; the moiety having a plurality of physical dimensions and a plurality of edges expressed as the symbol property, the symbol having an insertion point on the drawing view corresponding to a moiety insertion point of the moiety in the three dimensional object; and (iii) a first alphanumeric text relating to the plurality of physical dimensions and to the plurality of edges of the three dimensional object and recorded on the drawing view in association with the lines on the drawing views; a second alphanumeric text relating to the symbol property; and a third alphanumeric text relating to the insertion point; and organizing the raster image according to an orthographic viewpoint raster file for each drawing view by selecting one drawing view and the first alphanumeric text associated with the lines on the drawing view, the symbol and the third alphanumeric text; and organizing a symbol property viewpoint raster file for the alphanumeric text relating to the symbol properties of each symbol, and; (b) setting up a drawing file in a CAD applications program in the computer, the drawing file having a symbol library, the CAD applications program having a coordinate geometry subroutine for creating three dimensional vectors, an optical symbol recognition subroutine, an optical character recognition subroutine and a plurality of viewports, and selecting the viewports in at least one orthographic viewport and customizing at least one floating viewport; (c) importing the symbol property viewpoint raster file into one of the floating viewports; (d) repeating step (c) for each alphanumeric text relating to the symbol properties of each symbol on the document; (e) importing one of the orthographic viewpoint raster files of one drawing views into one of the orthographic viewports which corresponds in orthogonality to both the drawing view and the orthographic viewpoint raster file; (f) repeating step (e) for each drawing view on the document; (g) recognizing the alphanumeric text in the optical character recognition subroutine in each floating viewport and in each orthographic viewport separately and creating recognized alphanumeric text; (h) creating an attributed symbol by converting the recognized alphanumeric text relating to the symbol property of the symbol into a block of mathematically accurate three dimensional symbol vectors representing the physical dimensions and the edges of the moiety the symbol represents and creating a vector symbol file of the symbol vectors; (i) recognizing each symbol in the optical symbol recognition subroutine in each orthographic viewport separately; (j) converting in each orthographic viewpoint the recognized alphanumeric text relating to the plurality of physical dimensions and the plurality of edges of the three dimensional object in the coordinate geometry subroutine into a plurality of mathematically accurate vector corresponding to the alphanumeric text recorded on the drawing; and placing the vectors into an orthographic vector file; (k) selecting the attributed symbol in the viewport and converting the alphanumeric text relating to the insertion point and inserting the symbol vector file into the orthographic vector file and creating a vector file and a drawing file corresponding to the physical dimensions and to the edges of the three dimensional object with the moiety inserted therein. The document for use in step (a) is a mechanical drawing or an engineering drawing or an architectural plan having a plurality of drawing sheets.

In still another aspect for a mechanical drawing, one follows the aforementioned steps (a)–(k), however the symbol library in step (b) is a preset symbol library having an attributed symbol therein corresponding to the symbol on the drawing view. The attributed symbol has a block of mathematically accurate three dimensional symbol vectors representing the physical dimensions and the edges of the moiety the symbol represents. The symbol vectors are in a vector symbol file. Step (h) comprises calling up the symbol library and selecting the attributed symbol corresponding to the symbol on the drawing view and selecting the recognized alphanumeric text relating to the symbol property of the symbol recorded on the drawing view, and incorporating the symbol property into the vector symbol file.

In yet another aspect, the present invention discloses an automated conversion system for converting alphanumeric text, relating to a plurality of physical dimensions and a plurality of edges of a three dimensional object and of properties of a symbol used in association with the three dimensional object and of an insertion point of the symbol within the three dimensional object, recorded on a hard copy source document having at least one drawing view of the three dimensional object, the alphanumeric text and at least one symbol thereon, into mathematically accurate three dimensional vectors corresponding to the physical dimensions and the edges of the three dimensional object and the properties of the symbol and the insertion point. The system comprising in combination an automatic digitizing unit for document scanning and a computer having a three dimensional CAD applications program. The computer includes receiving software and recognition software. The program includes conversion software, transport software and vectorization software. The automatic digitizing unit scans a hard copy document having at least one drawing view thereon, having at least one symbol thereon and having alphanumeric text relating to a plurality of physical dimensions and a plurality of edges of a three dimensional object and of properties of the symbol used in association with the three dimensional object, and of an insertion point of the symbol within the object and then creates a digitized raster file corresponding to the alphanumeric text, the drawing view and the symbol, and then outputs the digitized raster image. The receiving software is operatively associated with the automated digitizing unit, for receiving the digitized raster image into the CAD applications unit and creates a digitized raster viewpoint file and transports the viewpoint file into a CAD drawing file, having a viewport. The recognition software for recognizing the digitized raster viewpoint file text in the viewport, and creating an ASCII text file comprises an optical character recognition subroutine operating in the CAD applications program for recognizing the alphanumeric text, and comprises an optical symbol recognition subroutine operating in the CAD application program for recognizing the symbol. The conversion software is operatively associated with the recognition software, for converting the ASCII text file into a converted file useable in the coordinate geometry subroutine. The transport software is responsive to the converted file and is for transporting the converted file into the coordinate geometry subroutine. The vectorization software is operatively associated with the transport means and is for converting the converted file into mathematically accurate three dimensional vectors having X, Y, Z coordinates and representing the plurality of physical dimensions and the plurality of edges of the three dimensional object and of the properties of the symbol used in association with the three dimensional object, and comprises a coordinate geometry subroutine. The document used in the system is a mechanical drawing or an engineering drawing or an architectural plan having a plurality of drawing sheets.

In yet still another aspect, the present invention provides a computer quality control method for a mechanical drawing. The method comprises the steps of: (a) scanning a mechanical drawing hard copy source document using an automated digitizing unit, the document having at least one drawing thereon of a three dimensional object and alphanumeric text relating to a physical dimension and an edge of the three dimensional object having a plurality of physical dimensions and a plurality of edges, (b) receiving digitized output, the output including the alphanumeric text and the digitized drawing from an automated digitizing unit into a CAD applications program, the CAD applications program having a coordinate geometry subroutine, the alphanumeric text and the drawing having been scanned from the mechanical drawing hard copy source document; (c) displaying the digitized drawing; recognizing the alphanumeric text using a conversion system operating in the CAD applications program, the conversion system having a graphics optical character recognition subroutine, and recognizing the alphanumeric text using the textual optical character recognition subroutine; (e) transporting the alphanumeric text into the coordinated geometry subroutine; (f) converting the alphanumeric text in the coordinate geometry subroutine into mathematically accurate vectors representing the physical dimensions and the edges of the three dimensional object; (g) generating a set of orthographic views of the three dimensional object using the mathematically accurate vectors and overlaying each orthographic view on a corresponding view of the digitized drawing. The mechanical drawing scanned in step (a) is an engineering drawing or an architectural plan having a plurality of drawing sheets.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout and in which:

FIG. 7 is a diagram illustrating the automated conversion system and method of the present invention and further detailing Step 4 of FIG. 2 for the engineering drawing of FIG. 3;

FIG. 8 is a diagram illustrating the automated conversion system and method of the present invention and further detailing Step 5 of FIG. 2 for the engineering drawing of FIG. 3;

FIG. 9 is a diagram illustrating the automated conversion system and method of the present invention and further detailing Step 6 of FIG. 2 for the engineering drawing of FIG. 3;

FIG. 10 is a diagram illustrating the automated conversion system and method of the present invention and further detailing Step 7 of FIG. 2 for the engineering drawing of FIG. 3;

FIG. 12 is a diagram illustrating the automated conversion system and method of the present invention and further detailing Step 2 of FIG. 2 for the architectural plan of FIG. 18;

FIG. 17 is a diagram illustrating the automated conversion system and method of the present invention and further detailing Step 7 of FIG. 2 for the architectural plan of FIG. 18; and FIG. 18 is an example of an architectural plan used to demonstrate the method of the present invention for use in architectural plans.

DETAILED DESCRIPTION OF THE INVENTION

Figure 1A:
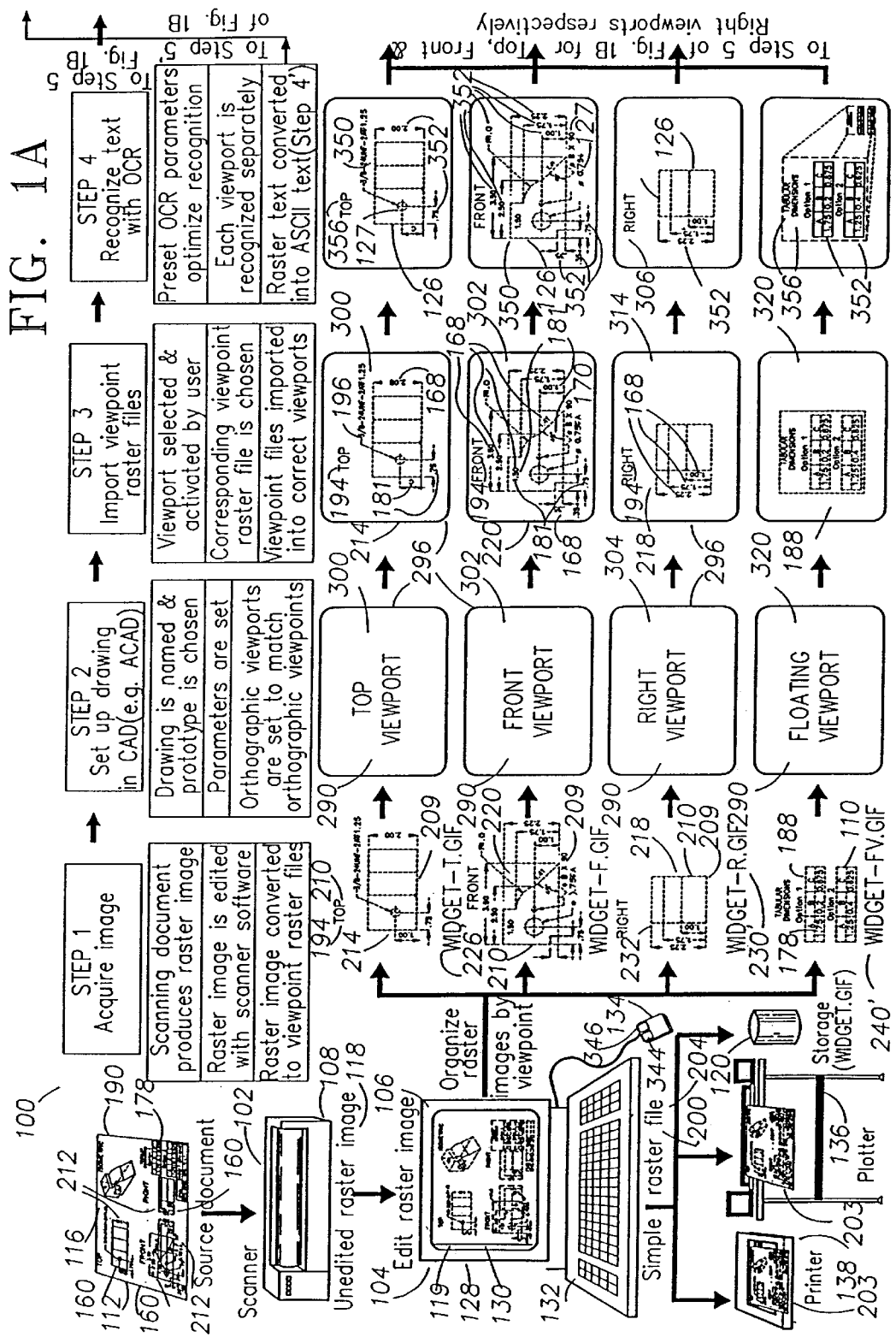
FIGS. 1A and 1B illustrate the automated conversion system of the present invention.

The present invention relates broadly to a computer automated system and method for converting a hard copy source document bearing alphanumeric text relating to a plurality of physical dimensions and edges of a three dimensional object and at least one drawing view of the three dimensional object into a computer drawing file consisting of three dimensional coordinates and vectors corresponding to the edges of the three dimensional object. The computer automated system and method of the present invention is most particularly adapted for use in converting engineering drawings and architectural plans. The invention is particularly well-suited for utilizing and converting a raster image of a scanned hard copy source document bearing a drawing view of the three dimensional object, symbols and alphanumeric text relating to heights, widths, depths (lengths), and angles of edges of the three dimensional object and of the symbol into mathematically accurate vector computer drawing files, which files are based on the symbols and alphanumeric text scanned from the source document. The invention is also well-suited for utilizing a raster image produced by scanning an engineering drawing document having at least one view thereon showing the edges of a three dimensional object and having alphanumeric text relating to the lengths and directions of the lines and curves of the edges, where the invention constructs a mathematically accurate drawing of the drawing view from the raster file. The present invention is also well-suited for scanning a hard copy architectural plan bearing symbols and alphanumeric text relating to the size, shape, location and elevation of various objects, such as, but not limited to walls, windows and converting the symbols and alphanumeric text into a mathematically accurate computer drawing of the architectural plan.

Accordingly, the present invention will now be described in detail with respect to such endeavors; however, those skilled in the art will appreciate that such a description of the invention is meant to be exemplary only and should not be viewed as limitative on the full scope thereof.

As used throughout herein, "document" means the hard copy source document. The document may be of paper, vellum, blue prints, polyester film, plastic transparencies, microfilm, or microfiche. The present invention also can use images scanned by video recording devices and computer or digital cameras.

Conventionally, as is known in the mechanical drawing art, each drawing view on the document is an orthographic projection (or drawing) on a plane of the edges of the 3D object. Perpendicular lines or projectors are drawn from all points on the edge (linear or contour) of the 3D object to the plane of projection. Thus X, Y, Z information of a Cartesian coordinate system is revealed in combinations of the views, or possibly in a single view with additional dimensional information recorded thereon (e.g. a top view of a shim having a depth dimension). In orthographic projection drawings, the 3D object is viewed from 6 mutually perpendicular directions, thus 6 orthographic views may be drawn. These orthographic views are a top view, a bottom view, a front view, a back view, a right side view and a left side view. The principle orthographic projection views are the top (or bottom), front (or rear), right (or left side). The orthographic views of the three-dimensional object are conventionally placed on a drawing sheet in sequence of adjacent sides of the 3D object of interest. Views are most commonly arranged by a third-angle projection system in engineering drawings, in which the top view is drawn in a location vertically above the front view, and the side view is placed horizontally in direct line with the front view (see, FIG. 3). Thus a horizontal plane is used for a top (or bottom) view. A profile plane is used for a side view and a frontal plane is used for the front view(a rear plane is used for the rear view). The horizontal plane, frontal plane and profile plane are orthogonal to each other. Most engineering drawings also include an isometric view or a perspective view of the 3D object in the upper left-hand corner of the completed source document.

Conventionally, for architectural plans (drawings), including structural drawings, a separate sheet is used for each plan view (top view or bottom view) or building elevation view (rear view, front view, left side view or right side view) of a structure, and the individual parts of the structure are shown in assemblage. Most architectural and structural drawings are third-angle projections.

Each of the mechanical drawing views (e.g., engineering drawings and/or architectural plans or drawings and/or other technical drawings) show lines (straight lines or curved lines) corresponding to the various edges of a surface of the three dimensional object, as well as, alphanumeric text associated with these edges.

Symbols may also appear on the engineering drawing views, as well as on the architectural plan views. Conventionally, there are two types of symbols, simple symbols and content symbols. Each of these symbols is drawn on the document using a symbol graphic which has a particular shape associated with a moiety that the symbol represents, or is a single alphanumeric character, or a string of alphanumeric characters. A simple symbol represents a moiety which is not part of the structure, per se, of the 3D object. Thus the simple symbol is merely a conventional shape (graphic) located appropriately on the drawing to show the presence of the moiety represented by the symbol. Simple symbols include, but are not limited to, symbols for electrical outlets, toilets, chairs, desks or other furniture. There is no 3D information on the drawing view associated with the moiety represented by the simple symbol.

The term "content symbol" means hereinthroughout that the symbol is related to a moiety which has a symbol property, e.g. 3D content information regarding the physical dimensions and edges of moiety. The moieties represented by content symbols include, but are not limited to, items incorporated into the structure of the 3D object, voids or penetrations within the 3D object, a surface feature of the 3D object, or other features which somehow affect the physical dimensions and edges of the 3D object. An example of an item incorporated into the surface of a 3D object includes, but is not limited to, doors, windows, etc. An example of penetrations (either partial or full) within the 3D object include, but are not limited to, holes, threads for machine screws or bolts, etc. Indicia of surface features of the 3D object include, but are not limited to, contours or angulation of surfaces, such as but not limited to, radius of curvature of a surface, e.g., "R" or ⊿ for a special slope of the edges.

Content symbols have two aspects: A symbol graphic and a symbol property. The symbol graphic is merely a graphical drawing representing a shape for the symbol. For example,  is an architectural symbol meaning window, and (D2) is an architectural symbol meaning door. Or, for example, the following engineering symbols: ∨, ⟂, Ø or DIA, R respectively mean countersink, deep (depth), diameter, and radius. The (W3), (D2), ⟂, ∨, Ø or DIA, and R shapes are the symbol graphics of the respective symbols. The other aspect of the content symbol is the symbol property. The symbol property is 3D information pertaining to the physical dimensions and edges of the moiety the symbol represents. This information is found (in whole or in part) as alphanumeric text in drawing blocks, tables, charts, legends or schedules on the drawing or as alphanumeric text on the face of the drawing in proximity with the symbol or in a CAD symbol library. In conventional symbol recognition (OSR), the raster symbol (whether it is a simple symbol or a content symbol) shape is compared to a number of vector based shapes in a symbol library. The vector shape most closely resembling the raster shape is selected and then placed in approximately the same location as the raster version. This is basically a "cut" and "paste" procedure. Conventionally, whenever a content symbol is found, the user is expected to refer to the table or legend to discover the meaning of the symbol and to draw the moiety the symbol represents into the drawing views.

Many simple symbols and content symbols are standardized symbols which are known in the mechanical drawing art. The term standardized symbol(s) means hereinthroughout those simple symbols and content symbols which have standard symbol shapes and/or alphanumeric text and/or which bear three dimension information as to a moiety the symbol represents; standardized symbols, include, but are not limited to, those described in industry standards, such as, ANSI Y14.5 M-1982P29–34, (1983) pp 29–34; 29–133 (American National Standard, Dimensioning and Tolerancing, ANSI Y14.5 M-1982, New York, N.Y.); ANSI Y14.6–1978, (1978) pp. 7–13 (American National Standard, Screw Thread Representation, ANSI Y14.6-1978, New York, N.Y.); ISO 725-1978(E) pp. 151–153, ISO-263-1973 (E) pp. 146–150, ISO 724-1978(E) pp. 72–73 (International Organization for Standardization, Switzerland, "ISO Standards Handbook 18, Fasteners and Screw Threads", (1984); as well as those in standard technical drawing books, such as, but not limited to, T. E. French and C. J. Vierck, "Engineering Drawing and Graphic Technology", 12th Ed. McGraw Hill Book Company, New York, N.Y., (1978), pp. 253–254, Appendix C, p. A48–A49, A55; French et al., "Mechanical Drawing CAD-Communications, 12th Ed., pp. 308–309, 723 Glencoe-McGraw-Hill Company, New York, N.Y., (1997); J. W. Grachino et al., "Engineering Technical Drafting", 4th Ed., American Technical Society Publication Chicago, Ill. (1978) pp. 702,704, 705; J. H. Earle, "Graphics for Engineers" Addison Wesley Publishing Co., (1996), Reading, Mass., pp. Appendices A-6, A-7, A-8, A-14; Giesecke et al., "Engineering Graphics", MacMillan Publishing Co., Inc., 3rd Ed. New York, N.Y. (1985) pp. 357–359, 370–373, 834–836, 843); and in existing CAD drawing programs, and manuals such as, but not limited to, T. M. Schumaker et al. "AutoCAD and its Applications", The Goodheart-Willcox Company, Inc., Tinley Park, Ill.

(1993) p. G-1, 18–60, 18–61, 18–32, 18–33, 18–31, 18–37, all the aforementioned disclosures of which are incorporated herein by reference.

The present invention creates a third symbol, the "attributed symbol". As used herein, "attributed symbol", means a content symbol whose symbol properties have been converted by the method of the present invention and exist as a 3D vector file where the vectors correspond to the physical dimensions and edges of the moiety the symbol represents and which is assembled into the mathematically accurate vectors corresponding to the physical dimensions and edges of the 3D object and is inserted at the location of the moiety in the 3D object, as shown as the insertion point of the content symbol in the drawing view. This aspect of the present invention, eliminates the time consuming hand entry of the symbol property information for each content symbol and eliminates errors in miskeying and misreading this information. The content symbols, if present on the document, are advantageously converted to attributed symbols according to the present invention. Many standardized content symbols will have been converted into attributed symbols which are part of the default symbol library.

The format as used herein for recording the alphanumeric text are well known in the mechanical drawing drafting art. Where the recorded alphanumeric text describes a straight line, typically the line has two properties, a distance and a direction. The distance is expressed in units of measurements, such as, feet and inches, represented by the alphanumeric text (ft) or (in) or by the symbols (') and (") or in units of measurement, such as, meters, represented by the symbol (m). The direction is expressed as an angle or an azimuth. Alternatively, the direction is ascertained by viewing the drawing on the document. Usually the lines on the drawings are arranged in an orthogonal mode, which means most of the straight lines are in the cardinal directions: 0°, 90°, 180° and 270°. By definition, lines drawn in these cardinal directions are parallel or perpendicular to each other. Forming corresponding orthogonal vectors is particularly easy using the methods of this invention.

The invention includes hardware and software necessary to extract, retrieve and convert the drawing view, the symbols and the alphanumeric text, relating to the depth, width, height and shape of edges of the three dimensional object and of any symbol property of any content symbol recorded on the document into mathematically accurate vectors.

As used herein, the term "vector" or "vectors", means straight lines having length and direction, as well as, curved lines having length and direction. A vector "straight line" or vector line is described by two points: the start point and the endpoint. A vector "curved line" or vector curve (or arc) can be described by three points: the start point, the endpoint and the center point. As is known in the art, the direction of the curve is implicit in the relationship among these points.

As used herein, the term "mathematically accurate" vector(s) or vector file means a vector(s) or vector file comprising vectors which relate accurately to the mathematical data expressed in the alphanumeric text recorded on the source document which describes the physical dimensions and edges of the three dimensional object. When "mathematically accurate" vector(s) are used in association with the content symbol, the term means a vector(s) or a vector file which relate accurately to the mathematical data expressed in the alphanumeric text recorded on the source document as a symbol property or a vector file present in the symbol library, each of which describes the physical dimension and the edges of the three dimensional moiety the content symbol represents. The term "mathematically accurate" in reference to "computer "drawing(s)" or "computer drawing files" means hereinthroughout creating a computer drawing or computer drawing file using the aforementioned mathematically accurate vectors for the 3D object and/or for the moiety.

As used hereinthroughout, the term "file" is meant to encompass, i.e., that group of information which is in the form of a certain data type. For example, a "viewpoint raster text file" is that group of alphanumeric text expressed as raster text; "a mathematically based ASCII file" is that group of ASCII text which pertains to the mathematical properties of lines and arcs. In another example, "a viewpoint raster symbols file" is a group of raster shapes for the symbol graphics for simple symbols and content symbols. For convenience, these files are typically separated into layers within the CAD drawing itself which can be deleted, frozen, turned on or off, and otherwise manipulated, as is commonly known in the CAD art. The word "file" does not necessarily refer to a discrete bundle of information located at a specific address in the memory of the computer and may include information which is separated within the drawing itself.

CONVERSION SYSTEM AND METHOD

Figure 1B:
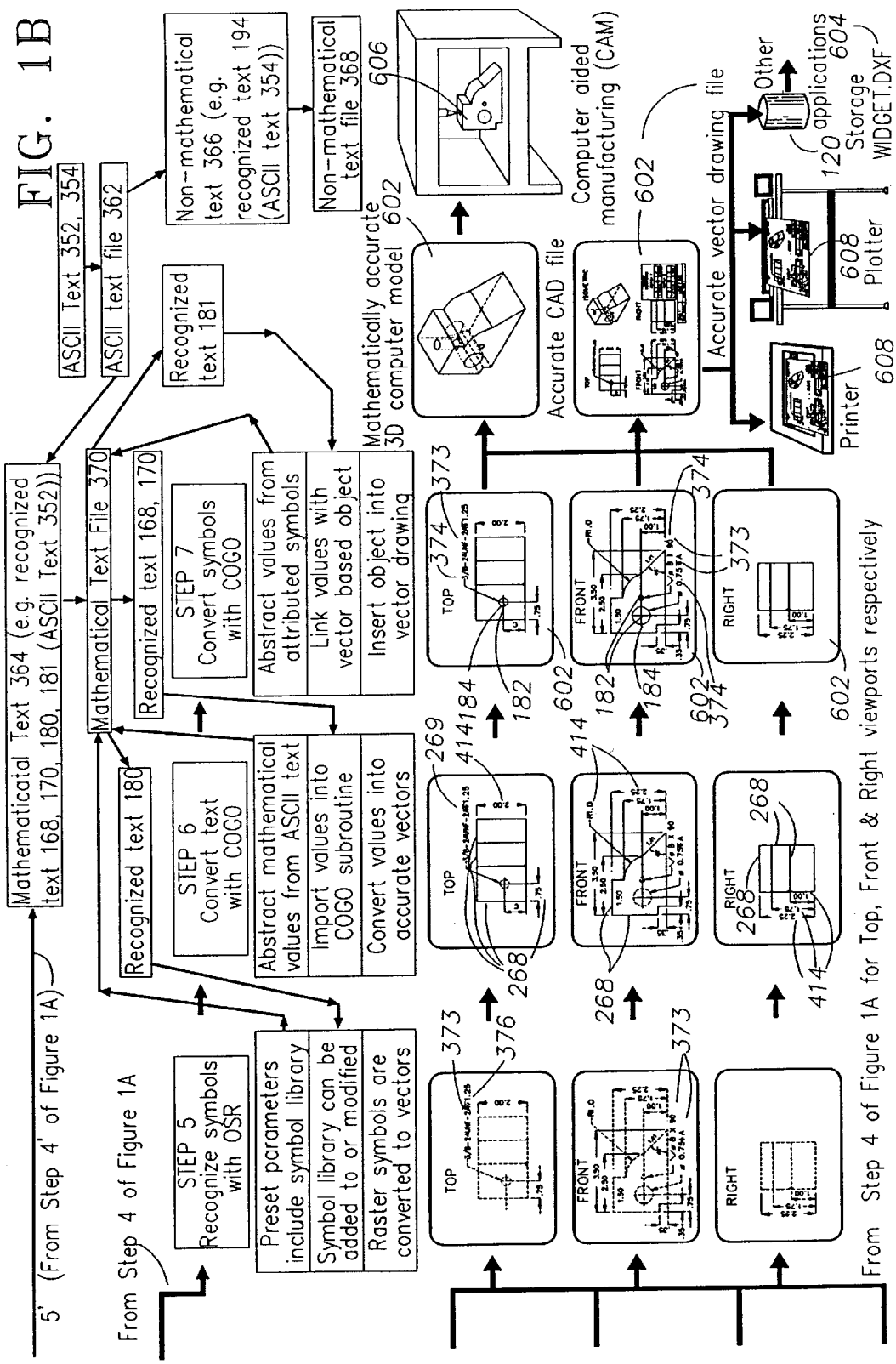

The automated conversion system 100 and method of the present invention is generally shown in FIGS. 1A–18. FIGS. 1A–B, shown without an isometric viewport or viewpoint, illustrate the hardware and software needed to practice the method of the present invention. The hardware for practicing the present invention includes the following: an automated digitizing unit 102 and a computer 104 in a computer work station 106. The automated digitizing unit 102 is suitably any type of a scanner 108, for example an Optical Reader, which extracts information 110 off a document 112, having a document face 116. The document 112 has one or more drawing views 160 thereon. The scanned information which is a digitized output 118 from the face 116 of the document 112 can be saved as simple raster file on a storage device 120 such as a floppy disk, a ZIP™ disk (made by Iomega Corporation, Roy, Utah), a compact disk (CD), a standard DVD disk, or a hard disk and converted, according to the method of the present invention at a later time. A raster image 119 of the digitized output is shown on the screen. The digitized output 118 is preferably immediately organized into a plurality of viewpoints 122, with each viewpoint 122 corresponding to one of the drawing views 160. This results in the creation of a plurality of digitized viewpoint raster files 124. Each viewpoint raster file 124 is named and then stored on a storage device 120 such as a floppy disk, a ZIP™ disk, a compact disk (CD), standard DVD disk or hard disk and then retrieved for use to continue the method of the present invention.

The computer work station 106 suitably includes the computer 104, a high resolution color display monitor (either a VGA or SVGA) 128 with a screen 130 and a high resolution color display card, a keyboard 132, a two button mouse 134, a hard disk (not shown), and a plotter 136. The computer has at least 32 MB (megabytes) of RAM, at least one disk drive capable of reading a 3.5 inch 1.44 MB disk, or a 100 MB ZIP™ disk and a hard disk with at least 1 Gigabyte or more of free memory space. The computer 104 should have at least one serial port or a switch box (not shown) installed. An optional printer 138 may be used instead of, or in addition to, the plotter 136.

The software in accordance with the present invention is commercially available and includes a document scanning software program, an operating systems program having "windows," a conversion program with an OCR subroutine and with an OSR subroutine and with automated graphics recognition vectorizing software, a CAD program having a COGO subroutine, and, if necessary, a subroutine for converting a scanned image file into a format that can be used in the specific CAD environment.

In a preferred embodiment of the system and method of the present invention, the following hardware and software are used: the scanner 108 is an Optical Scanner, Contex FSC 8000DSP Full Scale Color Scanner by Contex Scanning Technology (hereinafter "CONTEX") and distributed by Ideal Scanners and Systems of Rockville, Md. The computer 104 is a Dell Dimension XPS R400 MHz Mintower Base personal computer with MMX Technology and 512K Cache by Dell of Round Rock, Tex. with a Pentium II chip, 256MB 100 MHz SDRAM memory, and 6.4 GB of hard disc space. The display monitor 128 is a Dell UltraScan 1600 HS 21" Trinitron Color Monitor with 19.8" viewable image size (Model #1626 HT for Dimension). The plotter 136 is a Hewlett Packard 500 series ink jet plotter. The keyboard 132 is a Silitek Quiet Key 104 key keyboard, factory installed by Dell. The mouse 134 is a two-button MICROSOFT Intellimouse, shipped with the Dell system. The hard disk is a 6.4 GB EIDE Ultra ATA hard disk, factory installed by Dell. The printer 138 is a HEWLETT PACKARD LASERJET 6P.

The preferred software for use in the present invention includes a scanning software CAD/IMAGE/SCAN™ software by CONTEX accompanying the aforementioned scanner 108, a CAD software system (AutoCAD™ Release 14.0, hereinafter "AUTOCAD", by Autodesk, Sausalito, Calif.) with a COGO subroutine. The preferred recognition and vector conversion software programs used in the AutoCAD™ 14.0 environment, include preferably the IMAGE TRACER PROFESSIONAL™ (IIS f/k/a I.G.S., a division of Hitachi Inc. of Boulder, Colo.). The IMAGE TRACER PROFESSIONAL™, software includes IMAGE EDIT software for editing images, and IMAGE AutoGT™ software and IMAGE TRACER™ software, both of which are software for fully automatic raster-to-vector conversion. The IMAGE TRACER PROFESSIONAL™ for AutoCAD™ software is a user interactive fully automatic raster-to-vector conversion tool that runs on AutoCAD™ Release 14.0 and requires a Pentium Processor, 32 MB RAM, 10 MB hard disk space, and WINDOWS® 95 software. It is the core software to which the preferred embodiment of the present invention is written. The present invention uses the text recognition capabilities within IMAGE TRACER PROFESSIONAL™ software for automatic conversion of raster text, including handwritten, upper/lower case, and rotated text, into true AutoCAD™ text strings. The aforementioned software provides the user interactive series of commands permitting the user to control automatic recognition of graphics, text, or both, as functions in AutoCAD™. The IMAGE TRACER PROFESSIONAL™ software also contains utility functions permitting the user to set parameters for specific types of drawings, specific graphics within the drawing, and text recognition. The AutoCAD™ software includes a Reject Editor "FRED" software to alert the user to text recognition errors noted by the IMAGE TRACER PROFESSIONAL™ software. The IMAGE TRACER PROFESSIONAL™ software digitizes all parts of a scanned drawing graphics into vector files as instructed by the user and converts both text and graphics into vector files, e.g. vectorized text and vectorized graphics, when instructed to do so by the user. The "vectorized text" created by the IMAGE TRACER PROFESSIONAL™ software means that each text letter is shown in vector format. This is distinguished from the present invention where, in a mechanical, engineering, or architectural drawing, the alphanumeric text recorded on the drawing view relating to the physical dimensions and edges of a three dimensional object and to the symbol properties of a symbol used in association with the three dimensional object is converted to vectors corresponding to edges of a three-dimensional object and to vectors corresponding to the moiety the symbol represents.

The IMAGE TRACER PROFESSIONAL™'s software has a "Graphic Defaults" program which assists the user's vectorizing of the drawing on the scanned document. For example, by the selecting certain options, the "Graphic Defaults" program sets parameters to recognize line intersections and places vectors at each intersection (node). The IMAGE TRACER PROFESSIONAL™ software's text recognition module identifies and converts typed or handwritten alphanumeric characters and creates CAD useable ASCII text strings. The converted graphics and converted text are given different colors and different CAD layers. Dimension text is stored on a separate CAD layer.

The preferred software for the OSR for use in the present invention is SYMBOL™ symbol recognition software which is commercially available from GRAPHIKON GmbH of Berlin, Germany, and useable with a raster to vector conversion program, such as VECTORY® by GRAPHIKON GmbH (supra). An additional DFX interface is used to directly connect SYMBOL™ software to the CAD software. The SYMBOL™ software permits symbols to be recognized on both vector and raster images. This software allows the user to search a vectorized drawing for definable symbols and exchange them with standardized symbols or customized CAD symbols.

As best shown in FIGS. 1A, 3, 11 and 18, the document 112 has one or more drawing views 160 of a 3D object thereon. The 3D object has a plurality of physical dimensions and a shape. The shape of the 3D object is represented as a plurality of edges, which are drawn as lines 164 or curves 166 on the drawing view 160 forming a drawing graphic 167. Each line 164 and each curve 166 has associated with it alphanumeric text 168 relating to the physical dimension of the edge, and hence of the shape of the 3D object. There may also be alphanumeric text 170 relating to the direction of the line and/or curve with respect to an adjacent line and/or curve. The alphanumeric text 168, 170 provides information relating to a height, a width, a depth (length), a radius of curvature (for curves ) as well as direction of the line (in certain instances) and a location of the line 164 and/or the curve 166. Alphanumeric text 168, 170 is also hereinthroughout referred to as a "first alphanumeric text" relating to the physical dimensions and edges of the three dimensional object which is recorded on the document 112. The drawing view 160 also contains information regarding adjacent pairs of edges and their directions on the drawing view 160. Thus the lines 164 may be at right angles to one another and oriented at orthogonal directions: 0°, 90°, 180° and 270°. The document 112 may have one or more symbols 174 recorded thereon. The symbol may be a simple symbol 175 or a content symbol 176 having a symbol property 178. The symbol property 178 is expressed as an alphanumeric text 180. The alphanumeric text 180 is also referred to hereinthroughout as "a second alphanumeric text" recorded on the document face 116 of the document 112 scanned and is contained in tabular form, such as, a chart, a schedule, a table 188, a legend, etc. The symbol property has 3D information as to the physical dimensions and edges of a moiety the symbol represents, e.g. a height, a width, a depth (length), a radius of curvature (if curved). Or, the symbol property 178 may be a block of vectors in a vector symbol file, containing or associated with this 3D information. The moiety the symbol represents may be, but is not limited to, a penetration (full or partial) 184 within the 3D object, or an extrusion of the 3D object, or an object (door, window, etc.) incorporated into the 3D object. Where a content symbol 176 is present on the document 112, an alphanumeric text 181 is present which relates to an insertion point 182 of the moiety of the symbol into the 3D object. Alphanumeric text 181 is hereinthroughout also referred to as a third alphanumeric text. Furthermore, a drawing scale 187, as well as, a measurement of units 189 are on the source document 112.

Figure 2:
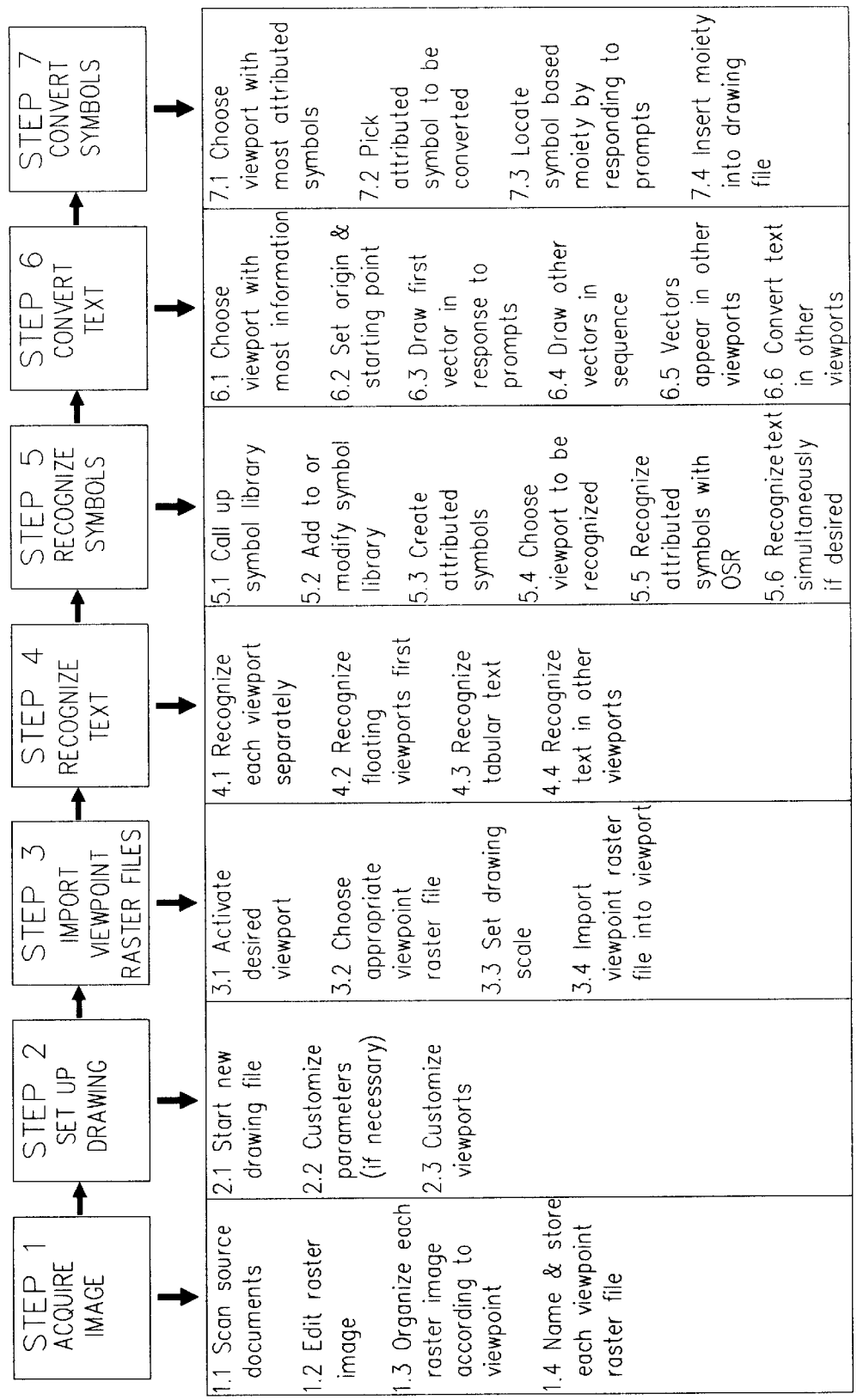
FIG. 2 is a diagram illustrating the seven steps of the automated conversion method of the present invention.

The present method of conversion of a document 112 such as, but not limited to, a mechanical drawing, such as an engineering drawing 190 or an architectural plan 192, is practiced by following steps 1–7 as illustrated in FIG. 2. The same steps 1–7 are illustrated in further detail in FIGS. 4–10, in Example 1, for the engineering drawing 190 and in FIGS. 11–17, in Example 2, for the architectural plan 192 and in FIG. 1.

The computer method of the present invention has 7 simple steps. These steps are (1) acquiring the image, (2) setting up the drawing, (3) importing the viewpoint raster files, (4) recognizing the text, (5) recognizing the symbols, (6) converting the text, and (7) converting the symbols. If no symbols are recorded on the document 112, the computer method of the present invention includes steps (1)–(4) and (6). If only simple symbols are present on the source document 112, the computer method of the present invention includes steps (1)–(6).

The term "text" in FIGS. 1A, 1B, 2, and 4–17 refers to the alphanumeric text 168, 170, 180 and 181.

STEP 1

Figure 3:
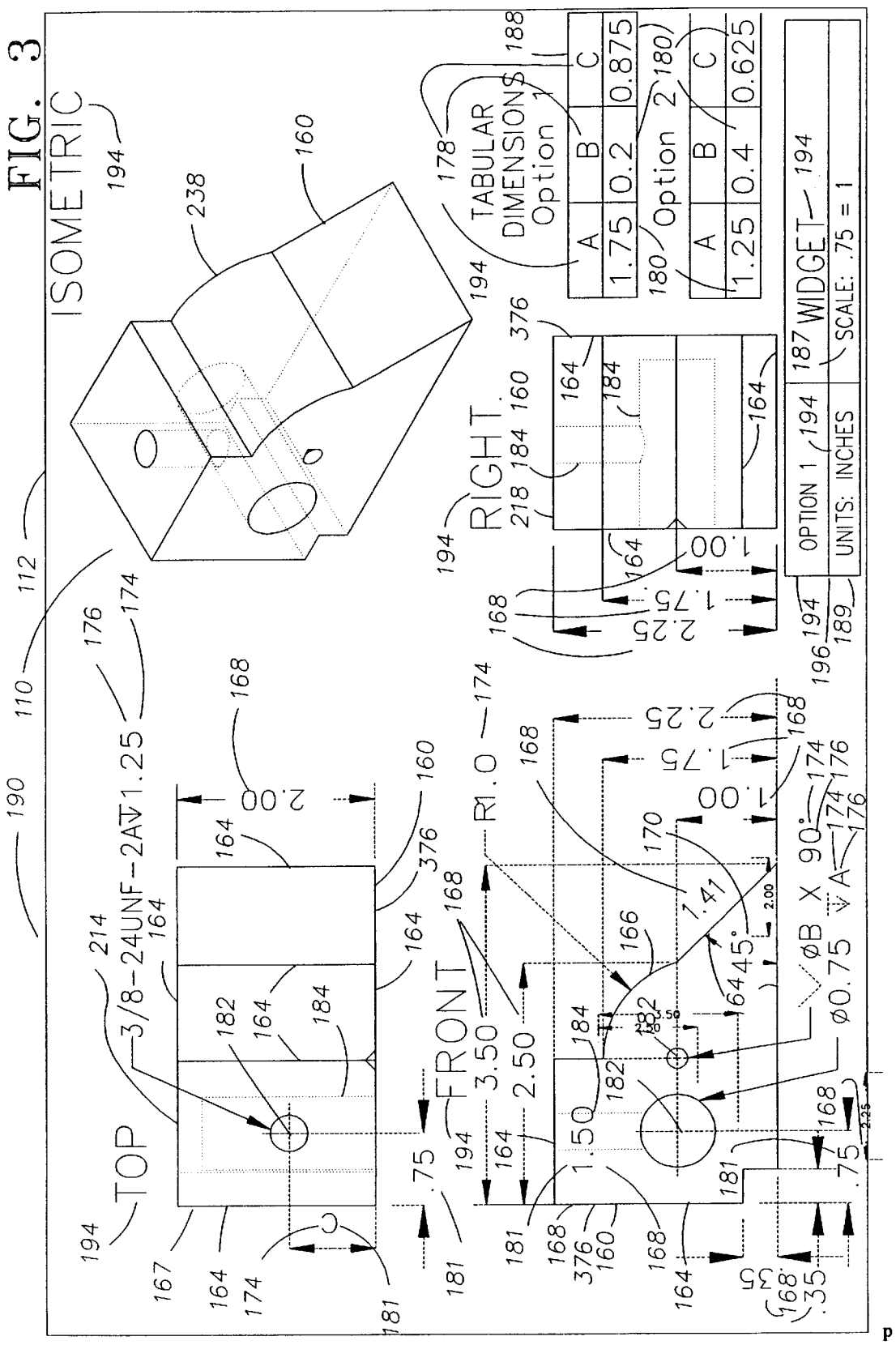
FIG. 3 is an example of an engineering drawing used to demonstrate the method of the present invention for use in engineering drawings.

Step 1 of acquiring the image is illustrated in steps 1.1 to 1.4 as best seen in FIGS. 1A, 2, 3, 4, 11, and 18. In FIGS. 4–10, the document 112 of FIG. 3 is used. In FIGS. 11–17, the document 112 of FIG. 18 is used. In step 1.1, in the conventional manner, the source document 112 is scanned using a scanner 108. The resolution of the scanner 108 is set to at least 300 dots per inch (300 DPI). The hard copy source document 112 has one or more drawing views 160 thereon, as well as alphanumeric text 168, 170 (relating to the physical dimensions and edges of the 3D object) and symbols 174 (if present), and alphanumeric text 180, 181 (if content symbols 176 are present) on the face 116 of the document 112. The document 112 may have other alphanumeric text 194 which does not relate to the depths, widths and heights of the 3D object or to the symbol property 178. This alphanumeric text 194 may include information on a project name, a revision number of the document 112, a name of the drafter, a drawing scale 187 of the drawing views 160 or, a unit 189 of measurement for which the drawing views 160 is dimensioned, etc. A title block 196 is typically in a corner of the engineering drawing 190.

In step 1.1, all the information is extracted from the face 116 of the document 112 and stored in the scanner memory as an unedited digitized raster image 119. The raster image 119 can be saved as a simple raster file 200 in a user designated for mat (e.g. GIF, TIF). Most preferably, the raster image 119 is directly imported into the computer 104 without being stored in the scanner memory. In step 1.1, the digitized raster image is displayed on the display monitor 128 as raster image 119. Raster image 119 displays all the scanned content on the face 116 of the document 112, showing the drawing views 160 in the source document 112 as well as text 168, 170, 180 and 181 and any symbols 174. For ease of illustration, the hidden lines on the drawing in step 1.1 have been omitted and are omitted in subsequent illustrations. However in actual practice, any hidden lines on the drawing appear on the raster image 119.

In step 1.2, raster image 119 is edited, if needed, using software provided with the scanner and/or with other editing computer software as is known in the art, to remove scanner artifact, e.g., noise. For example, the raster image 119 may be reoriented or realigned, artifact, such as "noise", removed, etc. If the raster image 119 is edited, an edited raster file 204 is created. At this point, the raster files 200, 204 may be stored in a storage device 120 as a simple raster file 200 in computer memory, on hard drive, or on a floppy disk, or compact disk (CD), or output as a simple raster drawing 203 using a standard printer 138 or a standard plotter 136. This file 200, 204 may be brought up to practice the present invention.

After the raster image 119 has been adequately edited, in order to practice the present invention, it is necessary for the user to organize the digitized raster file 200, 204 or the edited raster image 119 into viewpoint raster files which correspond to corresponding views on the document and to organize any tables, charts or schedules on the document into an appropriate viewpoint raster file(s).

In step 1.3, each of the digitized raster file(s), either the unedited raster file 200 or the edited raster file 204, or edited raster image 119 is then organized according to a viewpoint 122 corresponding to one of the views 160 on the document 112 or to a symbol property 178 in the document 112, and in step 1.4 suitably stored in a storage device 120 as a named viewpoint raster file in computer memory, on a hard drive, or on a floppy disk, on ar compact disk (CD), or is output as a viewpoint raster drawing 209 using the printer 138 or the plotter 136.

As discussed previously, mechanical drawings 190, 192 have conventional drawing views 160 of a 3D object. The viewpoints 122 include orthographic viewpoints 210. There are six orthographic viewpoints 210 which correspond to the six principle orthographic views 212 used to represent a 3D object. The six orthographic views 212 are a top view 214, a left side view 216, a right side view 218, a front view 220, a back view 222, and a bottom view. The corresponding orthographic viewpoints 210 are a top viewpoint 226, a left side viewpoint 228, a right side viewpoint 230, a front viewpoint 232, a back viewpoint 234 and a bottom viewpoint and are given the respective abbreviations T, L, R, F, B, and Bo. There are also viewpoints 122 corresponding to any isometric view 238 or perspective view on the source document 112. These corresponding view points are an isometric viewpoint 240 and a perspective viewpoint and are given the abbreviation I and P respectively. The alphanumeric text 168, 170, 181 associated with the specific view 160 is included in the drawing viewpoint 210 for the specific view 160.

Other viewpoints 122 include one or more floating viewpoints 242 which contain the symbol property 178 and the alphanumeric text 180. If the symbol property 178 is not present in the source document 112, then a floating viewpoint 242 is not set up. The floating viewpoint 242 is given the short abbreviation FV. The floating viewport 242 appears as a moveable window 244 on the screen 130 which are manipulated, enlarged, or diminished in a manner well known to anyone familiar with the WINDOWS® operating environment software. These windows 244 are set to activate automatically as a part of a command or are called up deliberately at any time by the user.

Figure 4:
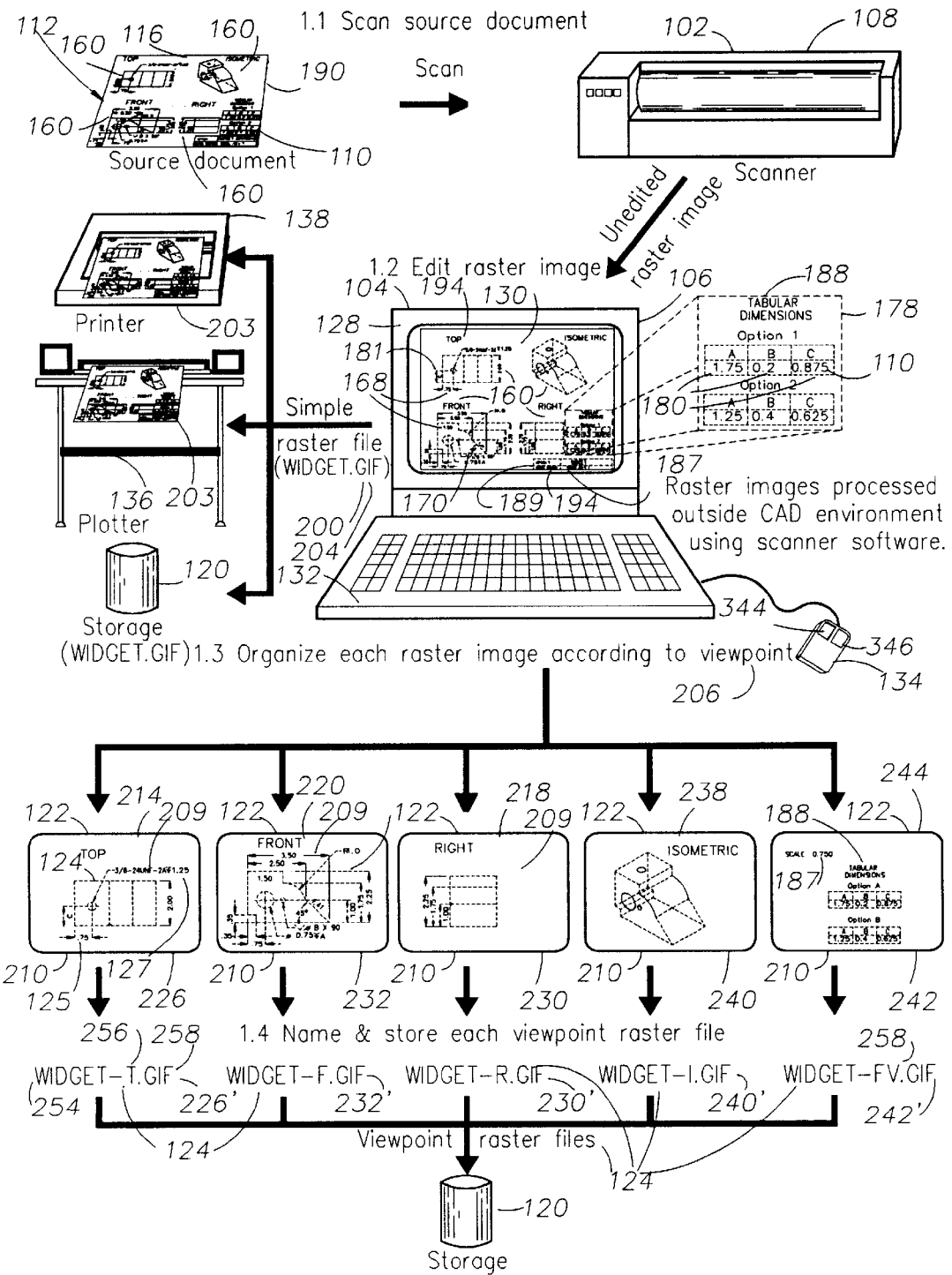
FIG. 4 is a diagram illustrating the automated conversion system and method of the present invention and further detailing Step 1 of FIG. 2 for the engineering drawing of FIG. 3.

For the engineering drawing 190, typically one source document 112 is scanned which may contain more than one drawing view 160, as shown in FIG. 4. The digitized raster image 119 is divided into separate orthographic views 214, 216, 218, 220, 222, and bottom view corresponding to each separate view 160 on the engineering drawing 190, and stored in a separate viewpoint 122 corresponding to the view 160, as a corresponding separate viewpoint raster file 226', 228', 230', 232', 236', and bottom viewpoint raster file. If an isometric view 238 is present, this is placed in the isometric viewpoint 240 and stored as an isometric viewpoint file 240'. If a perspective view is present, this is placed in the perspective viewpoint and stored as a perspective viewpoint file. If symbol property 178 is present on the engineering drawing 190, this is placed in the floating viewpoint 242 and stored as described in step 1.4 as a floating viewpoint raster file 242'.

Figure 11:
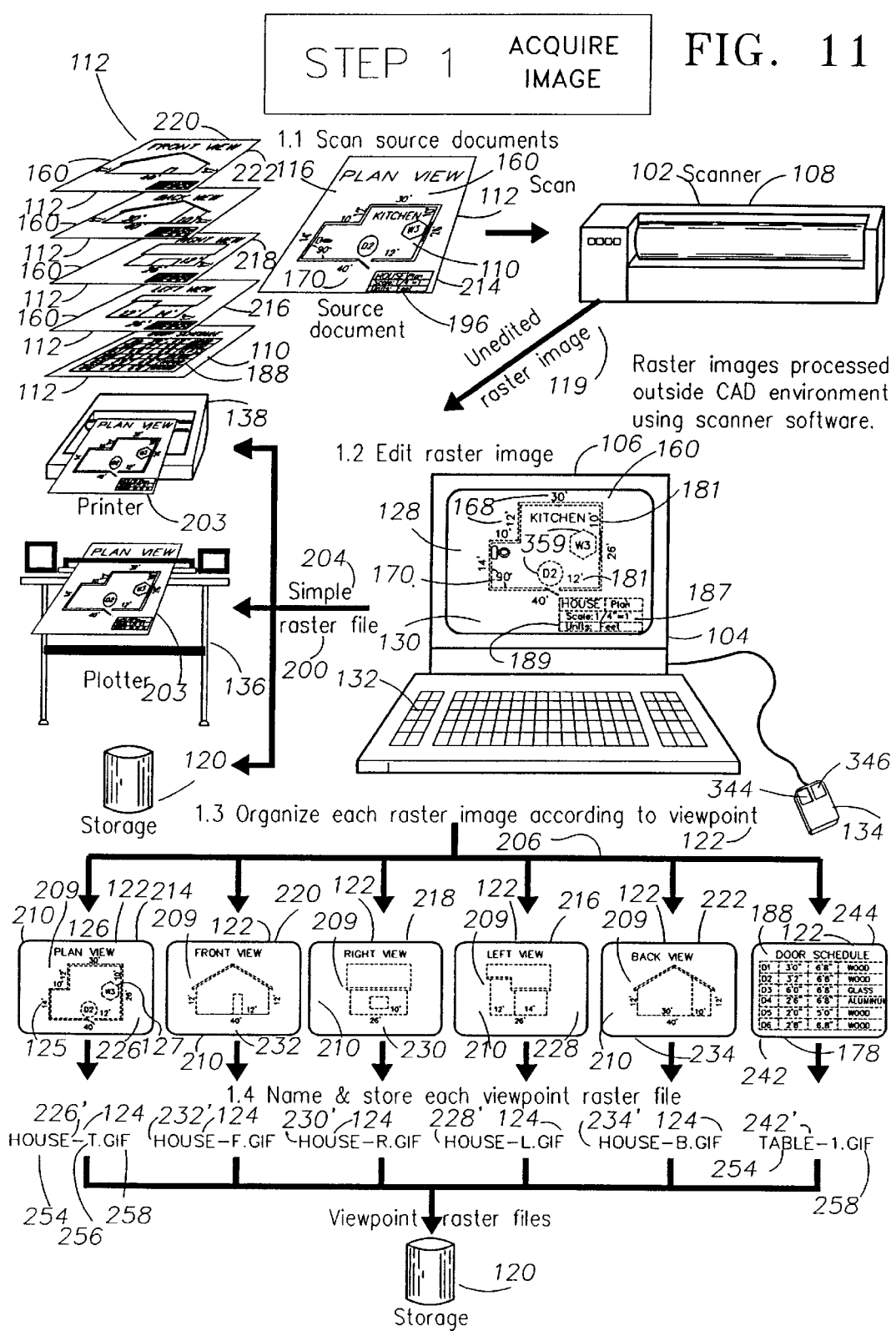
FIG. 11 is a diagram illustrating the automated conversion system and method of the present invention and further detailing Step 1 of FIG. 2 for the architectural plan of FIG. 18.

Alternatively, for architectural plans 192 since different views 160 are typically represented on a plurality of separate sheets 112' as shown in FIG. 18. The sheets are scanned sequentially, as shown in FIG. 11, and a separate raster image 119 is created, for each sheet 112' scanned. Each raster file image 119 is then edited to remove artifact and organized according to a viewpoint 226, 228, 230, 232, 236, 240 and bottom viewpoint and to any floating viewpoint 242, named as described in step 1.4 and stored as a set of digitized viewpoint raster file(s) 124.

In step 1.4, each of the digitized viewpoint raster files 124 is given a file name 252 consisting of three components: a general file name 254, a viewpoint designation 256 (corresponding to the view on the hard copy source document) and a suffix indicating the raster file format 258. The digitized viewpoint raster file 124 is then stored under the file name. The general file name 254 can be any name that relates to the 3D object or to the project. The viewpoint designation 256 using the aforementioned short abbreviations, T, L, R, F, B, Bo, I, P or FV is used. The abbreviation GIF is used to indicate the raster file format 258.

For the engineering drawing 190, the digitized viewpoint raster file is given a general file name 254 such as "WIDGET". Each view is named by adding viewpoint designations 256 to the general file name 254 followed by the raster file format 258, e.g. WIDGET-T.GIF, WIDGET-F.GIF, WIDGET-R.GIF, and WIDGET.-I.GIF. Thus, a top viewpoint raster file 226' named WIDGET-T.GIF corresponds to the top view 214. A front viewpoint raster file 232' named WIDGET-F.GIF corresponds to the front view 220. A right side viewpoint raster file 230' named WIDGET-R.GIF corresponds to the right side view 218, and an isometric viewpoint raster file 240' named WIDGET-I.GIF corresponds to the isometric view 238 of the engineering drawing 190 scanned. Other engineering drawings may have other views shown and suitable viewpoints are assigned to these views and file names given to the digitized viewpoint raster files. For any tabular information, charts or schedules on the document, the general file name 254 may be used along with the abbreviation "FV" for floating viewpoint 242 and the raster file format 258 "GIF.", to provide a floating viewpoint raster file 242', e.g. "WIDGET-FV.GIF". In FIG. 4, this raster file corresponds to the "TABULAR DIMENSION" table scanned off the engineering drawing 190, shown in FIG. 3. Alternatively, as shown in FIG. 11, the general file name 254 may be an indicator of what it represents, e.g. "TABLE" with a raster block named by adding a viewpoint designation 256 to the general file name 254 followed by the raster file format 258, e.g. "TABLE-1.GIF". In FIG. 11, this viewpoint raster file "TABLE-1.GIF" is a floating viewpoint raster file 242', corresponding to the "DOOR SCHEDULE" scanned from the document 112.

The viewpoint raster file 124 has a viewpoint raster text 125 file corresponding to the alphanumeric text, a viewpoint raster graphic file 126 (corresponding to a drawing graphic 167) and a viewpoint raster symbol file 127, corresponding to the symbols 174 on the drawing.

Steps 1.1–1.4 are accomplished using the scanner software. The named raster viewpoint files 124 are preferably stored in an AUTOCAD directory in the CAD operating program in raster file format.

STEP 2

Figure 5:
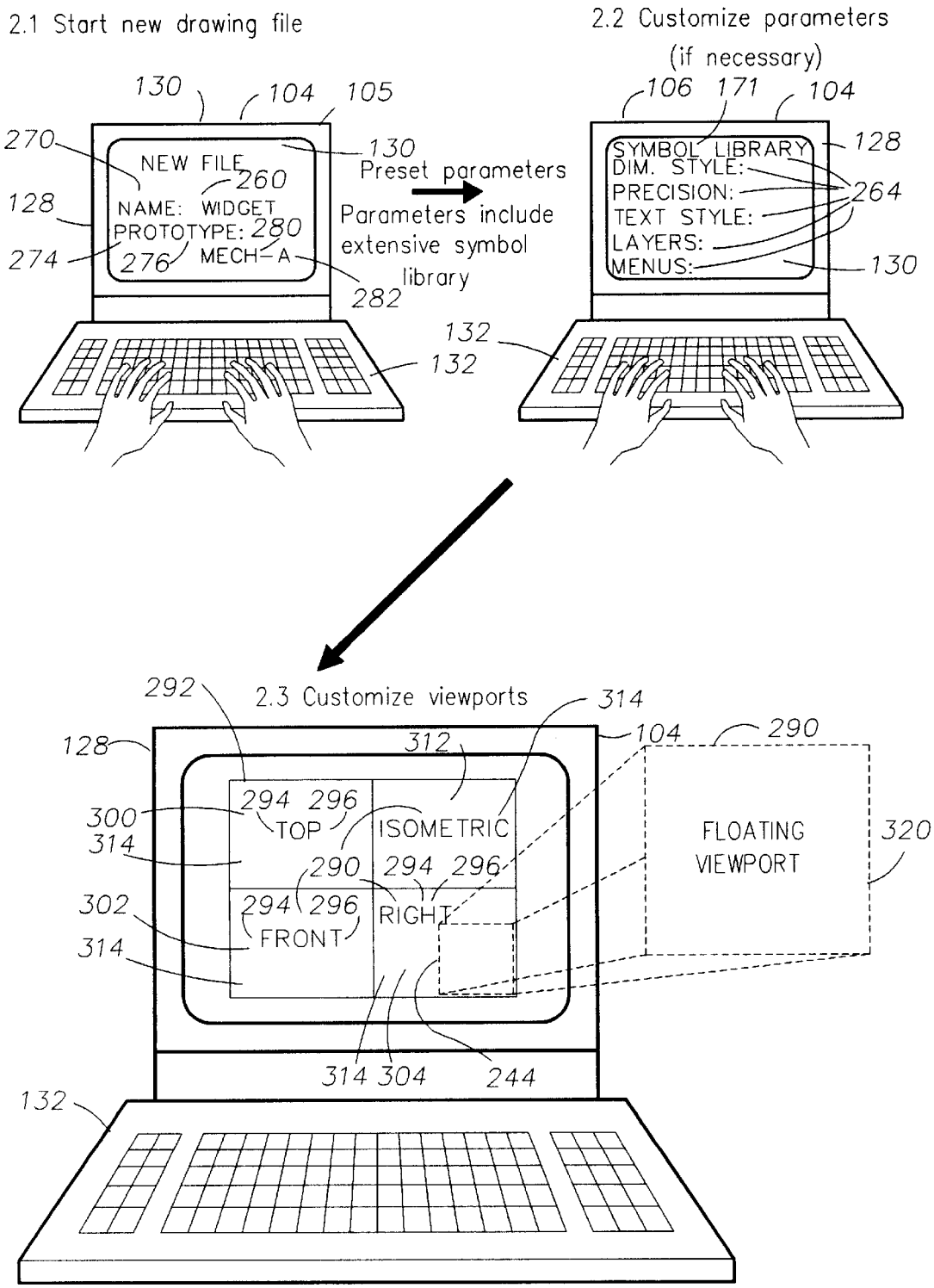
FIG. 5 is a diagram illustrating the automated conversion system and method of the present invention and further detailing Step 2 of FIG. 2 for the engineering drawing of FIG. 3.

Step 2 of setting up a CAD drawing file is illustrated in steps 2.1–2.3 of FIGS. 2, 5 and 12. Prior to conversion of the alphanumeric text 168, 170, 180, 181, 194 and symbols 174 in steps 6 and 7, the user creates a CAD drawing file 260 which includes a raster file format and a set of parameter settings 264 of a drawing 266 to be constructed. In step 2, the user enters the CAD environment in the computer 104. Creation of the CAD drawing file 260, including selection of basic parameter settings 264 and setting up of the drawing file 260 is radically different from prior art methods. In the prior art, conventional CAD drawing methods have been used to produce a set of vector drawings which look like drawings on the face 116 of the original document 112. Conventional methods use some form of line tracing or graphics recognition to produce vectors which overlay the raster image. The resulting prior art vectors are only visually accurate and, at that, only as accurate as the drafter of the source documents. Since a three dimensional drawing demands that the edges of the 3D object fit together exactly, prior conversion practices are not accurate enough to be suitable to generate the necessary vectors to do this.

Since this invention uses the alphanumeric text 168, 170 relating to the physical dimensions and edges of the 3D object to produce mathematically accurate vectors 268 corresponding to these physical dimensions and edges, it is possible to achieve mathematically accurate results in each view 160 and therefore it is possible to generate an accurate three dimensional vector file 269 corresponding to the physical dimensions and edges of the 3D object. Most advantageously, the edges of the 3D object fit together using the present invention. The selection of basic parameter settings 264 and the setup of the CAD drawing file 260 is accordingly radically different from that used in the prior art.

In step 2.1, the user assigns the CAD drawing file 260 a file name 270 that corresponds with the general file name 254 of the viewpoint raster file name 252 given in step 1.4. In step 1, e.g. for FIG. 4, the file name 254 is "WIDGET" and in step 1 for FIG. 11, the file name is "HOUSE".

The user then selects a prototype drawing file 274 which matches a type 276 of document(s) 112 scanned. In the present invention, prototype drawing files 274 fall into two major types 276: "ARCH" drawing types 278 for architectural drawings/plans 192 and "MECH" drawing types 280 for mechanical engineering drawings 190. These two major types 276 are further subdivided into prototypes drawing files 274 based on a sheet size 282 of the hard copy document 112. These sheet sizes 282 are "A" for 8.5 inch by 11 inch, "B" for 11 inch by 17 inch, "C" for 18 inch by 24 inch, "D" for 24 inch by 36 inch and "E" for 36 inch by 48 inch documents. Thus the prototype drawing files 274 are labeled "ARCH-A", "ARCH-B", "ARCH-C", "ARCH-D", "ARCH-E", "MECH-A", "MECH-B", "MECH-C", "MECH-D" and "MECH-E" according to the type 276 of source document 112 and the sheet size 282 of the source document 112.

The chosen prototype drawing file 274 is preset with one or more parameter settings 264 to cover most typical mechanical drawings. The parameter settings 264 include settings for precision, dimension type (e.g. meters, inches), line types, menus, layering and font styles. This invention requires use of Optical Character Recognition (OCR) software and Optical Symbol Recognition (OSR) software. The parameter settings 264 for optimizing both OCR recognition and OSR recognition is also included as part of the prototype drawing file 274. This will be discussed in more detail in steps 4 and 5.

Also, the user has the opportunity to customize any parameter settings 264. These customized prototype drawing files are saved as separate prototype drawing files or are limited for use in the current prototype drawing file.

In addition to the preset parameter settings 264, each prototype drawing file 274 also includes a set of viewports 290 corresponding to the previously described views 214, 216, 218, 220, 222, 224, 238 and the perspective view. These viewports 290 conform with conventional mechanical drawing views, but may be customized to include a floating viewport 320, as needed. The viewports 290 are set up in what is conventionally known in AUTOCAD as "paperspace". Depending upon the prototype drawing file 274 chosen, the user is presented with several preset page layouts 292, hereinafter, "pages", of appropriate size of the viewports 290. The user may plot these page layouts 292 at desired settings (e.g., MECH-A prototype pages plot out on a paper at 11 inches by 8.5 inches, or e.g., ARCH-E prototype pages plot out on a paper at 36 inches by 48 inches). Each of the preset "pages" 292 has an array of viewports 290. The viewports 290 can be thought of as holes cut out of paper through which a particular view 160 can be seen. The user selects the "page" 292 which matches the drawing views 160 as recorded on the source document(s) 112. Here in Example 1, shown as step 2.3 on FIG. 5, an 11 inch by 8.5 inch "page" 292 containing four views 160 (see, FIG. 3) is selected. All the other "pages" 292 are automatically not displayed. The viewports 290 may be modified, if needed, in several ways. More "pages" 292 can be created; viewports 290 can be expanded or contracted in size; viewports 290 can be located on separate "pages" 292.

Each viewport 290 has a name 294 based on one of the standard six orthographic views 212. Thus, six orthographic viewports 296 are named, a TOP viewport 300, a FRONT viewport 302, a RIGHT viewport 304, a BOTTOM viewport (not shown), a BACK viewport 308, and a LEFT viewport 310, to correspond to the corresponding orthographic views, 214, 220, 218, 224, 222 and 216, respectively. In addition, an ISOMETRIC viewport 312 and a PERSPECTIVE viewport, may be set up to correspond to the isometric view 238 and the perspective view, if present on the source document 112. The isometric viewport 312, the perspective viewport and the orthographic viewports 296 are also called fixed viewports 314. The viewports 290 selected in the CAD drawing file 260 are those as shown/recorded on the source document 112. For example, for the mechanical drawing of FIG. 3, the CAD drawing file 260, as shown in FIG. 5, is given the CAD drawing file name 270, "WIDGET", and the viewports 290 are named TOP, FRONT, RIGHT and ISOMETRIC. Along with the fixed viewports 314, one or more floating viewports 320 may also be used. The floating viewport 320 is called FLOATING VIEWPORT. The floating viewport 320 is primarily used to capture and present the symbol property 178. Similarly, for architectural drawings 192, appropriate fixed viewports 314 and floating viewports 320 containing the symbol property 178 are created. Fixed viewports 314 and floating viewports 320 are collectively referred to as viewports 290. The floating viewport 320 appears in a moveable window 244 on the screen 130. The moveable window 244 is manipulated, enlarged, or diminished in a manner well known to anyone familiar with WINDOWS® operating environment software. The floating viewport 320 "floats" over a currently used underlying fixed viewport 314. The window 244 is set to activate automatically as a part of a command, or is called up at any time by the user. For example, the command sequence "Attribute Symbols" (step 5.3) (which will be discussed subsequently) automatically displays the OSR program and the floating viewport 320 containing the symbol property 178, e.g. information/data regarding the symbol 174.

For the purpose of converting a mechanical drawing 190, 192, the user is primarily concerned with the basic three orthographic projections: the top view 214, the front view 220 and the side view 216 or 218, and hence, their corresponding viewports, the top viewport 300, the front viewport 302 and the side viewport 304 or 310. As is known in AUTOCAD, each of the fixed viewports 314 has its own User Coordinate System (UCS). The UCS conveniently allows the user to view each view 160 as though it is a two-dimensional plan view. In the UCS, for each of the viewports there is a horizontal direction, hereinafter, "X" or "X coordinate" and a vertical direction, hereinafter, "Y" or "Y coordinate". This is true even if the viewport, e.g. the view is in the XY, XZ, or YZ plane corresponding to the front view, top view, or side view. Hereinafter prompts "X" or "Y" are in the UCS and refer to the "horizontal direction" and the "vertical direction". Using the AUTOCAD software, a UCS vector created in each UCS for a particular orthographic viewport is automatically converted into a corresponding vector 268 having 3D coordinates, e.g. "X, Y, Z" in the three-dimensional World Coordinate System (WCS). Because of the AUTOCAD software, the drawing in the ISOMETRIC viewport 312 (or the perspective viewport) is constructed indirectly. As the vectors 268 of the orthographic viewports 296 are produced according to the present invention, the vectors 268 appear simultaneously as vector lines 322 or vector curves 324 in the isometric viewport 312 (or the perspective viewport). The vectors 268 are combined to create a vector file 269 representing the 3D-object in a 3D space. As a vector 268 is produced in the UCS, it is given a set of 2D coordinates 332 in the UCS and also automatically given a corresponding set of 3D coordinates 334 in the WCS. The WCS serves as an absolute framework within which all the vectors 268 are integrated and the 3D object defined in the vector file 269. The vector file 269 may be used to create a 3D computer model, e.g. perspective view, or isometric view which can be further manipulated. The vector file 269 also may be used in association with a standard Computer Aided Manufacturing (CAM) program to generate the 3D object In addition, each viewport 290 has its own current viewport layer 336 which serves as the layer upon which the digitized viewpoint raster file 124 is placed. The viewport layers 336 are named according to the viewpoint raster files 124 (raster-t for top, raster-f for front, raster-FV for floating view, etc.). The layer 336 for one viewport 290 is frozen in all other viewports 290 so that each viewport 290 has only its corresponding viewpoint raster file 124 view as the current viewport layer 336.

Also the CAD applications program advantageously has another preset parameter setting 264, a preset symbol library 171. The preset symbol library 171 according to the present invention includes the aforementioned standardized symbols, (e.g., common abbreviations and common graphical symbols used in technical drawings, such as, but not limited to, those described in industry standards, such as, those in standard technical drawing books, and in existing CAD drawing programs), the disclosures of which are incorporated herein by reference. The symbol library 171 contains vector-based shape files of each of the symbols as well as preset "attributed" symbols corresponding to specified dimensions of the standardized symbols, (e.g., the physical dimensions and edges of a moiety the standardized symbol represents). Creation of attributed symbols will be explained in step 5 and in step 5 in Examples 1 and 2.

Also the standardized symbols which are content symbols 176 may be imported from databases having the vector-based shaped file for the symbol as well as the symbol properties 178 in CAD useable vector format corresponding to the standardized symbol.

In step 2.2, the aforementioned preset parameter settings 264 of step 2.1 are further customized if needed. In some cases it may be necessary to change some of the preset parameter settings 264, such as, text parameters for measurement unit type (e.g. inches, meters), precision settings, text size (measured in pixels) and dimensioning style. Preset parameter settings 264 are chosen according to the prototype drawing type 276. These parameter settings 264 are selected to achieve optimal recognition levels for the symbols 174 and alphanumeric characters 168, 170, 180, 181, 194 typically used in different types of drawings. For example, the OCR is optimized to recognize dimensions expressed in feet (') and inches (") and to recognize numbers "0, 1, 2, 3, 4, 5, 6, 7, 8, 9" as well as the alphabet letters, and text strings, such as those alphanumeric text strings used for the symbols 174 in the preset symbol library, the disclosure of the alphanumeric text strings of the aforementioned standardized symbols is herein incorporated by reference, and any punctuation marks and frequently used sequences of text, such as "cm" or "ft" or "feet". The alphanumeric text strings used for the standardized symbols include, but are not limited to standardized thread descriptors, such as, but not limited to standard metric and English thread notes e.g., "⅜-24 UNF-2A", symbols "√", "⊥", terms such as, "DEEP", "DEPTH", "COUNTERBORE", "CBORE", "CSINK", "COUNTERSINK", "DEGREES", "SQUARE", etc. The OSR is optimized to recognize the symbols 174 found in the symbol library and also for such structural elements as doors or windows.

If symbols 174 are used in the document 112, which are not present in the symbol library 171, the user can add symbols 174 to the library by constructing vector drawings to match the raster symbol. A toolbox containing several common shapes, simple vector elements and basic CAD tools enables the user to easily assemble vector based symbols. This is discussed in step 5.2.

In step 2.3, the viewports 290 are customized, if needed. The user sets each viewport 290 to a current layer 336 named after the view 160/viewpoint 124. The user can customize the viewports 290 if the preset page layout 292 is inadequate. An orthographic viewport 296 can be deleted; additional viewports can be created, such as, an isometric viewport 312 or a perspective viewport. The user may also customize the CAD drawing file 260 by setting up one or more floating viewports 320. In step 2, an organized array of viewports 290 is created in the CAD environment into which the viewpoint raster files 124 are systematically imported.

STEP 3

Figure 6:
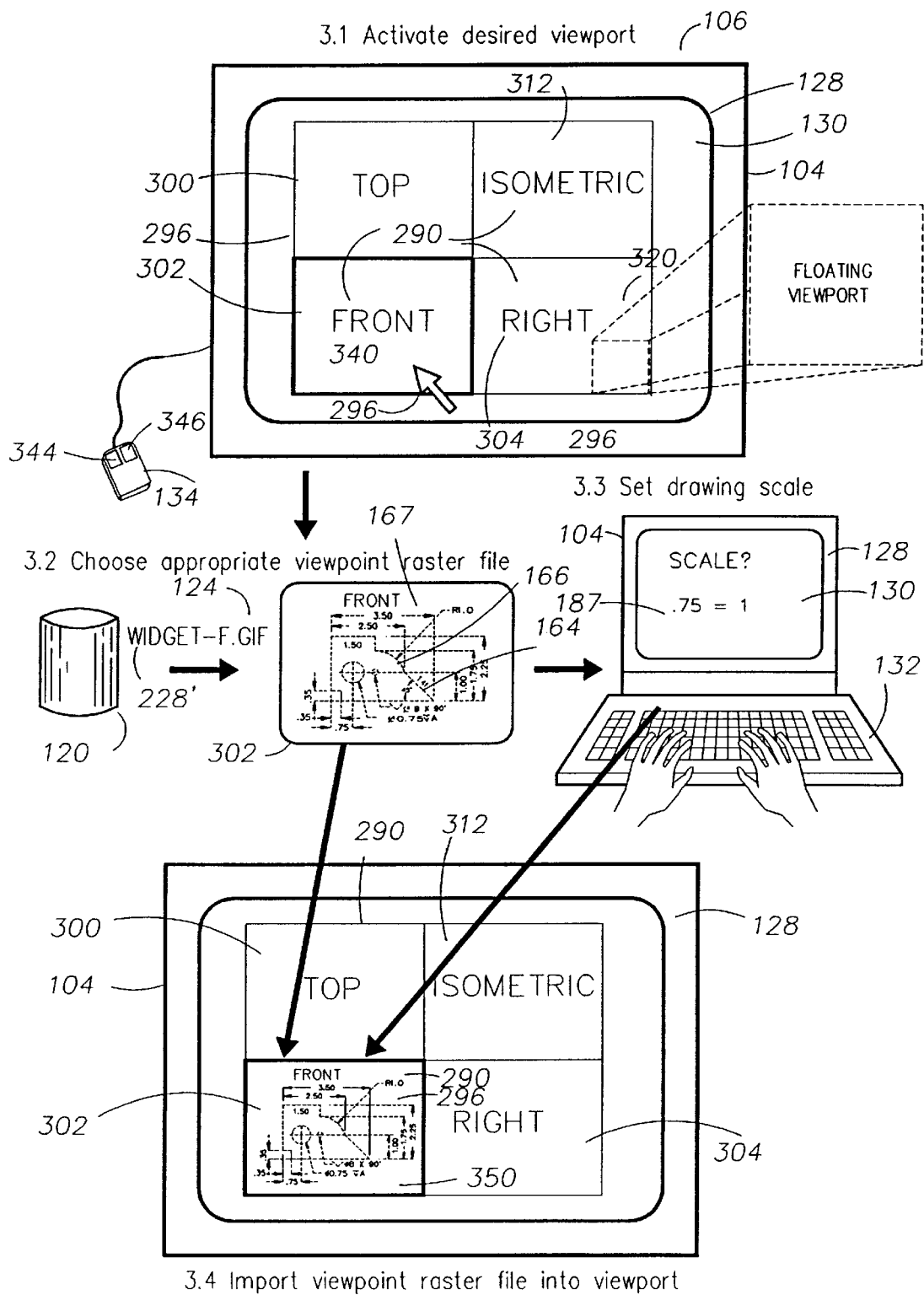
FIG. 6 is a diagram illustrating the automated conversion system and method of the present invention and further detailing Step 3 of FIG. 2 for the engineering drawing of FIG. 3.
Figure 13:
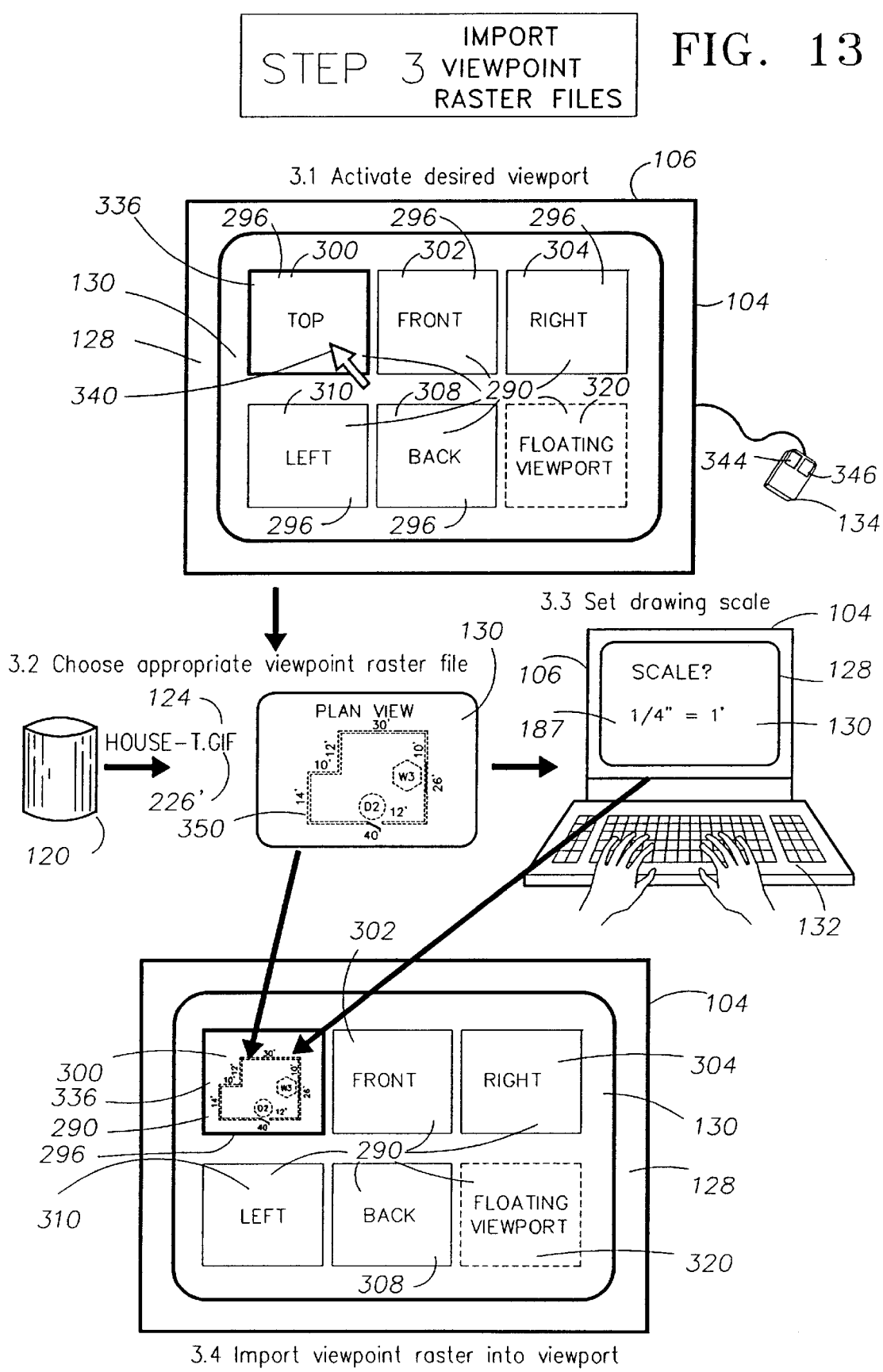
FIG. 13 is a diagram illustrating the automated conversion system and method of the present invention and detailing Step 3 of FIG. 2 for the architectural plan of FIG. 18.

Step 3 of importing the raster files is illustrated in steps 3.1–3.4 of FIGS. 2, 6 and 13. In the present invention, in step 3, each digitized viewpoint raster file 124 is imported from storage into a corresponding viewport 290 of the CAD drawing file 260 using a "RASTERIN" command, available in the AutoCAD™ 14.0 software environment. The CAD environment also includes software capable of converting the viewpoint raster graphic files 126, the viewpoint raster symbol files 127, and viewpoint raster text files 125 into a format usable in the CAD environment, such as Hitachi's IMAGE TRACER PROFESSIONAL™ software.

Practically the entire computer automated conversion system 100 and method uses the mouse 134 to enter selected choices from the screen 130 into the computer 104. As is known in the art, a position of the mouse 134 is indicated by a flashing cursor 340 on the screen 130. When some information appearing on the screen 130 is to be selected or chosen, the user moves the cursor 340 to a position on the screen at the location of the information and then the user depresses, e.g. clicks, an appropriate button, on the mouse 134. This transports the selected choice of information into the computer 104 for use in practicing the method of the present invention is accomplished in the WINDOWS® software environment. The mouse 134 has a left mouse button 344 and a right mouse button 346. The left mouse button 344 is used to execute a function by picking the selected information, e.g., either the alphanumeric text 168, 170, 180, 181, the symbols 174, the viewports 290, a starting point 402, an origin 400, the viewpoint raster files 124, vectors 268, a vector end point 406, or a vector beginning point 404, etc. The right mouse button 346 generally passes on the default or a pick and invokes an option or a series of options, as will be explained later. As used throughout herein, "pick," "picking," "picks on," "picking on," "pick upon," or "picked" means to move the cursor 340 to the location of the information or choice on the screen and to depress the appropriate mouse button of the mouse 134 and thereby transport the selected information choice to the appropriate location in the method, e.g. OSR, OCR, COGO routine, etc.

In step 3.1, the user picks a chosen viewport 290, or names the desired viewport 290 using a AUTOCAD "VIEW" command. This activates the selected viewport 290. As is known in the art, the viewport 290 may be enlarged to fill the screen, using standard CAD features, such as "FIT TO SCREEN" commands.

In step 3.2, once the selected viewport 290 is active, the user selects the appropriate viewport raster file 124 which corresponds in orthogonality to the viewport 290 selected. The user selects the name of the raster viewpoint file 124 to be imported. For example, "WIDGET-F.GIF", the front viewpoint raster file 228', is selected by picking the import option in the "file" pulldown menu familiar to AUTOCAD users. Thus, the user selects a raster viewpoint file 124 corresponding in orthogonality to one of the selected orthographic viewports 296, or to an isometric viewport 312, or to a perspective viewport, or to a floating viewport 320 for symbol properties 178. For example, if a top viewport 300 is activated, then the top viewpoint raster file 226' for the top view 214 on the scanned source document 112 is selected.

In step 3.3 the AUTOCAD program prompts the user for the drawing scale 187. The user enters the drawing scale 187 shown on that part of the source document 112 corresponding to the viewpoint raster file 124 to be imported or shows up on the title block 196.

In step 3.4, the user then imports the appropriate viewpoint raster file 124 into the viewport 290 by picking an appropriate command (e.g. "RASTERIN" in AUTOCAD 14). The viewpoint raster file 124 is automatically imported at that selected drawing scale 187 into the activated viewport 290.

In the CAD environment, the physical dimensions are considered to be real world dimensions. The drawing scale 187 is generally a function of the plotting process and it is typically chosen to advantageously display the drawing views 160 on the document 112. Thus, an edge of the 3D object which is five inches long in the real world is also five inches in the CAD environment regardless of the drawing scale 187. A plan view (top 214, bottom 224, front 220, or back 222) drawn at a ¼"=1' scale meshes perfectly in the CAD environment with a side view 216, 218 drawn at ⅛"=1' scale.

Drawing scale 187 is also extremely important in properly introducing a viewpoint raster file 124 since the scale expresses a ratio of between the size of a viewpoint raster file image 350 and the actual size of the 3D object represented to the CAD environment. Generally, keying in the drawing scale 187 in response to the prompt for scale 187 is sufficient to enter the viewpoint raster file 124 into the viewport 290 in the proper drawing scale 187. However, if the document 112 was, for example, a reduced copy of an original drawing view 160, the viewpoint raster file 124 would need to be adjusted to fit the scale 187. The CAD environment enables the user to check the accuracy of the importation process. The user merely inquires as to an apparent length between two points of a known physical dimension, recorded on the document 112. If the apparent length and the known dimension, (which is shown as alphanumeric text 168 on the document 112 in a position which relates it to the specific edge of the 3D object) are essentially equal, then the entry has been properly performed. If they are different, then the viewpoint raster file 124 can be adjusted by a factor of the known dimension divided by the apparent length. For example, if the known dimension, e.g. the length of an edge is given as 5 inches. However, suppose the viewpoint raster file image of that edge measures only 2.5 inches (the apparent dimension). By dividing the known dimension by the apparent dimension, one would determine a factor of 2. The image viewpoint raster file 350 is then appropriately enlarged to 2 times its original size.

Checking and adjusting the scale 187 of the viewpoint raster file 124 is important because the viewpoint raster file image 350 in the viewport 290 serves as a backdrop to the production of the vectors 268. The role the of the viewpoint raster file image 350 in the process of this invention radically differs from the role in prior art raster to vector conversion method. Typical prior art conversion software uses the raster image 119 as the basis for the vectors. Prior art 3D vector drawings are effectively graphic tracings of the raster images 119. In the method of this invention, 3D vectors 268 are produced according to the mathematical data content inherent in the alphanumeric text 168, 170, 180, 181, the symbol properties 178, and the symbols 174. The viewpoint raster file image 350 in the viewport 290 serves two functions. The viewpoint raster file image 350 provides the basis for OSR and OCR conversions. That is, the OCR recognizes raster text from the alphanumeric text 168, 170, 180, and 181 in the viewpoint raster file 124 and converts it into a corresponding ASCII text 352 (recognized alphanumeric text), and the OSR recognizes raster symbols and converts them into vector based symbol blocks, as will be explained later. ASCII text 352 corresponds to a first recognized alphanumeric text 168, 170, a second recognized alphanumeric text 180 and a third recognized alphanumeric text 181. Secondly, the viewpoint raster file image 350 in the viewport 290 provides a backdrop for which the vectors 268 overlay and in this capacity serves as immediate quality assurance on the accuracy of the conversion.

The viewpoint raster file image(s) 350 are each on separate layers. Thus even if these images 350 originate from different drawing scales 187, they are all converted to the same overall dimensioning framework. However, most mechanical drawings 190, 192 are composed of views 160 in the same scale. Thus, when importing the viewpoint raster file 124 sequence of steps 3.1–3.4, in step 3.3, the user responds to the drawing scale 187 prompt by picking a particular drawing scale 187 from a list of possible drawing scales 187. This selected drawing scale 187 becomes the default scale for all views 160 and viewpoint raster files 124.

Ultimately, all the lines 164 and curves 166 of the drawing views 160 of the document 112 are expressed as vectors 268 in the World Coordinate System (WCS). As is known in the art, this system is composed of three dimensional X, Y, Z coordinates. A three dimensional vector file 269 corresponding to the physical dimensions and edges of the 3D object is created by aligning the lines 164/curves 166 corresponding to edges of the 3D object, using the common origin X=0, Y=0, and Z=0 as an index. However, for simplicity's sake, the orthographic projection of the 3D object represented in each view 160 is drawn in its own User Coordinate System (UCS). This allows the user to approach each drawing view 160 from essentially a plan view. Thus, a front view 220 of the "WIDGET" is presented as though it was lying flat on the drafting table.

Once the viewpoint raster file 124 has been imported into the viewport 290 in step 3.4 it is, by default, placed on the current viewport layer 336 in that viewport 290. The current viewport layer 336 (e.g. RASTER-F is current layer of viewport front) in one viewport 290 is frozen in all other viewports 290 so that only the viewpoint raster file 124 pertinent to each specific viewport 290 is displayed accordingly. At this point the arrangement of the viewpoint raster file image 350 superficially resembles the digitized raster file 200,204 in a prior art conversion. The important difference is that in the prior art, all the images on the digitized raster file 200, 204 are essentially on one viewport 290. In the method of this invention, each viewpoint raster file image 350 is in a separate viewport 290 and represents a specific orthogonal projection (and orthographic projection) of the 3D object.

The user repeats steps 3.1 to 3.4 to import each digitized viewpoint raster file 124 into its corresponding viewport 290 in the CAD environment. For the floating viewpoint files 242, the scaling step is not performed. In each viewport 290, only the current raster layer 336 of that viewport 290 is displayed on the screen 130.

STEP 4

Figure 14:
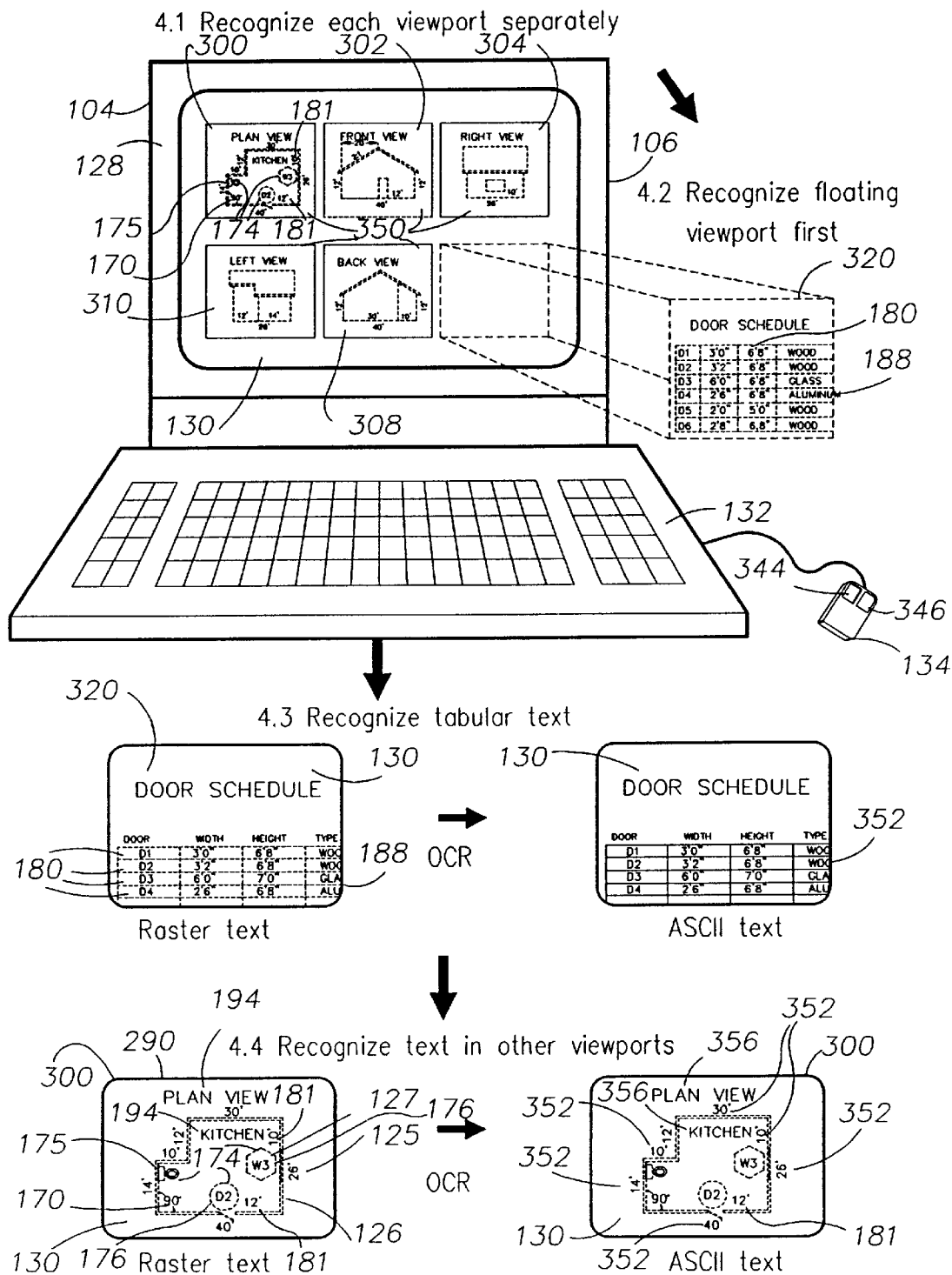
FIG. 14 is a diagram illustrating the automated conversion system and method of the present invention and further detailing Step 4 of FIG. 2 for the architectural plan of FIG. 18.

Step 4 of recognizing the text is illustrated in steps 4.1–4.4 of FIGS. 2, 7 and 14. In step 4, in the CAD environment, the alphanumeric text 168, 170 relating to a plurality of physical dimensions and a plurality of edges of the three dimensional object and the alphanumeric text 180 relating to the symbol properties 178 of a symbol 174 and the alphanumeric text 181 relating to the moiety's insertion point 182 into the 3D object is recognized and converted into ASCII text 352 via the optical character recognition (OCR) software. The viewpoint raster file 124 is processed by the OCR subroutine. The preferred standard OCR conversion program uses Hitachi's IMAGE TRACER PROFESSIONAL™ OCR software.

In step 4.1, the alphanumeric text 168, 170, 180 and 181 displayed on the viewpoint raster file image 350 in each viewport 290 is recognized separately. It is at this point that the user chooses different strategies depending upon the type of prototype drawing 276 and the information present on the mechanical drawing 190, 192. In a mechanical drawing, such as an engineering drawing 190 or an architectural drawing (or plan) 192 having symbols 174 thereon, there are four important sets of information which are captured by the recognition process (both OCR and OSR). These sets of information are: the alphanumeric text 168, 170 relating to the physical dimensions and edges of the 3D object itself, the alphanumeric text 180 relating to the symbol property 178, and the alphanumeric text 181 information relating to the insertion point of the moiety represented by symbol 174, and the symbol 174 used in the mechanical drawing 190, 192. The viewpoint raster file images 350 in the viewports 290 consist of three main types of information: a viewpoint raster graphic 358, relating to the drawing view 160, alphanumeric text 168, 170, 180, 181, and raster images 359, hereinafter, also "raster symbols 359", of the symbols 174. In the method of the present invention, the alphanumeric text 168, 170 associated with the physical dimensions and the edges of the 3D object and the alphanumeric text 180 of the symbol property 178 of any symbol 174 and the alphanumeric text 181 is the basis for the vector production corresponding to mathematically accurate vector 268 for the 3D object and mathematically accurate vectors 500 for the moiety the symbol represents. The role of the viewpoint raster graphic 358 is merely a rough check on the geometry of the vectors 268 being produced by the method of the present invention but the viewpoint raster graphic 358 is not directly converted into the vectors 268.

It is not necessary for the conversion program software to convert the raster graphic 358 into vectors 268 because this is accomplished more accurately by the present invention.

The viewpoint raster alphanumeric text 168, 170, 180, 181 is converted into ASCII text 352 (e.g. recognized alphanumeric text 168, 170, 180, 181) with an OCR operating in the CAD environment. The OCR is capable of recognizing alphanumeric text at any angle. As has been explained, OCR text parameters are preset in the prototype CAD drawing file 274 to maximize recognition of the dimension and style of the type of prototype drawing file 276 to be converted. After the alphanumeric text 168, 170, 180, 181 has been recognized, the user can then edit the resulting ASCII text 352 if necessary. The preset OCR parameters can automatically subject questionable text recognitions to user review.

In step 4.2, the alphanumeric text 180 (of the symbol property 178) in the floating viewports 320, is selected for recognition first because the symbol properties 178 are essential to the symbol recognition process of step 5. For these viewports 320, the OCR text recognition parameters are preset to maximize the recognition of alphanumeric text in a tabular format with tolerances for acceptable degrees of ambiguity and to alert user to possible errors. Recognition of the alphanumeric text 180 in the floating viewports 320 is optimized by setting the text recognition parameters to the horizontal mode. Typically recognition rates in this mode are faster and more accurate than a mode set to read text at any angle.

In step 4.3, the alphanumeric text 180 in the floating viewport 242 is recognized. The recognized tabular text (ASCII text 352) is automatically placed on an appropriate text layer (e.g. WINDOW-TXT, DOOR-TXT, CURVE-TXT) which indicates the symbol property 178, or the ASCII text 352 on the floating viewport 242 is placed on layer TEXT-FV. If necessary, the user may edit the ASCII text 352 to correct OCR recognition errors. After the alphanumeric text recognition has taken place, any lines which comprise an element of the table 188, schedule, legend, chart or graph are recognized by the graphics recognition software operating in the CAD environment according to preset parameters optimizing the vectorization of typically evenly spaced vertical and horizontal lines.

In step 4.4, the alphanumeric text/raster text 168, 170, 181 in the other viewpoints 290 is recognized. (Any other alphanumeric text 194 is also recognized in steps 4.3 and 4.4 and converted into ASCII text 356.) Here the OCR parameter settings are preset to read text at any angle. The OCR parameters settings are preset to distinguish nonmathematical text strings 366 such as "BEDROOM," "KITCHEN," from physical dimension text mainly by size and somewhat by content. OCR parameters are set such that any text over a given height is recognized and placed on a different text layer 360. Moreover, OCR parameters are preset to optimize recognition for commonly used text strings such as "BEDROOM" or "KITCHEN". The order in which the alphanumeric text 168, 170 181 in other viewports 290 is recognized is not critical. As the alphanumeric text 168, 170, 181 is converted from raster text to ASCII text 352 in each viewport 290, the corresponding ASCII text 352 is automatically placed on a layer 360 indexed to the viewport 124 such as TEXT-T (top viewport), TEXT-F (front viewport) or TEXT-R (right viewport). These layers 360 are frozen in all but the appropriate viewports 290. The alphanumeric text 168, 170, 181 in the viewports 290 could be recognized simultaneously with the symbols 174 in the same viewport 290 (see step 5.6). Although each viewport 290 is recognized independently, in the preferred embodiment, a batch process may be used, in which text recognition automatically proceeds from one viewport 290 to the next. Alternatively, symbols 174 and alphanumeric text 180, 181, 168, 170 text (and also alphanumeric text 194) may be recognized simultaneously using a similar batch process. The recognized alphanumeric text 168, 170, 180 181 (ASCII text 352) is automatically placed on an appropriate layer 360 related to the viewpoint 206 (which layer 360 has already been established as part of the preset parameters). If necessary, the user may edit the ASCII text 352 to correct OCR recognition errors. Recognized alphanumeric text 194 (ASCII text 356) is similarly placed in this layer 360.

In step 4.3 and 4.4, the OCR creates an ASCII text file 362 containing the ASCII text 352 of the converted viewpoint raster file 290. The ASCII text file 362 is analyzed and ASCII text relating to the mathematics of the drawing, i.e., the alphanumeric text 168, 170, 180, 181 relating to the physical dimensions and edges of the 3D object, and to the symbol property 178 of the symbol 174, and to the insertion point 181 of the moiety the symbol 174 represents into the 3D object, hereinafter "mathematical text" 364, is abstracted, either manually or automatically and separated from the "nonmathematical text", if any. As used herein, the term "abstract" or "abstracted", are meant to refer to "mathematical text" 364 being identified, selected and separated from other text (herein after called "non-mathematical text" 366), and placed into a mathematical text file 368 from which mathematical values can later be accessed. The "non-mathematical text" 366, if any, is placed in a nonmathematical ASCII text file 370. Also ASCII text 356 is placed in the ASCII text file 370. In accordance with the present invention, the "mathematical text" 364, i.e., recognized alphanumeric text 168, 170, 180 and 181, e.g. ASCII text 352, is suitably selected by positioning the cursor 340 upon it and by picking it in steps 6 and 7.

STEP 5

Figure 15:
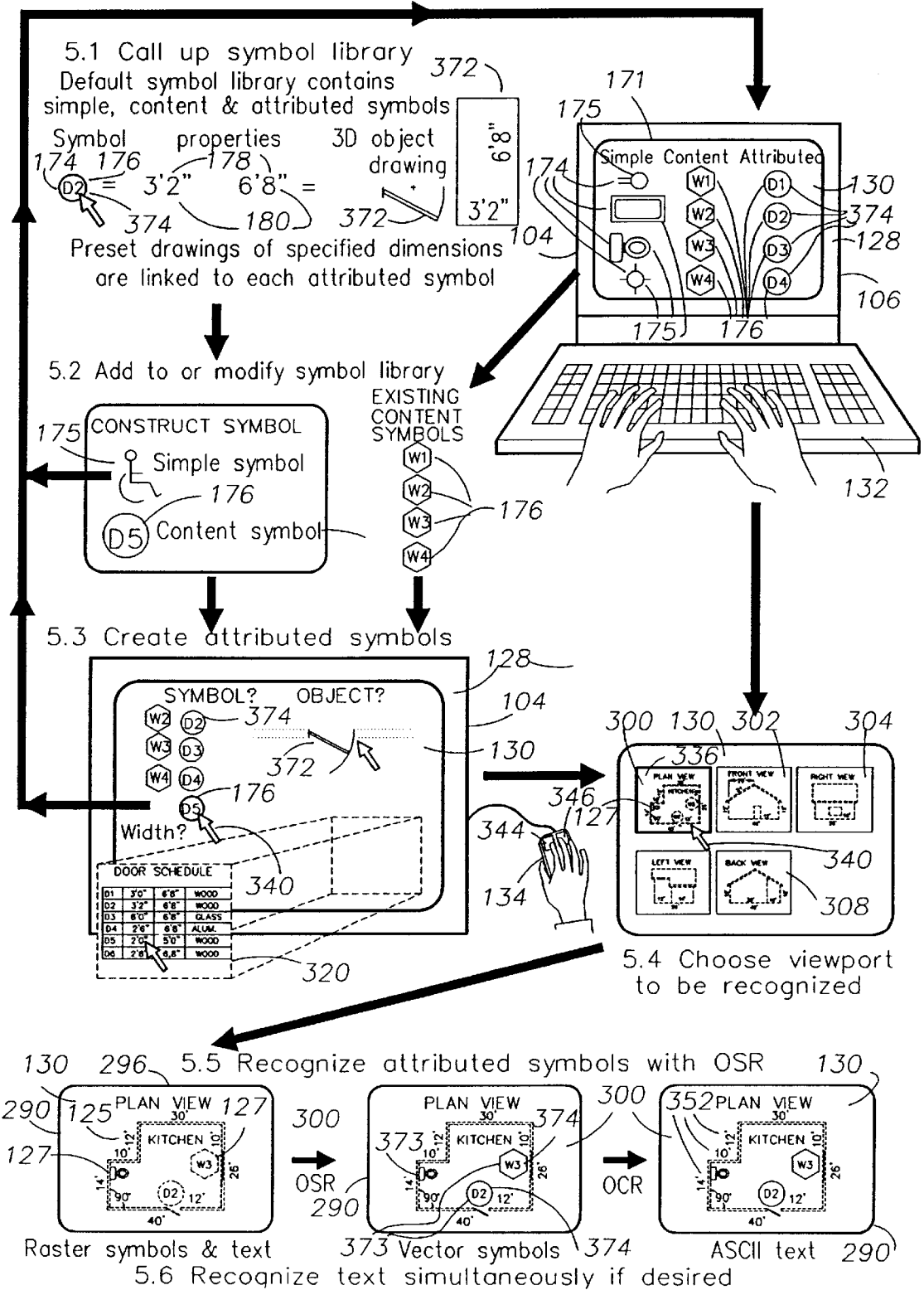
FIG. 15 is a diagram illustrating the automated conversion system and method of the present invention and further detailing Step 5 of FIG. 2 for the architectural plan of FIG. 18.

Step 5 of recognizing the symbols is illustrated in steps 5.1 to 5.6 in FIGS. 2, 8 and 15. In FIGS. 8 and 15, the moiety the content symbol 176 represents is referred to as an "object". In step 5, the symbols 174, including simple symbols 175 and content symbols 176, are recognized using the OSR module operating in the CAD environment. Simple symbols 175 represent moieties such as, e.g., electrical outlets, toilets, furniture, etc., and are located on the document 112 approximately where the moiety is located in the 3D object. Content symbols 176, such as a symbol for a machine screw or a symbol for a door, are each linked to a symbol property 178 such as dimensions for length, (depth) and width and height and represent a moiety. Content symbols 176 are also frequently associated with alphanumeric text 181 related to the insertion point of the moiety of the symbol 176 into the 3D object. Content symbols 176 like simple symbols 175 are represented by a vector-based shape file 372 in the symbol library. The content symbol 176, in addition, has symbol properties 178. Applicant's invention creates an attributed symbol 374 from the content symbol 176. The attributed symbol 374 creates a vector drawing block 371 which is based on the recognized alphanumeric text 180 of the symbol property 178 and places this vector information in the symbol library and associates it with the vector-based shape file 372 in the symbol library 171.

Setting up the symbol library 171 to the user's desired specifications is a prerequisite for symbol recognition and an aspect of the present invention. Included in the OSR software's preset symbol library 171 for engineering drawings 190 and for architectural drawings 192 are preset "attributed symbols" from standardized symbol tables which were preset along with other parameters at the time the prototype drawing file 274 was selected. The OSR operates by comparing the shape and content of a raster symbol 359 to the vector-based shape files 372 included in the symbol library. The raster symbol 359 has a raster shape and may include text elements. The symbols 174 exist in the form of blocks which are typically composed of various vector elements and alphanumeric characters. In the context of a CAD drawing file, a block is treated as a single entity.

In prior art conversion strategies, the symbols 174 are treated as simple symbols 175 and the raster symbol 359 is replaced with a vectorized symbol 373 drawn from its vector-based shape file 372. The present invention attaches mathematical attributes to content symbol 176 and creates attributed symbols 374. The attributed symbols 374 have a set of symbol vectors 500 corresponding to the physical dimensions and shape of a moiety the symbol 174 represents, and which are present in the symbol property 178 of the moiety. The symbol vectors 500 are placed in a vector symbol file 502.

In step 5.2, because views 160 on the hardcopy document 112 may contain symbols 174 not present in preset symbol library, the user may add or modify the symbols in the preset symbol library 171, e.g. also hereinthroughout a default symbol library, as needed. Additions and modifications are saved and the symbol library 171 becomes a most recent symbol library and the default library.

The conversion system of the present invention defaults to the most recent symbol library 172 which contains the standardized symbols as well as any customized symbols which have been created by previous user(s) in previous sessions. If the symbol 174 is not present in symbol library 171, the right mouse button is depressed and the program developed by the inventors prompts "CONSTRUCT SYMBOL". Using the VECTORY SYMBOL™ software, the user creates a customized vector based symbol using standard AUTOCAD commands. The user then chooses the command "CONSTRUCT OBJECT?". A vector drawing of the three dimensional properties of moiety that the symbol represents is created using standard AUTOCAD commands by the user. This creates a 3D vector symbol file 502 for the symbol containing a plurality of 3D vectors 500 which represent physical dimensions, edges and surfaces of the three dimensional moiety. The vector file 502 representing the moiety that the symbol represents is saved as a 3D drawing file after proper editing. The vector-based symbol shape file 372 is linked to the vector file 502 of the moiety, as is known in the art, and both are placed in the default symbol library for subsequent use in step 5.4.

If the symbol 174 is present in the symbol library 171, the user, in step 5.3, sets values for attributed symbols 374. The user picks the appropriate alphanumeric text and vector-shapes to replicate the graphical shape of the raster image of the raster symbol 359 being copied. For the engineering drawing 190 conversion, the user is prompted "SYMBOL?" The user responds by either picking the symbol constructed in 5.2 or by picking a symbol from the existing default symbol library. The user is then prompted, "OBJECT?" The user picks a type of moiety (object) from a preset list, e.g. door, window, screw thread, etc. According to the moiety chosen, the user is prompted for the physical dimensions of that moiety. The user either keys the values in or picks them off the symbol property 178, which has been captured in the floating viewport 320 and converted in step 4. The user is prompted "TABLE" and responds by naming the floating viewport 320 containing the appropriate table 188 which contains the appropriate mathematical values. For example, if the user wants to attribute a symbol 174 for a machine bolt, the user would choose that symbol 174, then choose "Machine Bolt" as the moiety. The user picks the appropriate alphanumeric text in symbol property 178, e.g., the schedule for the specific dimensions of the bolt, including length, diameter, thread angle etc. from the ASCII text 352 generated in step 4.3. These values become attributes of the symbol by using typical block attribution routines well known in the CAD art and the attributed symbol 374 having its vector symbol file 502 is created. Pre-drawn vector files 502 of the moieties corresponding to these dimensions are either imported from the database or scanned from materials e.g. tables, standards, text booking containing standardized symbols and attributed to the symbol 374. This feature is particularly advantageous when several sets of plans from the same drafter are to be converted. Since any unconventional symbols employed are likely to show up on other drawings, this preparation work need only be done once. As more and more conversion processes are performed, the user is constantly adding attributed symbols 374 to the symbol library.

The values/dimensions (recognized alphanumeric text 181, relating to the symbol property 178) represented by the picked ASCII text 352 become attributes of the symbol which are inserted in step 7 into COGO subroutines for the production of the vectors 500 corresponding to the attributed symbol 374. Some content symbols 176, especially in engineering drawings 190, have standardized dimensional content. These symbols usually contain the text which expresses these values. These symbols have preset attributes which are already present in the default symbol library for the prototype drawing. An example of this is the symbol "⅜-24UNF-2A ⫯, 1.25" which is a standardized thread note symbol, which represents a 1.25 inch deep internal thread with a ⅜ inch major thread diameter, in 24 threads per inch, general purpose tolerance, and Unified National Fine. All of this dimensional information is present in the symbol and is preset for the symbol in the symbol library.

In step 5.3 for the architectural drawing 192, the user chooses the command "ATTRIBUTE SYMBOLS." The symbol library is displayed and the user is prompted "VIEWPORT?". As shown in FIG. 15, and further explained in Example 2, the user responds by selecting or picking the floating viewport 320 which contains the content symbol 176. For example, if the user wants to create an attributed symbol 374 for a set of door symbols 176, the floating viewport 320 containing symbol property 178 for the door schedule is named. The program prompts "SYMBOL?"and the user picks the first symbol 176. The program prompts "TYPE?" and the user either picks the word "door" in the floating viewport 320 or keys in the word. The program prompts for such dimensions as "WIDTH?" and "LENGTH?". The user picks the recognized ASCII text 352 from step 4.3 for the symbol property 178 corresponding to the width and height on the "DOOR SCHEDULE". These values become attributes of the attributed symbol 374 by using typical block attribution routines well known in the CAD art. Pre-drawn doors corresponding to these dimensions are also attributed to the symbol. These pre-drawn doors also contain a batch sequence of CAD commands which will eventually cause an opening in the wall into which the door is inserted. After the first attributed symbol 374 is created, the user proceeds through all the door symbols in the aforementioned manner described. The same procedure is used to create other attributed symbols 374, such as those for windows. The "ATTRIBUTE SYMBOLS" and subsequent aforementioned prompts are used to supplement or modify the default symbol library. In some cases, all the necessary attributed symbols are present in the symbol library 171 eliminating the need for any revisions.

In step 5.4, the user picks a viewport 290 for symbol recognition. Each viewport 290 having a symbol 174 therein is processed separately.

In step 5.5, the symbols 175, 374 in the selected viewport 290 are automatically recognized with the OSR. The OSR can be set to prompt the user to review the raster symbol 359 when the OCR has trouble resolving the shape. The program will automatically window-in on the subject raster symbol 359 and allow the user to resolve the ambiguity by picking the desired vector-based shape symbol from the symbol library directly. In the OSR recognition, the symbols 175, 374 in the raster file image 350 in the viewport 290 now are converted into a vectorized symbol 373 using the vector-based shape file 372 as displayed on the viewport 290. This is illustrated graphically in the FIGS. 8 and 15, by showing the symbol 174 changing from broken line to solid line. Any one of a number of symbol recognition software packages operating in the CAD may be used. The user activates each orthographic viewpoint 296 individually and monitors the symbol recognition process one viewport 296 at a time. Advantageously, the user is able resolve any ambiguities in the recognition immediately.

Alternatively, the symbol recognition takes place in an unattended batch process. This process is performed using a simple subroutine which automatically activates each orthographic viewport 296 in sequence, initiates and invokes the symbol recognition command. A batch process is advantageous when a large number of documents 112 need to be converted. A batch process could take place during non-working hours. Since the accuracy of the conversion process is to some extent dependent upon an amount of time the program spends on each symbol 175, 374, the batch process allows the user to set an OSR analysis time very high without interfering with the work flow. When the user begins work the next day, most of the symbols 175, 374 are recognized. However there could be a residue of raster symbols 359 that were sufficiently ambiguous that they either remained unrecognized or the recognition will be flagged as uncertain. In either case, the user has the opportunity to resolve the ambiguity and facilitate the recognition.

As the symbols 175, 374 are recognized, they are automatically placed on a layer indexed to the orthographic viewport 296 such as SYMBOL-T (top viewport) or SYMBOL-F (front viewport). These layers are frozen in all but the appropriate orthographic viewport 296.

If the alphanumeric text 168, 170, 181 has not already been recognized in step 4.4, it can be processed simultaneously in step 5.6 through the OCR along with the symbol recognition through the OSR.

STEP 6

Figure 16:
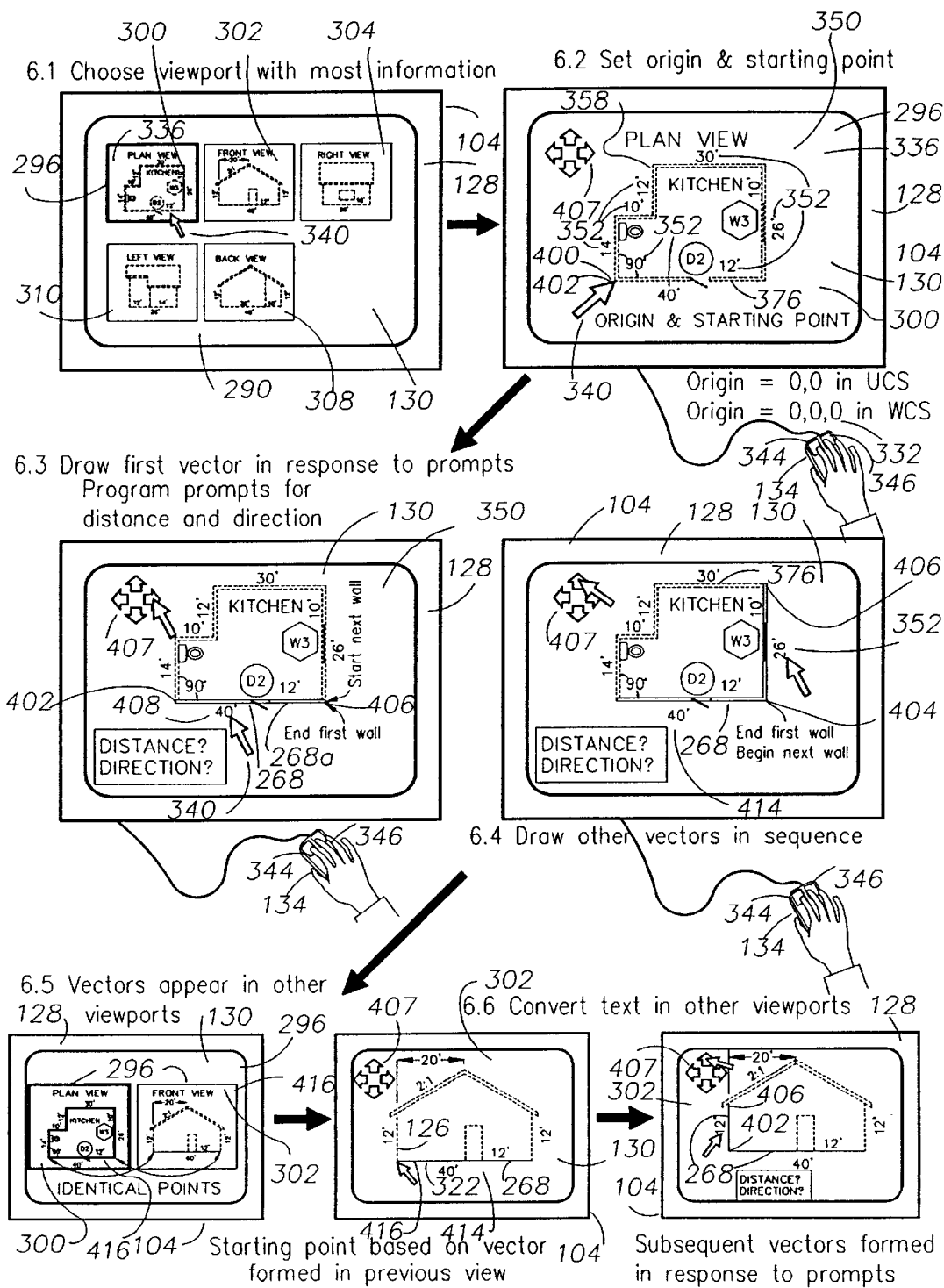
FIG. 16 is a diagram illustrating the automated conversion system and method of the present invention and further detailing Step 6 of FIG. 2 for the architectural plan of FIG. 18.

Step 6 of converting text is illustrated in steps 6.1–6.6 of FIGS. 2, 9 and 16. In step 6, the ASCII text 352 corresponding to recognized alphanumeric text 168, 170 is converted into vectors 268 by transporting the mathematical text file 368 in a format usable by the COGO subroutine into the coordinate geometry subroutine. The vector file 269 is created which has vectors 268 corresponding to the scanned and recognized alphanumeric text 168, 170 relating to physical dimensions and edges of the 3D object shown in the views 160 on the face 116 of the document 112. In response to computer prompts, the user converts the lines 164/curves 166 on a perimeter 376 of a selected viewpoint 206 in an orthographic viewport 296. The COGO subroutine constructs points composed of XY coordinates in the UCS on the basis of the selected alphanumeric text 168, 170, direction and the orthographic viewport 296 selected to create a 3D vector 268 in the WCS. The vector 268 (lines 322 or arcs 324) is automatically drawn between pairs of XYZ coordinates in WCS corresponding to a beginning point 404 and an end point 406 of the vector 268 to be constructed. The beginning point 404 and the end point 406 correspond to end points of a line 164 on the drawing view 160 on one of the orthographic viewports 296. The vectors 268 are constructed by proceeding around the perimeter 376 of the drawing view 160 in the sequence of next adjacent lines 164/curves 166. The last vector in a view (the last edge drawn of an orthographic projection) is made by connecting the end point 406 of a last vector 268 generated with the starting point 402 of the first vector generated. The XY coordinates in the UCS and vectors 268 formed in the selected orthographic viewport 296 serve as a basis for subsequent vector production in the other viewports 290.

In step 6.1 of FIG. 9, the computer screen displays all four viewports 290. The user enters a specific orthographic viewport 296 by simply clicking the cursor in that viewport 296. That specific viewport 296 then fills the screen automatically. The user selects the view 160 on the drawing 112, 190, 192 which contains the most information, e.g., alphanumeric text 168, 170 relating to the physical dimensions and edges of the three dimensional object and alphanumeric text 180 relating to the symbol property 178 of symbols 174 on the view 160. The vectors 268 formed in the WCS correspond to the edges of the 3D object shown in the selected view 160. The user moves the cursor to the orthographic viewport 296 selected and picks on that viewport 296 representing the selected view 160. This brings up the selected viewport 296 with the recognized alphanumeric text (e.g. ASCII text 352) and recognized symbols 175, 374 in it. In architectural drawings 192, the user often selects the plan or TOP view 214, so the user selects the top viewport 300. In engineering drawings 192, the user may select the TOP view 214 or the FRONT view 220, and hence the corresponding viewport 300 or 302.

In step 6.2 the user picks an origin 400 and a starting point 402. The user is prompted by the computer 104 with a set of predetermined CAD drawing program prompts to set the origin 400 and the starting point 402 on the graphical raster image 358 displayed in the viewport 290. In the front viewport, the origin 400 is designated a coordinate value 0,0 (e.g., X=0, Y=0) in the UCS. The user picks the origin 400 at a position on the raster image 350 on the screen 130, on the raster graphics 358 at an intersection of a leftmost line 164 and a lowest line 164 displayed on the drawing view 160. This corresponds to a point at which a vector furthest to the left intersects a vector nearest to the bottom. The origin 400 is set by clicking the right mouse button 346. A pre-existing grid, a coordinate system, which extends indefinitely in all four cardinal 2D directions e.g., in 0°, 90°, 180°, 270° already exists as a default feature of CAD in each view. By setting the origin point location, the user essentially shifts this pre-existing grid such that 0,0 point is at the lower left hand corner of the subject viewpoint raster image 350. The origin in the UCS is automatically assigned a value of 0,0,0 in the WCS. As is known, an X value increases to the right of the origin 400, a Y value increases above the origin, and a Z value which increases in an upward direction, e.g., out of the screen 130 toward the user. The user is not particularly concerned with the Z component of the vector 268 in the front viewport 302 (or in the back viewport 308 which are both in the XY plane) because this component is automatically established in the UCS within the AutoCAD™ Release 14.0 software which has 3D drawing vector creation capability. Likewise, in the left or right side viewports 310, 304, the "UCS" corresponds to the "YZ" plane and it is the X component of the vector 268 that is automatically established in the WCS. In the top viewport 300 or the bottom viewport 306, the UCS corresponds to the XZ plane; it is the Y component of the vector 268 that is automatically established in the WCS. Thus the X, Y or Z component is automatically established as the alphanumeric text 168, 170 in the various orthographic viewports 296 is converted. The UCS permits the user to treat each view 160 as a 2D drawing, (having XY coordinates in each viewport 290) but most advantageously creates the vectors 268 having 3D properties, e.g., X, Y, Z coordinates in the WCS for the vector beginning point 404 and the vector endpoint 406 for each vector 268 created.

After the origin 400 is selected, the user must select the starting point 402. The origin 400 and the starting point 402 may or may not have same location. The computer 104 prompts the user. The present invention's program prompts "STARTING POINT?". The user selects the starting point 402 which becomes the beginning point 404 of a first vector 268a of a series of the vectors 268 which form the vector file 269. If the starting point 402 and the origin 400 are identical, the program default is picked by clicking on the left mouse button 344. If the starting point 402 and the origin 400 are not identical, the user clicks the right mouse button 346 which initiates a set of prompts enabling the user to set the starting point 402, relative to the origin 400.

The starting point 402 can either be established by defining its distance and direction from the origin or by selecting the "X" and "Y" coordinate values in the UCS. For architectural plans 190, typically, the former mode is used. The present program prompts "DISTANCE?". (This prompt either shows up as bold text in the viewport or in a standard AUTOCAD "COMMAND PROMPT" icon.) The user picks the correct alphanumeric ASCII text 352 which overlays its viewpoint raster text 125 counterpart on the raster image 350. This value is abstracted and inserted into a COGO subroutine. The user is then prompted "DIRECTION?". At that time a directional icon 407 appears. The directional icon 407 is a set of four arrows oriented in the cardinal directions e.g., up, right, down, and left, the arrows corresponding to 0°, 90°, 180° and 270°, respectively. The user selects direction by picking one of the arrows. The "DISTANCE" and "DIRECTION" picked by user are entered into the COGO subroutine. This provides the coordinates of the starting point 402.

For engineering drawings 190, prior to the starting point prompt, the program prompts for a vector line generation command "V-LINE" which is displayed as an icon, and stands for vector line 322. The V-LINE icon is picked by the user. The "V-LINE" command is a vector line command which creates a vector 268 (corresponding to the straight line 164) to be created in the AUTOCAD environment. After the V-LINE is selected, the "STARTING POINT?" prompt is made by the program and the user picks the starting point 402. If the starting point 402 is not at the origin 400, the user is prompted for the "X" and the "Y" coordinates (in the UCS) of the starting point 402, with respect to the origin 400. The user picks the recognized alphanumeric text 168 (ASCII text 352) corresponding to the "X" and "Y" prompts. The right mouse button 346 can be depressed to indicate a default value of 0. These values provide X, Y coordinates in the UCS for the starting point 402. The coordinates of the starting point 402 are established as the beginning point 404, having the coordinates $X_b$, $Y_b$, $Z_b$, in the WCS, of the first vector 268a to be drawn. In FIG. 9, step 6.2, this beginning point has a UCS coordinate of X=0.35 and Y=0, e.g. (0.35, 0). The corresponding WCS coordinate is X=0.35, Y=0, Z=0, e.g., (0.35, 0, 0).

In step 6.3, the user creates the first vector 268a by responding to computer prompts. The remaining vectors 268 are produced either directly by picking the recognized alphanumeric text 168, 170 associated with the lines 164, and the curves 166, or indirectly by selecting the recognized alphanumeric text 168, 170 relating to an endpoint 406 of the line 164, or curve 166. In either instance, the result is a starting point coordinate in the UCS, an ending point coordinate in the UCS, and a vector line constructed between corresponding starting point coordinates and end point coordinates in the WCS. The UCS coordinates are automatically converted into 3D coordinates in the WCS because of the AUTOCAD software. In the direct vector generation, typically used for architectural plans 192, the user is prompted with "DISTANCE" and "DIRECTION" prompts; in the indirect vector generation, typically used for engineering drawings 190, the user is prompted with "X?" and "Y?" ("X" and "Y" in the UCS) prompts.

Where the first vector 268a drawn is a straight line 164, the first vector 268a begins at the starting point 402 established in step 6.2. This is the beginning point 404 of the vector 268a. The computer 104 prompts the user to enter the distance of the line 164 (corresponding to an edge in the 3D-object) from the beginning point 404 of the vector 268a with the prompt "DISTANCE?" which appears overlaid on the viewpoint 290 selected. The users picks the correct recognized alphanumeric text 168 (ASCII text 352) which is automatically inserted into the COGO subroutine. The user is prompted for "DIRECTION?" from the origin 400 and views the directional icon 407. The direction is picked on the icon 407 to correspond to an orientation of the first line 164 from the starting point 402. If the direction is not cardinal, e.g. 0°, 90°, 180° and 270°, the user depresses the right mouse button 346 and is prompted, "ANGLE". The user picks the alphanumeric text 170 corresponding to the angle of the line 164. In either instance, the picked direction is transported to the COGO subroutine where a vector is produced corresponding to the picked distance, direction and viewport 290. The first vector 268a of a vector file 269 is automatically formed, having an endpoint 406 with end point coordinates $X_e Y_e Z_e$.

Alternatively for the indirect vector generation, the user is prompted to the "X" and "Y" coordinates in the UCS of an endpoint 406 of an end of the first line 164 which corresponds to an end of a first edge. The "X" and "Y" values in the UCS are relative to the origin 400. At a "X?" and at a "Y?" prompt, the user picks the appropriate respective recognized alphanumeric text 168. The picked values automatically become the WCS coordinates of the endpoint 406 of the first vector 268a. A vector line 164 is automatically drawn from the beginning point 404 to the endpoint 406.

In step 6.5, the remaining vectors 268 corresponding to the perimeter 376 of the 3D object shown in the drawing view 160 in initial viewport 296 are created in sequence, of adjacent vectors 268 corresponding to adjacent edges on the perimeter 376 of the 3D object as shown in the drawing view 160. The vectors 268a, 268 are added to the vector file 269. The beginning point 404 for each subsequent vector 268 defaults to the endpoint 406 of the previous vector 268 generated. The computer prompts the user to enter the distance of the next line 164 (edge of the 3D-object) from the end point of the last vector 268 with the prompt "DISTANCE" which appears overlaid on the view 210 of the veiwport 296 selected. (If the next line is a curve 168; a "V-ARC" command is used as will be explained later.) The user selects the correct recognized alphanumeric text 168 off the viewpoint image 350 by picking on "DISTANCE" and then picking on the correct recognized alphanumeric text 168. The computer prompts the user for "DIRECTION" from the origin, the user picks on the term "DIRECTION" and the directional icon 407 appears. The user picks the arrow corresponding to direction of the line 164 from the end of the last line.

The "DISTANCE" and "DIRECTION" selected by user are automatically entered into the COGO subroutine to create the next adjacent vector 268. The default mode for vector production is orthogonal (e.g., all lines are drawn in cardinal directions: 0, 90, 180, 270 degrees).

For the engineering drawings 190, for each next vector 268 to be constructed, the program prompts with icons "V-LINE" and "V-ARC". "V-ARC" is command for drawing a vector arc (curve) 324 and will be discussed later. Assuming the edge is a straight line 164. The user picks the V-LINE icon. The endpoint 406 of the last vector 268 produced becomes the beginning point 404 for the next vector 268. The user is prompted for "X" and "Y" coordinates in the UCS. The user then picks the appropriate recognized alphanumeric text 168 in response to the "X"and "Y" prompts and the new vector 268 is created. This is repeated for subsequent edges of the 3D object shown as lines 164 or curves 166 on the drawing view 160. This method of vector production works for orthogonal and non-orthogonal vectors because each "X", "Y" value (in the UCS) given is referenced to the origin 400.

For non-orthogonal vectors, for example, in the architectural drawings 192, the user responds to computer prompts "ANGLE?" and "SIDE?". The previous generated vector 268 is assumed to be baseline from which angle is measured. The computer prompts the user to enter an angular direction of the nonorthogonal vector with the prompt "ANGLE?" which appears overlaid on the orthographic viewport 296 selected. The user selects the correct recognized alphanumeric text 170 (ASCII text 352) off the viewpoint image 350 by picking on "ANGLE?" and then picking on the correct recognized alphanumeric text 170 (ASCII text 352). The computer prompts the user for "SIDE?", the user picks a general direction of the angle. The default to side assumes that the angle is measured in clockwise direction from the end point of the base line.

In architectural plans 192, if the next vector to be generated is an arc, the CAD drawing program assumes a beginning point of the arc is the endpoint 406 of the last vector 268 generated. The program first prompts for the UCS endpoint coordinates of the view 160 with the respective prompts "X?", "Y?". The user responds by picking the correct recognized alphanumeric text 168. The CAD program must then determine a center point of the arc. The center point is not directly shown on the drawing but can be determined indirectly by determining the radius and the side to which the arc bulges (is convex). Accordingly, the user is prompted to enter a radius of the arc with the prompt "RADIUS" which appears overlaid on the viewport 296 selected. The user picks the correct recognized alphanumeric text 168. The program prompts the user for "SIDE?". In response, the user selects which side of the center point the arc bulges and picks on that side.

The picked alphanumeric text 168 and side are entered into a known COGO subroutine for an arc generation, known as "starting point, end point, radius" (S,E,R) which creates the vector 268, in this instance a vector arc 324, corresponding to the arc (curve) 166. If the arc 324 is the first vector 268 drawn, the starting point 402 selected in step 6.2 is used as the beginning point of the arc 324.

For engineering drawings 190, the V-ARC command is used to generate a vector curve 324 for a vector 268 corresponding to the arc (curve 166). The endpoint 406 of the last vector 268 generated is the beginning point 404 of the next vector 268 which is the vector arc 324. After V-ARC is selected, the user is prompted as to the "X" and "Y" values (coordinates in the UCS) of the end point 406 of the vector arc 324. The user merely picks the recognized alphanumeric text 168 on the picked orthographic viewport 296. The user is then prompted "RADIUS?" for a radius of the arc. The user picks the appropriate reorganized alphanumeric text 168 in the orthographic viewport 296. The user is next prompted to the curvature of the arc, with the prompt "SIDE". Side corresponds to the side the curve is convex. The user picks on an empty space adjacent the previous line 164 indicating the convexity. Finally the program prompts "LESS THAN 180 DEGREES: Y OR N?" If the arc subtends an angle of less than 180 degrees, the user picks "Y" to indicate yes. If the arc subtends an angle greater than 180 degrees, the user picks "N" to indicate no. A vector arc 324 is drawn between the beginning points 404 and the endpoint 406 selected. The end point of the vector arc 324 is the beginning point 404 of the next vector 268 to be drawn. The vector arc 324 is added to the vector file 269.

For engineering drawings 190 or for architectural plans 192, if the perimeter 376 or surface of the 3D object being drawn is a circle, ellipse, elliptical arc, regular polygon, rectangle, donut, or other geometric entity common in CAD art, then the user selects these types of geometries from the CAD drawing file and responds to prompts by picking the required recognized alphanumeric text 168 and a type of geometric entity, e.g., circle, ellipse, etc., from a conventional CAD pull down menu under the "DRAW" label. There is no need to manually type the recognized alphanumeric text 168 into the appropriate CAD prompt; advantageously, everything can be picked by positioning the cursor on the geometric entity and recognized alphanumeric text 168 and clicking on the left mouse button 344.

As the recognized alphanumeric text 168, 170 corresponding to the physical dimensions and edges of the 3D object is converted into mathematically accurate vectors 268, certain default operations occur automatically. The vector 268 is placed on a preset layer in the CAD drawing file 260. The recognized alphanumeric text 168, 170, (ASCII text 352) is deleted. New dimension text 414 is placed according to preset parameters. The preset parameters include size of font, location of text, and associated dimensional arrows and lines, as needed. The new text 414 generated by the properties of vector 268, is associative with the mathematical properties of the vector 268. If the vector 268 is changed, the new alphanumeric text 414 changes.

In step 6.5, the vector(s) 268 once generated in one orthographic viewport 296 appears as a line 416 (or a curve (arc) 418), e.g. a vector generated line 416 or vector generated arc 418, representing an edge of the 3D object, in the other orthographic viewports 296 and perspective viewport (if present) or isometric viewport 312. If the corresponding line 164 or arc 166 on the viewpoint raster file image 350 is not aligned with the vector generated line 416 or vector generated arc 418, then the user may move the viewpoint raster file image 350 to coincide with appropriate endpoint 406 of the vector generated line 416 or vector generated arc 418.

In step 6.6, the recognized alphanumeric text 168 170 (ASCII text 352) in the other orthographic viewports 296 is converted into the vector 268 which are added to the vector file 269. The user carefully selects a starting point 420. Choosing the proper starting point 420 is crucial because this establishes a common point in the World Coordinate System which indexes the views 160 in each viewport 296 to each other. The computer prompts the user "STARTING POINT?". The user picks the endpoint of an appropriate vector generated line 416 (or vector generated arc 418) which has been generated in the orthographic viewpoint 296 from the previous viewport conversion, or the user may pick the starting point 402 from the first orthographic viewport 296 selected or pick a position on the isometric viewport 312. The picked starting point 420 is automatically entered into the COGO subroutine for the selected next orthographic viewport 296. The user proceeds as described in steps 6.3 to 6.4 to construct the vectors 268 around the perimeter 376 of the view 160 in the next orthographic viewport 296, or alternatively the user can switch from viewport 296 to viewport 296 and construct the vectors 268 following steps 6.3 and 6.4. Or alternatively the user can create a next vector 268 by drawing the next vector 268 from the endpoint 406 of one vector 268 to an endpoint of another vector 268 in a viewport 290 where a previous vector 268 has already been created. The coincidence of the vector generated lines 416 and vector generated arcs 418 from view 160 to view 160 with the underlying corresponding raster lines in the viewpoint raster file image 350 in each respective viewport 296 serves as a quality control method.

In step 6, within the COGO program, the "mathematical text" 364 is in a format useable by the COGO subroutine and is treated as a conventionally typed COGO text entry and entered into the COGO subroutine for the appropriate orthographic viewport 296. In a preferred embodiment, the OCR software accurately recognizes the symbols ", ' as used in alphanumeric text 168, 170, 181 designating inches and feet and the COGO subroutine accepts the symbols "○", "●", "D" or "Degrees" or alphanumeric text to symbolize degrees. Also preferably, the COGO subroutine accepts the angular format in which the original alphanumeric text 168, 170 is recorded. In these circumstances, the mathematical text file 368 is in a format directly useable by the COGO subroutine. Alternatively, where the lines 164 to be converted are orthogonal, the user can indicate the direction by picking the appropriate arrow on the directional icon 407. The picked direction is converted into the correct angular orientation for use by the COGO subroutine to create the 3D vector 268.

The typical COGO mathematical operations occur which create the vector 268 with three dimensional end point coordinate 406 and start point 404 coordinate. The WCS coordinates 404, 406 are automatically converted into UCS coordinates in each of the other orthographic views 212, thus the vector 268 drawn in one viewport 296 exists as a vector 268 in the WCS and will automatically appear as the vector generated line 416, the vector generated arc 418 or point in the corresponding orthographic viewports 296.

As each COGO produced vector 268 is created, it is automatically labeled with the text 414 attributed to the newly created vector 268, using common dimensioning practices is known in the CAD art. The vector 268 is displayed as the vector generated line 416 or the vector generated arc 418 with accompanying text 414 on the display monitor. A terminus 422 of the vector generated line 416 is a point or node 424 at the beginning 404 or start point 402 and at the endpoint 406 of the vector 268. At the end of step 6 the vector file 269 contains all of the created vectors 268, be they vector lines 322 or vector arcs 324.

The vector file 269 defines the surface of the 3D object. Preferably if no symbols 174 are present on document 112 this vector file 269 may be output as a CAD drawing file to create a drawing which may be printed or plotted, or the vector file 269 may be used in CAM to create a model of the 3D-object. As is known in the art, a CAD drawing is constructed by joining one vector 268 to another. If no symbols are present on the drawing it is not necessary to proceed to step 7. However, where content symbols 176 are present, it is necessary to proceed to step 7.

STEP 7

Step 7 of converting the symbols is illustrated in steps 7.1–7.4 of FIGS. 2, 10 and 17. In FIGS. 10 and 17, the moiety the symbol 374 represents is referred to as an "object". In step 7, the attributed symbols 374 are converted into symbol vectors 500 and the symbol vectors 500 are inserted into the vector file 269. In step 7.1 the user picks the orthographic viewport 296 from the CAD drawing file 270 which contains the most attributed symbols 374. The viewport 290 is enlarged to fill the screen 130. In step 7.2, the user picks a particular attributed symbol 374 to be converted. The computer uses the recognized attributed symbol information from step 5. The computer program displays the symbol properties 178 of the symbol 374 selected. The computer program prompts, if needed, for additional information regarding three dimensional features of the moiety the symbol 374 represents. These prompts include prompts for depth (length), height, width, pitch, etc. The moiety which the symbol 374 represents is three dimensional and characterized by its vector file 502 of its symbol vectors 500. The vector file 502 (e.g. the vector block) is either pre-existing as a preset parameter in the symbol library in step 2 or is added to the symbol library 171 by the user in step 5, as previously explained.

In step 7.3, the moiety which the symbol 374 represents is located on the drawing view 160. The user is given a set of computer prompts specific to the nature of the moiety. For example, the symbol 374 may need to be inserted at a specific vector insertion point along a vector 268, this is reflected by insertion point 182. For example, a door might have an insertion point at midpoint of a vector 268, or a circular feature, such as the end view of a screw, may have an insertion point at center of the end of the screw. For the architectural drawing 192, the computer 104 prompts for "DISTANCE" and "DIRECTION " of the insertion point 182 on the drawing view 160 or from a known point on the drawing view 160. The user picks an insertion point 182 on the drawing view 160 in the picked orthographic viewport 296. Then the user responds to the "DISTANCE" prompt by picking the recognized alphanumeric text 181 (ASCII text 352) corresponding to an insertion point 182. The user responds to the "DIRECTION" prompt by picking the appropriate arrow from the directional icon 407. This then transports the recognized alphanumeric text 181 into the COGO subroutine to specify the insertion point 182 of the attributed symbol 374 into the vector file 269 representing the 3D object.

For the engineering drawing 190, the user clicks on the attributed symbol 374 and the program prompts for the insertion point 182 of the symbol 374. The program provides an "X?" (distance) and a "Y?" (distance), prompt for the user to locate the symbol 374. The user picks the recognized alphanumeric text 181 (ASCII text 352) corresponding to the "X" and "Y" values in the UCS of the location of the insertion point 182 of the symbol 374 on the picked orthographic viewport 296.

In step 7.4, the vector file 502 of the symbol based moiety is automatically inserted into the vector file 269 of the 3D object to create a vector file 600 which represents the physical dimensions and edges of the 3D object and the physical dimensions and edges of the moiety the symbol represents with the moiety located in the 3D object, and an accurate CAD drawing file 602 which shows the views of the 3D object with the moiety the symbol represents incorporated into the 3D object. The edges of the moiety appear in the viewports 290. The moiety the attributed symbol 374 represents appears inserted as lines/arcs in the view 160 as part of the drawing. Other standardized operations such as creating a hole in a wall for a door or window are also performed on the drawing 190, 192. A moiety produced in one orthographic viewport 296 appears in the others, as well as, in any isometric viewport 312 or perspective viewport. This feature of the present invention advantageously saves time and costs in converting other views 160 of the drawing 190, 192. This feature also provides a means for quality control. For example, a door placed on the plan view of an architectural drawing 192 also appears on the corresponding elevation view. By comparing lines/arcs generated by the vectors 600 to an underlying raster graphics vectorization of the door, the user could determine if there was a problem in the placement of the door in the wall.

At the end of step 7, as shown in FIG. 1B, the vector file 600 can be used as a 3D computer model of the 3D object including the moiety represented by symbol for such operations as Computer Aided Manufacture to create a 3D copy 606 of the 3D object. Also at the end of step 7, the accurate CAD drawing file 602 may be stored in a storage medium (device) 120 under a drawing file name 604 such as "WIDGET.DXF" or output as a hard copy drawing document 608 on the printer 138 or on the plotter 136.

The steps of recognition and conversion of the alphanumeric text and the symbol and the creating attributed symbols to add to the symbol library are such that anyone familiar with the software of AUTOCAD, CAD, OCR, OSR, and COGO systems can provide a suitable subroutine to enable the user to employ the method of the invention.

The present invention is further explained by the following examples which should not be construed by way of limiting the scope of the present invention.

EXAMPLE 1

CONVERSION OF ENGINEERING DRAWINGS

The hard copy source document, an engineering drawing is converted according to the method of the present invention.

FIG. 3 illustrates one type of hard copy source document, an engineering drawing. The engineering drawing which measures 8.5 inches by 11 inches has four views of a 3D object on it, as well as a table titled "TABULAR DIMENSIONS" and a drawing block. The drawing in this Example is for a 3D object, a WIDGET. The engineering drawing has been drawn with a number of orthographic views and an isometric view, in a conventional manner, known in the mechanical drawing art. The view in the upper left hand corner is the top view, the view in the lower left hand corner is the front view, the view in the lower right hand corner is the right side view and the view in the upper right hand corner is an isometric view. The top view, the front view and the right side view are orthogonal views, e.g. orthographic views. Each drawing view has lines on it, corresponding to the edges of the surfaces of the 3D object as projected in that view. Solid lines correspond to the surface edges. The solid lines may be straight lines or curved lines as corresponding to the edges of the surface of the 3D object. Associated with the solid lines are alphanumeric text which relates to the heights, widths, depths (lengths), and angles of the edges of the 3D object. The broken lines correspond to hidden lines within the interior of the 3D object showing edges within the object or behind the 3D object, as is known in the mechanical drawing art.

A number of symbols are present in this drawing. There is a symbol property in this drawing providing three dimensional information on the moieties certain symbols represent. There is alphanumeric text associated with the symbols, with the symbol properties and with the point of insertion of the symbol into the drawing of the 3D object. In the top view, a content symbol "⅜-24UNF-2A ⟂ 1.25" refers to 1.25 inch deep internal thread with a ⅜ inch major thread diameter, in 24 threads per inch, general purpose tolerance, and Unified National Fine, and in the top view, the symbol "C" is used to designate a distance from an edge to center of a hole. In the front view, content symbols ∅, ∨, ⊥ and "R" refer respectively to diameter, to countersink, to "deep" "(depth)", and to the "radius of curvature" (of a curved edge of the 3D object). The symbol property, e.g., the table, titled "TABULAR DIMENSIONS" has dimensions recorded thereon for symbols "A", "B" and "C", for two Options, 1 and 2. The drawing block provides information on a drawing scale, e.g., "SCALE 0.75=1", a unit of dimension of the 3D-object, e.g., "UNITS: INCHES", a project name (or drawing name), e.g., "WIDGET" and an option selected for "TABULAR DIMENSIONS", e.g., "Option 1".

FIGS. 1A and 1B, 4–10 best illustrate the method and system of the present invention. In the preferred embodiment, the aforementioned preferred hardware and aforementioned preferred software, the disclosures of which are incorporated by reference herein, are used to practice the method of the present invention.

As best shown in FIG. 4, the image on the aforementioned engineering drawing of FIG. 3 is acquired according to step 1. In step 1.1 the computer and scanner are turned on. The scanner is preferably the Contex FSC 8000 DSP scanner having its software scanning program which is opened in the computer, in the conventional manner. The scanning resolution is set to a resolution of 300 DPI. The user types in the instructions via the computer keyboard to instruct the scanner to start scanning. The document, the engineering drawing of FIG. 3, is scanned and converted to a digitized raster image. The digitized raster image is imported into the computer and is displayed on the display monitor. Depending upon the size of the engineering source documents, the scanner can be either a conventional desk model scanner (HP VISIONPORT™ by Hewlett Packard, Palo Alto, Calif.) or a large scale scanner, such as, the Vidar TRU SCAN 800, Vidar, Herndon, Va., however the preferred scanner is the Contex FSC 8000DSP FULL SCALE COLOR SCANNER.

For ease of illustration, the hidden lines on the drawing scanned in step 1.1 have been omitted and are omitted in subsequent illustrations. However in actual practice, any hidden lines on the drawing appear on the raster image.

In step 1.2, using the software provided with the scanner, the user edits the digitized raster image to remove any artifact and adjusts alignment, if needed. For ease of illustration, to show that a raster image is present in FIGS. 4–11, a broken line is used after step 1.1 to illustrate the raster image. This is easily seen in step 1.2 where a solid line/curve on the drawing shown in step 1.1 is now broken, and all text on the drawing is now shown in broken line. The "Tabular Dimension" table has been enlarged to best show this. Solid line is used after step 1.2 to show creation of recognized alphanumeric text, e.g., ASCII text, and recognized vectors in the drawing file. The digitized raster image may be stored as raster file "WIDGET GIF" or it may be printed on the printer or plotted on the plotter. Preferably the user displays the edited raster image on the display monitor and proceeds to step 1.3.

In step 1.3, the user organizes each edited raster image according to a viewpoint. The edited raster image shown in 1.2 of FIG. 4 has 4 views, the top view, the front view, the right side view and the isometric view corresponding to the same 4 views on the engineering drawing. This edited raster image is divided by the user into three orthographic viewpoints, and an isometric viewpoint corresponding to the three orthographic views and the isometric view shown on the source document in step 1.1 and on the edited raster image on the screen of the monitor. A floating viewpoint is created for the "TABULAR DIMENSION" table. Each viewpoint raster image is saved as a separate digitized viewpoint raster file. The viewpoint raster files which correspond to the drawing views, when displayed as in step 1.3, each have a digitized raster viewpoint image having a digitized graphic on it corresponding to the lines and curves present in the drawing view, digitized text corresponding to any text associated with the drawing view, including alphanumeric text, and digitized graphics of the symbols appearing on the drawing view. The floating viewpoint raster file has just the digitized text and digitized graphics showing the text, in the table "TABULAR DIMENSIONS" and the table lines, etc. These viewpoint raster files are named in step 1.4 according to the project name, the view on the drawing (or according to the floating viewpoint, if present) and the raster file format. The five digitized raster viewpoint files are named: WIDGET-T.GIF for the top view/top viewpoint, WIDGET-F.GIF for the front view/front viewpoint, WIDGET-R.GIF for the right side view/right side viewpoint, WIDGET-I.GIF for the isometric view/isometric viewpoint and WIDGET-FV.GIF for the floating viewpoint containing the table. The named digitized raster viewpoint files are stored in the computer's hard disk or some other suitable storage medium/device to be called up in step 3. The digitized raster viewpoint files have a digitized graphic of the drawing digitized alphanumeric text and digitized raster symbols.

In FIG. 5, the user sets up a CAD drawing file. In step 2.1 of FIG. 5, the user starts a new drawing file by responding to computer prompts for a file name and a file prototype. The user names the drawing based on the project name used in step 1, in this instance the project name is "WIDGET". The user then selects a prototype drawing which matches the source document scanned. Here the source document scanned was an engineering drawing that was 8.5 inches by 11 inches in size, so the user selects MECH-A from the five preset prototypes for engineering drawings, e.g., MECH-A, MECH-B, MECH-C, MECH-D and MECH-E. The user enters this information via the keyboard. The prototype drawing file selected has associated with it preset settings, including OCR settings, OSR settings, a preset symbol library, dimension settings, precision settings, text style settings, menu settings and layer settings. The prototype drawing file also has a set of page layouts having viewports which the user may select. The user selects the page layout having viewports corresponding to the views shown in the engineering drawing. In this example, the page layout has four viewports corresponding to a top viewport, a front viewport, a right viewport and an isometric viewport, because the engineering drawing of this example has a top view, a front view, a right side view and an isometric view. Other engineering drawings may have other orthographic views and/or a perspective view.

In step 2.2 of FIG. 5, the user customizes any of the preset parameters, if needed.

In step 2.3 of FIG. 5, the user customizes the viewports, if needed. Here a the user customizes the viewports by adding a floating viewport to hold the table of symbol properties, "TABULAR DIMENSIONS", shown on the engineering drawing. At the end of this step in the method of the present invention, the user has created viewports in the CAD drawing file in which to import the raster viewpoint files created in step 1.

As best shown in FIG. 6, the user imports each of the raster viewpoint files into its corresponding viewport. The user activates a chosen viewport by picking the viewport, e.g., by moving the cursor to the viewport and clicking on the mouse, or by simply naming the desired viewport using an AUTOCAD "VIEW" command. In step 3.1, this is illustrated by moving the cursor to the orthographic viewport titled "FRONT" and picking it. Next, in step 3.2 of FIG. 6, the user chooses the appropriate corresponding orthographic viewpoint raster file to import into the selected orthographic viewport. An AUTOCAD command "RASTERIN" is selected form a pull-down menu. The user types in the appropriate viewpoint raster file name. Here the front viewport raster file name, "WIDGET-F.GIF", is entered. In step 3.3 the user is prompted for the drawing scale with the prompt "SCALE?". The user views the viewpoint raster image and types in the scale, "0.75=1" displayed in the viewpoint raster image. Once the scale is entered, the computer software automatically imports the digitized viewpoint raster file into the selected activated viewport. This is shown in step 3.4 of FIG. 6. This is repeated for each of the viewports, and is shown graphically in step 4.1 of FIG. 7. The computer defaults to the scale setting in the first viewport for the subsequent viewports. This default setting is activated by depressing the right mouse button. If the scale needs to be changed, the user simply selects the appropriate scale by picking with the left mouse button or by manually entering the scale. The textual data captured in the floating viewports can be set similarly.

As best shown in FIG. 7, the alphanumeric text is recognized in each viewport in the AUTOCAD drawing. At the end of step 3.4, each of the digitized raster viewpoint files has been transported into its corresponding viewport, this is shown graphically in step 4.1 of FIG. 7. The alphanumeric text in each viewport is recognized separately. The alphanumeric text in any floating viewport, if present, is recognized first, as shown in steps 4.2 and 4.3 This is done so that the alphanumeric text of a symbol property needed for attributed symbols is available for symbol conversion in step 5 of FIG. 8. Thus any alphanumeric text relating to a symbol property in a table, e.g., tabular text, legend, chart or schedule in a floating viewport is recognized first. The digitized raster alphanumeric text is converted into ASCII text with the OCR operating in the AUTOCAD environment. This is shown schematically in step 4.3 of FIG. 7 where the broken line text is shown changed to solid line text. In step 4.4 of FIG. 7, the raster alphanumeric text in each of the other viewports is recognized next and converted into ASCII text. Step 4.4 of FIG. 7 illustrates the conversion of the raster test into ASCII text for the front viewport. This is done for each of the viewports and is shown completed in step 6.1 of FIG. 9.

As best shown, in FIG. 8, the digitized symbols on the digitized raster image are recognized and converted to graphic vector symbols in each of the orthographic viewports where a digitized raster symbol was present. In step 5.1 of FIG. 8, the user calls up the symbol library. The symbol library exists as a user preset parameter of the MECH-A drawing file. The screen shows a partial listing of a symbol library having a number of conventional standardized mechanical drawing symbols therein. An arrow is drawn to the symbol "1½-6NC-3 LH" which is a standardized ANSI symbol for a 1½ inches left hand National Coarse Thread having 6 threads per inch, tight tolerance. This moiety, the thread, is shown graphically to the right of the symbol. This symbol is not used on this particular engineering drawing but is part of the standard symbol library available for the MECH-A prototype drawing. Also included in the preset parameters for the prototype drawing is an extensive moiety file consisting of three dimensional drawing blocks intended to cover the physical dimensions and edges of moieties representing the standardized symbols in a typical mechanical engineering drawing. In the prototype drawings these drawing blocks are already associated with the proper content symbol. The arrow drawn to symbol "Ø 0.75 ⊥ A" shows the symbol and the moiety/object the symbol represents. This symbol is used on the drawing of FIG. 3 and represents a moiety, a cylindrical hole having a diameter 0.75 inches that is "A" deep. Recall "A" is a dimension found in the symbol property table, "TABULAR DIMENSIONS" in the floating viewport.

In step 5.2 of FIG. 8, the user may add symbols to the symbol library or modify symbols in the symbol library by using basic CAD drawing tools to construct the symbol as previously described.

In step 5.3 of FIG. 8, the user sets the values for the attributed symbols. The user selects the ATTRIBUTE SYMBOLS command. The user is prompted to select 3D data about the physical properties of the symbol. The user may key them in, but preferably picks them from the symbol property ASCII text in the floating viewport. In step 5.3 as illustrated in FIG. 8, the user picks the content symbol "Ø 0.75 ⊥ A" in response to the "SYMBOL" prompt. The user then picks the moiety the symbol represents in response to the "OBJECT" prompt. Here the user picks the cylindrical hole having a length dimension "A". The user is then prompted for the symbol property information relevant to the particular symbol. Here the user is prompted for "A". The "A" value is found as a symbol property in the floating viewport and is recognized alphanumeric text 180 (ASCII text 352) which was recognized by the OCR in the floating viewport in step 4.3. The user pulls down the floating viewport and picks the "A" value. This creates an attributed symbol from the content symbol. The attributed symbol is stored as a vector file, corresponding to the physical dimensions and edges of the moiety/object the symbol "Ø 0.75⊥A" represents.

The front viewport is activated in step 5.4 since that is the viewport in which the aforementioned symbol "Ø 0.75⊥A" occurs in this Example. The user picks the viewport to activate it.

In step 5.5 the symbols are recognized with the OSR, the raster text symbols associated with the symbol are converted into vector-shaped symbols, and any text associated with the symbol is converted by the OCR into recognized ASCII text.

As best shown in FIG. 9, the alphanumeric text corresponding to the physical dimensions and edges of the 3D object is converted into mathematically accurate vectors and a vector file corresponding to the physical dimensions and the edges of the 3D object is created.

In step 6.1 of FIG. 9, the screen shows the viewports each having a digitized viewpoint file therein with the recognized ASCII text and the recognized symbols overlaying their raster counterparts. None of the other graphic elements have been converted into vectors. The user begins the alphanumeric text to vector conversion process by choosing the orthographic viewport with the most information in it. In this example, the user chooses the front view viewport because the front view has the most alphanumeric text corresponding to the physical dimensions and edges of the 3D object. The coordinates of the vectors and the vector representing the edges of the 3D object created in this viewport serve as the basis for subsequent vector production in other viewports.

In step 6.2, the user picks the origin on the raster viewpoint file image, i.e., the point at which the edge furthest to the left intersects the edge nearest to the bottom, which corresponds to a vector furthest to the left intersecting a vector nearest to the bottom. This sets the coordinate grid.

The starting point is selected next. The user begins with the perimeter of the drawing by executing a vector line command ("V-LINE") either from a pull down menu or by clicking the wall icon in a toolbar menu or by keying the word V-LINE. The program prompts "STARTING POINT?". The default response is the origin point. If the user clicks the left mouse button, the starting point defaults to origin. If the user clicks the right mouse button, then the user is prompted for the "X" and the "Y" components in the UCS of the starting point. In the drawing of FIG. 3, the starting point and the origin are not identical, so the user clicks the right mouse button.

In step 6.3, in response to the "X?" prompt, the user picks the appropriate recognized alphanumeric text in the UCS for the horizontal distance with the left mouse button. In this example X=0.35 for the vertical distance. The user is then prompted "Y?" In this example, the Y distance in the UCS is 0. The user defaults to the value zero by moving the cursor onto a blank part of the screen and clicking the left mouse button. The starting point appears as a flashing cursor in the shape of a small cross (+) at the UCS coordinate (0.35, 0). The user visually compares this starting point with its raster viewpoint image counterpart to confirm that there are no gross errors.

In step 6.3 of FIG. 9, the user is then prompted for the coordinates of the endpoint of the first line in the drawing in the viewpoint. This corresponds to the first vector that is created and drawn in the viewport. At the prompt "X?", the user picks the recognized alphanumeric text, on the viewpoint, corresponding to the horizontal distance from the origin (3.50). At the prompt "Y?" the user responds by depressing the right mouse button, since the line is horizontal, the Y value is zero. This establishes the X, Y coordinate (3.50, 0) in the UCS as the endpoint of the vector. A vector is automatically generated in the WCS and is drawn between the start point and the endpoint. This vector appears as a vector generated line in the selected viewport and appears simultaneously as a vector generated line or a point in the other viewports. The line corresponds to the edge of the 3D object in the other viewports. As shown in step 6.5 of FIG. 9, the first vector generated in the front viewport appears as a horizontal line in the top viewport. It appears as a point in the right viewport (not shown) and as an angled line in the isometric viewport (not shown). The edge constructed at the bottom of the front view is identical to the edge at the bottom of the top view. The endpoints of the bottom line are the indexing by which the two orthographic planes of two orthographic viewports are connected. These points are automatically converted to 3D coordinates in the WCS. The WCS coordinates (X, Y, Z) of the three points so far established are respectively (0, 0, 0) corresponding to the origin; (0.35, 0, 0) corresponding to the starting point,(0.35, 0, 0) corresponding to the beginning point of the first vector and (3.50, 0, 0) corresponding to the end point of the first vector.

In step 6.4 of FIG. 9, the user is then prompted for the endpoint of the next vector. The user proceeds around a perimeter of the drawing view and selects the next adjacent line to create the next vector. At the prompt "X?", the user picks the recognized alphanumeric text "2.50", selecting the appropriate horizontal distance text (2.50). At the prompt Y?, the user picks the recognized alphanumeric text "1.00", selecting the appropriate vertical distance (1.00). This establishes the coordinate (2.50, 1.00) in the UCS and a vector is automatically drawn from the starting point to the endpoint. This vector is stored in the WCS with a vector beginning point coordinate of (3.50, 0, 0) and a vector end point coordinate of (2.50, 0, 1.00). A vector file is created with each vector created added to the file. Alternatively, the user constructs this line using direction and distance prompts previously described. This alternative is invoked after the user picks the "V-LINE" icon. The default mode is the "X?", "Y?" (in the UCS) prompts. If the user wants to directly construct a vector, the user responds by entering the key "V" after which the program prompts for "DISTANCE" and "ANGLE?".

The user then proceeds to the next adjacent line in the perimeter of the drawing to construct the next vector. The next vector to be constructed is an arc so the user picks the "V-ARC" icon. The user is first prompted for the endpoint with "X?" and "Y?" prompts, in the UCS and responds by choosing the appropriate recognized alphanumeric text for the X distance, e.g., 1.50, and for the Y distance, e.g., 1.75. The user is then prompted for RADIUS? to which the user responds by picking the appropriate recognized alphanumeric text (1.0). Next the user is prompted "SIDE?". This prompt is intended to determine to which side the curve is convex (bulges). The user responds by picking an empty space to the right of the last line. Lastly the program prompts "Less than 180 degrees: Y or N?" The left button indicates yes, the right button indicates no. Here the user responds by indicating yes which produces a shallow curve which is less than 180 degrees of a full circle. An arc is automatically formed between the start point and the endpoint. After the arc is formed the user goes to the next adjacent line in the perimeter to create the next adjacent vector.

In this example, the next line is not curved, but is a straight line, so the user picks the "V-LINE" icon. The user is presented with the same "X?", "Y?" prompts in the UCS as previously described. The user responds by picking the appropriate recognized alphanumeric text, e.g., X is 1.50, Y is 2.25, forming the UCS coordinate (1.50, 2.25). The generated vector has a WCS vector beginning point coordinate of (1.50, 0, 1.75) and a vector end point coordinate (1.50, 0, 2.25). A next vector is automatically created between these points. The vector shows up as line in the other viewports. The user proceeds to select next adjacent lines around the perimeter of the drawing view until the last vector is formed, (e.g., the next line has recognized alphanumeric text corresponding to the UCS coordinates (0, 2.25); the next line has recognized alphanumeric text corresponding to UCS coordinates (0, 0.35); the next line has recognized alphanumeric text corresponding to UCS coordinate (0.35, 0.35) and the last line in the perimeter has UCS coordinates corresponding to (0.35, 0); and corresponding WCS vectors are drawn. Each vector created is added to the vector drawing file for the 3D object. At this point, instead of responding to the "X?" prompt (in the UCS) by picking a distance, the user clicks the right mouse button and is prompted "NEXT POINT?" to which the user responds by picking the start point of the drawing. The program automatically defaults to the O-snap (object snap)mode endpoint. The endpoint O-snap mode is an AUTOCAD feature that allows the user to pick a location near the end of a chosen line and the AUTOCAD program automatically returns ("snaps back") to the exact end point of the line. Ideally these vector generated lines and curves should overlay the raster viewpoint image in the viewport. If there is a problem with a faulty OCR recognition, poor drafting or an error in the source document's dimension this shows as a nonconformity between the raster viewpoint image and the vector drawing in the viewport of the vector generated lines and arcs. This nonconformity is correctable prior to propagation in subsequent vector production.

As each vector is formed, the recognized alphanumeric text is deleted and replaced. The program automatically deletes the recognized alphanumeric text and substitutes text generated as an attribute of the vector in the first view. The same operation can be performed on any vector of another view by choosing the icon LABEL and picking the appropriate line. A new label identifying the dimensional text (length, (depth) width, height, angulation, radius, etc.) as an attribute of the vector itself is automatically generated and arrayed in a format typical to the art. This permits automatic text adjustment to conform with any new scale selected for the drawing, automatic text adjustment to fit changes in dimension of an edge and conversion of dimensions units from one system to another.

At the end of step 6, the alphanumeric text and the lines in the drawing view representing the edges of the 3D object have been converted to mathematically accurate vectors. As each vector is created in step 6, it is added to the vector file of the 3D object, e.g. the vector file has the 3D coordinates in the WCS of the vector, and the vectors correspond to the physical dimensions and edges of the 3D object.

As shown in step 6.6 of FIG. 9, the alphanumeric text corresponding to the physical dimensions and edges of the 3D object is converted in the other viewports into vectors. The raster image in other orthographic viewports is adjusted, if needed, to overlay the vector generated into the other viewport. The program prompts "BASE POINT?" to which the user respond by picking the lower left-hand corner of the raster viewpoint graphics in the viewport of the next viewport selected. The program prompts "INSERTION POINT?" and the user responds by picking the endpoint of a line generated by the appropriate vector. The user then proceeds to the endpoint of the vector generated from the previous viewport and uses it as a beginning point (start point) for a next vector. This is shown in step 6.6 of FIG. 9, where the top viewport is selected. Since certain vectors are already present from the conversion of the front viewport, the user picks the endpoint of one of the created vectors. This provides a beginning point for the next vector to be generated. The user then responds to the "X?", "Y?" prompts, by picking the appropriate respective horizontal and vertical recognized alphanumeric text (3.50 and 2.00 respectively). A UCS coordinate (3.50, 2.00) is created. The newly generated vector has a WCS vector beginning point coordinate of (3.50, 0, 0) and a WCS vector end point coordinate (3.50, 2.00, 0). A vector is automatically created between these points. The vector shows up as line in the viewports. Subsequent vectors are formed according to the V-LINE and V-ARC prompts. This is shown graphically on the monitor screen on step 7.1 of FIG. 10

In FIG. 10, the symbols on the engineering drawing are converted into vectors. In step 7.1 of FIG. 10, the user picks the viewport from the drawing file which contains the most attributed symbols. In this particular example this is the front viewport. The viewport is enlarged to fill the screen. In step 7.2, the user picks a particular attributed symbol to be converted. Here the symbol picked is "Ø 0.75↧A". This is a standard symbol for a partial penetration (moiety) having a diameter 0.75 inches within a 3D object with a penetration depth of "A". The computer program displays existing attributes of the symbol selected. The computer program prompts for additional information if needed.

In step 7.3 the moiety/object which the symbol represents is located on the drawing. The user is given a set of computer prompts "X?" for the X distance from the origin in the UCS and "Y?" for the Y distance from the origin in the UCS to locate the insertion point of the moiety symbol represents within the 3D object. The user picks the respective recognized alphanumeric text (converted ASCII text) which represents the insertion point distances. The values expressed by the recognized alphanumeric text is transported into the COGO subroutine to specify the insertion point of the vector file of the attributed symbol into the vector file of the 3D object and to insert it into the vector file of the 3D object. Here the insertion point of the symbol on the front view is picked X=0.75 and picked Y=1.00.

In step 7.4, the moiety the symbol represents is automatically inserted into the viewpoints. As shown in step 1.4, this symbol shows up in solid line at this point in the front viewport. Also, the moiety/object appears in hidden line as a partial penetration within the 3D object, in the top viewport, the right viewport and the isometric viewport.

The user proceeds to pick the other attributed symbols in the drawing and proceeds, in like manner. At all times the user is able to check the construction of moiety the symbol represents against the viewpoint raster graphic in the selected viewport as a method of quality control.

At the end of step 7, as shown in FIG. 1B, a mathematically accurate 3D vector file exists which contains the 3D vectors corresponding to the 3D object along with the 3D vectors corresponding to the moiety represented by the attributed symbol, inserted therein. This vector file is used to create a 3D computer model and is further used for Computer Aided Manufacturing of a copy of the 3D-object. Also a mathematically accurate AUTOCAD drawing file is created which may be stored, or used to print or plot out a hard copy drawing of the newly created converted engineering drawing.

EXAMPLE 2

CONVERSION OF ARCHITECTURAL PLANS

FIG. 18 illustrates one type of hard copy source document, an architectural plan. The architectural plan has plurality of drawing sheets, e.g., drawing views, which show the top plan view, the front view, the right side view, the left side view and the back view of a 3D-object, in this example, a house. The sheets may have a symbol property information, e.g., tabular data, dimensions tables, charts, legends, and/or schedules relating to a door schedule for a door symbol, a window schedule for a window symbol, etc., the physical dimensions of the moiety the symbol represents, and materials specifications thereon. More than one view may be on a single sheet. Tabular data may be on sheets along with a drawing view or on separate sheets. Here drawing views (plan view, front view, right view, left view and back view) and the symbol property are on separate sheets. The symbol property is a table titled "DOOR SCHEDULE". A drawing block is also present on the plan view. Each drawing view has lines on it, corresponding to the edges and surfaces of the 3D object, the house, as projected in that view. Solid lines correspond to the surface edges. Alphanumeric text relating to the physical dimensions and edges of the 3D object are recorded on the face of the plan, typically near the lines. In the top view, a symbol D2 for a door having a particular physical dimension is present and a symbol W3 for a window having a particular physical dimension is present. The "DOOR SCHEDULE" has dimensions recorded thereon for different sized doors. The drawing block provides information on a drawing scale, e.g., "¼"=1'", a unit of dimension of the 3D-object, e.g., "Feet", a project name, e.g., "HOUSE".

FIGS. 11–17 best illustrate the method of the present invention for the conversion of architectural plans. In the preferred embodiment, the aforementioned preferred hardware and aforementioned preferred software, the disclosures of which are incorporated by reference herein, are used to practice the method of the present invention.

As best shown in FIG. 11, the raster image on the aforementioned architectural plan of FIG. 18 is acquired according to step 1. In step 1.1, the computer and scanner are turned on. Large size architectural source documents require a large scale scanner, such as, the Tru Scan Vidar 800 scanner available from Vidar Corp. Of Herndon, Va. However, the scanner is preferably the Contex FSC 8000 DSP scanner having its software scanning program which is opened in the computer, in the conventional manner. The scanning resolution is set to a resolution of 300 dpi. The user types in the instructions via the computer keyboard to instruct the scanner to start scanning. Each sheet of the architectural plan is scanned and converted to a digitized raster image. Here six sheets of the architectural plan are scanned in sequence. The digitized raster image is imported into the computer and each scanned sheet is displayed separately on the display monitor as an unedited raster image.

In step 1.2, using the software provided with the scanner, the user edits the digitized raster image of each scanned drawing page to remove any artifact and adjusts alignment, if needed. For ease of illustration, to show that a raster image is present in FIGS. 11–17, a broken line is used after step 1.1 to illustrate the raster image. This is easily seen in step 1.2 where a solid line on the drawing shown in step 1.1 is now broken, and all text on the drawing is now shown in broken line. The "DOOR SCHEDULE" table best shows this. A solid line is used after step 1.2 to show creation of recognized ASCII text and vectors in the drawing file. The raster images may be stored as a simple raster file or may be printed on the printer or plotted on the plotter. Preferably the user proceeds to step 1.3 to further process the digitized raster images.

In step 1.3 the digitized raster images are organized by the user according to a viewpoint corresponding to the drawing view and stored as viewpoint raster files. The raster image of each drawing view and its associated alphanumeric text is moved into one of five orthographic viewpoints corresponding to one of the corresponding five orthographic views shown on the drawing sheet in FIG. 18. A floating viewpoint is created for the "DOOR SCHEDULE" table. Each digitized raster viewpoint is saved as a separate file. These files are named in step 1.4 according to the project name, e.g. "HOUSE" for the orthographic viewpoints, (or "TABLE-1" according to the floating viewpoint) the view on the drawing, for the orthographic viewpoints e.g., T for top/plan, F for front, R for right side view, L for left side view, B for back view, and the raster file format, e.g. GIF.

For example, the six digitized raster viewpoint files are named: top viewpoint file, HOUSE-T.GIF for the top view; front viewpoint file, HOUSE-F.GIF for the front view; right viewpoint file, HOUSE -R.GIF for the right side view; left viewpoint file, HOUSE-L.GIF for the LEFT VIEW; back viewpoint file, HOUSE-B.GIF; and TABLE-1.GIF for the floating viewpoint containing the table. The named files are stored as digitized raster viewpoint files in the AUTOCAD environment.

In FIG. 12, the user sets up a CAD drawing file. In step 2.1 of FIG. 12, the user starts a new CAD drawing file by responding to computer prompts for a file name and a file prototype. The user names the CAD drawing file based on the project name used in step 1, in this instance the project name is "HOUSE". The user selects a prototype drawing which matches the source document scanned. Here the source document scanned was an architectural drawing that was 36 inches by 48 inches in size, so the user selects ARCH-E from the five preset prototypes for architectural drawings, e.g., ARCH-A, ARCH-B, ARCH-C, ARCH-D and ARCH-E. The user enters this information via the keyboard. The prototype drawing file selected has associated with it preset settings, including OCR settings, OSR settings, a preset symbols library, menu settings, dimension settings, precision settings, text style settings, and layer settings. The prototype drawing file also has a set of page layouts having viewports which the user may select. The user selects the page layout having viewports corresponding to the views shown in the drawing. In this case the page layout has five viewports corresponding to a top viewport, a front viewport, a right viewport, a left viewport, and a back viewport.

In step 2.2 of FIG. 12, the user customizes any of the preset parameters, if needed.

In step 2.3 of FIG. 12, the user customizes the viewports. Here the user creates a floating viewport which will be used to hold the symbol property of the door schedule.

As best shown in FIG. 13, the user imports each of the orthographic raster viewpoint files into its corresponding orthographic viewport. The user activates a chosen viewport by picking the viewport to be activated or by simply naming the desired viewport using an AUTOCAD "VIEW" command. In step 3.1 this is illustrated by picking the orthographic viewpoint titled TOP. In step 3.2 of FIG. 13, the user chooses the appropriate orthographic raster viewpoint file to import into the selected viewport. An AUTOCAD command "RASTERIN" is selected from a pull-down menu. The user types in the appropriate viewpoint raster file name. For example, here "HOUSE-T.GIF", which corresponds to the top/plan viewpoint raster file, is entered. The user is prompted for the drawing scale with the prompt "SCALE?". Here the user can view the viewpoint raster image to read the scale and type in the scale from the viewpoint raster image. Here the user types in "¼"=1'" in response to the "SCALE?" prompt. Once the scale is entered, the computer software automatically imports the digitized viewpoint raster file into the selected activated viewport. This is shown in step 3.4 of FIG. 13 for the front viewport. This is repeated for each of the remaining orthographic viewports. The floating viewpoint raster file is imported into the floating viewport in like manner. This is shown as completed in step 4.1 of FIG. 14.

As best shown in FIG. 14, the alphanumeric text is recognized in each viewport in the CAD drawing file. At the end of step 3.4 of FIG. 13, each of the digitized raster viewpoint files has been transported into its corresponding viewport, this is shown graphically in step 4.1 of FIG. 14. The alphanumeric text corresponding to the physical dimensions and edges of the 3D object, the symbol property, and any insertion point (of the moiety the symbol represents) into the drawing of the 3D object in each orthographic viewport is recognized separately. The alphanumeric text in any floating viewport, if present, is recognized first, as shown in steps 4.2–4.3. This is done so that the alphanumeric text relating to a symbol property and needed for creating attributed symbols is available for symbol conversion in step 5. Thus any alphanumeric text in a table, chart, legend, or schedule is recognized first. The digitized raster alphanumeric characters (corresponding to the alphanumeric text on the architectural plan) are converted into ASCII text with the OCR operating in the CAD environment. This is shown schematically in step 4.3 of FIG. 14 where the broken line alphanumeric text in the "DOOR SCHEDULE" is shown changed to solid alphanumeric text line text. In step 4.4 of FIG. 14, the raster alphanumeric text in each of the other viewports is recognized next. Step 4.4 of FIG. 14 illustrates the conversion of the raster text into ASCII text for the top viewport; the alphanumeric text "40', 26', 30', 12', 10', 14'" corresponding to the physical dimensions of the walls of the house, the alphanumeric text "12'" and "10'" corresponding to insertion points of the door and window into the walls of the house, and the alphanumeric text 90° corresponding to the orientation of the pair of the walls, is recognized by the OCR and changed to ASCII text (e.g. recognized alphanumeric text). This is done for each of the orthographic viewports and is shown completed in step 6.1 of FIG. 16.

As best shown, in FIG. 15, the symbols on the digitized raster image are recognized and converted to vector symbols in each of the orthographic viewports where the digitized raster symbols are present. In step 5.1 of FIG. 15, the user calls up the symbol library. The symbol library exists as a preset parameter of the ARCH-E drawing file. The symbol library has a number of standardized architectural plan symbols therein. The screen in step 5.1 shows a partial listing of the default symbol library associated with the prototype drawing ARCH-E, showing the symbol, the symbol properties, e.g. specifications of the symbol, and a drawing of the moiety/object of a typical attributed symbol. Generally this symbol library is not shown on the screen except to see whether any modification are needed. Modifications to or additions to the symbol library are done in step 5.2. In step 5.1, the symbol (D2) is picked. This is a content symbol for a door having physical dimensions of 3 feet 2 inches wide by 6 feet 8 inches high. This is represented by the text "3'2"×6'8"". To the right is a drawing of the moiety/object, the door.

In step 5.2 of FIG. 15, the user may add symbols to the symbol library or modify symbols in the symbol library by using basic CAD drawing tools and commands, as previously described. For example if the user wants to add the door symbol ⊤ to the symbol library, this is easily done.

Specific symbol properties e.g. dimensional data can be associated with the symbol by the user selecting an "ATTRIBUTE SYMBOLS" command. The symbol library is displayed. The user is prompted "VIEWPORT?" The user responds by naming the floating viewport which contains the appropriate information. For example, if the user wants to create an attributed symbol for the door symbol (D5). The user selects the viewport containing the symbol property, e.g. here the door schedule. This appears as a window or floating viewport which can be moved to a convenient location on the screen in a manner known to anyone familiar with WINDOWS™ operating software. As illustrated, the program then prompts "SYMBOL?" The user picks the symbol. Here the content symbol (D5) is picked. Then the user is prompted "OBJECT?". The user picks the drawing of the object/moiety the symbol represents; here the moiety is the door. The program then prompts for the dimensions of the moiety, such as "WIDTH?", "LENGTH?". The user may key-in the dimensions, but preferably picks them from the recognized alphanumeric text (ASCII text) in the floating viewport. Here the picked width is 2'0", i.e., 2 feet, and the picked length is 5'0", i.e., five feet. These alphanumeric texts become attributes of the symbol (D5) by using typical block attributions techniques well known in CAD. The alphanumeric text corresponding to the 3D symbol property for content symbol (D5) is stored in a symbol vector file for symbol (D5). The vector file corresponds to the dimensions and edges of the moiety the symbol (D5) represents. The symbol (D5) then exists in the symbol library as a preset attributed symbol.

However, it is the symbol (D2) which appears in the architectural plan. The content symbol (D2) in the plan view refers to a moiety, a door which is 3 feet 2 inches wide and 6 feet 8 inches high. The user picks the floating viewport containing the symbol property the "DOOR SCHEDULE".

In step 5.3 as illustrated in FIG. 15, the attributed symbol is created for the content symbol (D2). In response to the "SYMBOL?" prompt, the user picks (D2). In response to the "OBJECT?" prompt, the use picks the drawing of the door. In response to the "WIDTH?" and "HEIGHT?", the user picks the width and height values from the ASCII text which was converted in the floating viewpoint and associated with this symbol in the Door Schedule table. Here the width picked is 3'2" and the height picked is 6'8". The recognized alphanumeric texts (ASCII texts) become attributes of the symbol (D2) using the CAD block attribution techniques and are stored as a set of symbol vectors in a symbol vector file for symbol (D2). The symbol vector file contains corresponding vectors to the dimensions and edges of the moiety the symbol (D2) represents.

In step 5.4 of FIG. 15, the user activates the viewpoint to be selected for symbol recognition by picking on the viewpoint. The top viewport is activated in step 5.4 since that is the viewport in which the aforementioned attributed symbol (D2) occurs.

In step 5.5, the attributed symbols are recognized with the OSR and the raster text symbols associated with the symbol is converted into vector symbols and any text associated with the symbol is converted by an OCR into recognized ASCII text. The appropriate vector shape file from the symbol library is automatically inserted so as to overlay its raster counterpart. These steps are repeated for each of the symbols. For example, for the content symbol (W3) for a window, a similar window schedule (not shown) is attributed to the symbol (W3) and the appropriate width and height is picked from the recognized alphanumeric text (ASCII text). A pre-existing vector file for an appropriately sized window is linked to the symbol (W3) using the CAD block attribution technique.

As the symbols are recognized, they are automatically placed on a layer indexed to the viewport such as SYMBOL-T (top viewport) or SYMBOL-F (front viewport). These layers are frozen in all but the appropriate viewport.

As best shown in FIG. 16, the alphanumeric text corresponding to the physical dimension and edges of the 3D object is converted into vectors. In step 6.1 of FIG. 16, the screen shows the viewports having each viewport raster file image with converted ASCII text (recognized alphanumeric text) and the converted symbols overlaying their raster counterparts. None of the other graphic elements corresponding to the drawing views have been converted into vectors. The user begins the recognized alphanumeric text to vector conversion process by choosing the viewport with the most symbols and alphanumeric text, e.g., the most information, in it. In this example, the user chooses the top viewport because the top view has the most information in it. The vectors, WCS coordinates and vector generated lines and arcs corresponding to the 3D object's edges which are formed in this viewport serve as the basis for subsequent vector production and line/arc generation in other viewports.

In step 6.2, the user picks the origin, i.e., the point at which the vector furthest to the left intersects the vector nearest to the bottom, on the raster. This is represented by the intersection of raster lines corresponding to the edges of the 3D object. This sets the coordinate grid in the UCS and in the WCS.

The starting point is selected next. The computer prompts the user, who selects the chooses object to be drawn (e.g. wall, roof, etc.) for a starting point for a first vector to be drawn. The program prompts "STARTING POINT?". The default response is the origin point. If the user clicks the left mouse button, the starting point defaults to origin. If the user clicks the right mouse button, then the program starts a series of prompts (DISTANCE? DIRECTION?). For architectural plans, the computer prompts the user to enter the distance of the start point from origin with the prompt "DISTANCE" which appears overlaid on the viewpoint image in the orthographic viewport selected. The user picks the correct recognized alphanumeric text off the viewpoint image by picking on "DISTANCE" and then on the correct recognized alphanumeric text. The computer prompts the user for "DIRECTION" from the origin, the user picks on the term "DIRECTION" and on the correct direction on the directional icon. The correct directions correspond to an arrow orientation corresponding to the orientation from the origin.

The "DISTANCE" and "DIRECTION" picked by user are entered into the COGO subroutine. In this example, the starting point and the origin are identical so the user merely clicks on the left mouse button. Here both the origin and the starting point have coordinates corresponding to (0, 0) in the UCS and to (0, 0, 0) in the WCS.

Since a house has a wall thickness, there is an outer perimeter wall and an inner perimeter wall. In a typical conversion, the user begins with the outer perimeter wall by executing the "WALL" command either from a pull down menu or by picking the wall icon in a toolbar menu. The program prompts "WIDTH?". The user responds by either picking or keying in the width dimension, e.g. wall thickness, for example 6 inches. If this prompt is answered, the program automatically constructs a line parallel to and inside of the outer perimeter wall, this is the inner perimeter wall. All subsequent prompts refer to the outer perimeter wall.

In step 6.3 of FIG. 16, the user creates the first vector by responding to prompts "Distance" and "Direction" for the architectural plan. Eventually in step 7, the other elements such as doors and windows are constructed using the vectors formed in this step as a basis for location.

Where the first vector drawn is a straight line, the first vector begins at the starting point coordinate established in step 6.2. This is the beginning point of the vector. The computer prompts the user with the prompt "DISTANCE" to enter the distance of the line (representing an edge of the 3D object in the selected view) from the beginning point of the vector. The "DISTANCE" prompt appears overlaid on the viewpoint selected. The user picks "DISTANCE" and picks the correct recognized alphanumeric text on the viewpoint image. The computer prompts the user for "DIRECTION?" from the origin, the user picks the appropriate direction from the directional icon. The alphanumeric text selected by the user for "DISTANCE" and the arrow orientation selected in response to the "DIRECTION" prompt are entered into the COGO subroutine. The first vector of a vector file is automatically formed. Here the user picked the converted alphanumeric text "40'" for the distance and the 90 degree right arrow for the direction. At the same time, the inner perimeter wall is created.

After the first vector for the first wall is formed, the user is prompted for "NEXT WALL". The user responds to the default "Yes" or to "No". If the answer is "No", the program reverts to the start of the first line where the user is able to answer the opening sequence of prompts and correct any errant information. If the answer is yes, the user can default by either hitting the enter key or, preferably, by clicking the left mouse button. The "yes" response confirms acceptance of the vectors just generated. The program automatically deletes the recognized ASCII text. A new label identifying the length as an attribute of the vector itself is automatically generated and arrayed in a format typical to the art. After the first wall is formed and labeled, the program assumes that the endpoint of the first outer perimeter vector is the starting point of the next vector. The program defaults to the values for distance and direction previously picked. This is the beginning point for the vector for the next wall. Here the user responds "yes" by clicking on the right mouse button. The ASCII text of "40'", e.g. forty feet is replaced with a text label "40'".

As is best shown in step 6.4 of FIG. 16, the user is prompted for the distance and direction of the next adjacent vector corresponding to the next adjacent line in the outer perimeter. Upon picking the appropriate recognized alphanumeric text, here 26' (26 feet), and picking the direction (here, arrow up, 0 degrees), the second vector is created and a second wall is formed. At the same time the inner perimeter wall is drawn. The second vector as generated is placed into a vector file. Once again the user is prompted, "NEXT WALL". If answered in the affirmative, the program executes the labeling process and automatically trims the intersecting vectors of the inner perimeter of the wall using a set of commands known in the CAD art. Here the recognized ASCII text of "26'" was replaced with the text label "26'".

The user continues in like manner, stepping around the perimeter of the structure, creating next adjacent vectors until a closed outer perimeter is formed. For this example, one picks the recognized alphanumeric text, "30'", "10'", "12'" and "14" for each of the next four walls. If all the walls have been constructed properly, then the endpoint of the last vector generated should coincide with the starting point of the first vector generated. This is verified by using closure method, which is known in the art. Thus the method of this invention advantageously provides a means of mathematically checking the accuracy of the conversion process by verifying the closure of the perimeter. Once the perimeter wall has been converted and confirmed. The vectors created serve for creation of the remaining vectors of the structure. As each vector is created it is added to the vector file for the 3D object.

After generating all of the vectors corresponding to the perimeter, the elevation drawing are already started. This is possible because the vector corresponding to the plan view are 3D vectors. A vector created in one orthographic viewport produces a vector generated line (or arc if the vector is a vector arc) or point in the other orthographic viewports. The program prompts "VIEW?" to which the user responds by toggling through the viewports "Front", "Right", "Back", "Left" with the right mouse button. A click of the left button signifies selection of an orthographic viewport. The selected orthographic viewport shows a view of the building which appears as a vector drawing based on the distances and directions picked when constructing the top view. This is illustrated in step 6.5 showing the plan viewport and the front viewport after the first vector is created. As shown in step 6.5 of FIG. 16, the recognized alphanumeric text is converted in the front viewport into vectors. The identical endpoint coordinates of respective vector end points and beginning points in the top viewport (plan view) and the front viewport are shown joined by the arrows graphically indicating "Identical points".

The raster image in other orthographic viewports is adjusted, if needed, to overlay the vectors lines generated by the creation of the vector in the top viewport into the front viewport. The program prompts "BASE POINT?". The purpose of this prompt is to establish a reference point from which the raster image in the front viewport is to be moved. The user responds by picking the lower left-hand corner of the raster graphics in the front viewport. The program prompts "INSERTION POINT?" and the user responds by picking the endpoint of the appropriate vector. The user then proceeds to the end of the vector generated from the previous orthographic viewport and uses it as a starting point for a next vector. Proceeding to create the vectors as in steps 6.4 and 6.5.

In step 6.6, the remaining vectors or vector sets corresponding to the perimeter of the 3D object shown in the drawing view in initial viewport are created in sequence, corresponding to adjacent edges on the perimeter of the 3D object in shown in the drawing view. The beginning point for each subsequent vector defaults to the endpoint of the previous vector generated. The computer prompts the user to enter the distance of the edge from the beginning point of the next vector (next edge) with the prompt "DISTANCE" which appears overlaid on the orthographic viewpoint selected. The user selects the correct alphanumeric text off the viewpoint image by picking on "DISTANCE" and then on the correct recognized alphanumeric text. The computer prompts the user for "DIRECTION" from the origin, the user pick on the term "DIRECTION". At that time the directional icon appears and the user picks the arrow oriented in the correct direction.

The "DISTANCE" and "DIRECTION" picked by the user are automatically entered into the COGO subroutine which creates the next vector.

In step 6.6, a vector is created for the side wall of the 3D object having a 12' height dimension. The starting point on the front viewport is picked by moving the cursor to the endpoint or a beginning point of a previously generated vector. Here the start point corresponds to the starting point of the first vector generated in the PLAN/TOP viewport. The recognized alphanumeric text (ASCII text) "12'" is picked and the up arrow is picked in response to the "DISTANCE" and "DIRECTION" prompts. The picked direction and distance are automatically entered into the COGO subroutine and a vector in the WCS is created. A vector generated line is over laid the drawing line. The ASCII text of "12'" is replaced with the text label "12'". At the end of step 6, the edges of the 3D object have been converted to 3D vectors with WCS coordinates. This is shown graphically, as vector generated lines on the monitor screen on step 7.1 of FIG. 17. The next step 7 is the conversion of symbols and the placement of the moieties which the symbols represent into the vector file for the 3D object, e.g. the placement of features such as doors and windows on the exterior and interior walls.

In step 7.1 of FIG. 10, the user picks the viewport from the CAD drawing file which contains the most attributed symbols. In this particular example, the top viewport is picked. The viewport is enlarged to fill the screen. In step 7.2, the user picks a particular attributed symbol to be converted. Here the symbol picked is (D2) which represents a door having the dimensions of 3 feet 2 inches by 6 feet 8 inches (3'2"×6'8") according to the dimension table. The vector block, e.g. vector symbol file, for the attributed symbol for door (D2) is brought into the program. The computer program displays existing attributes of the symbol selected, e.g. the "3'2"×6'8" DOOR". The computer program prompts for additional information if needed.

In step 7.3 the moiety/object which the symbol represents is located on the drawing. The user is prompted for data and recognized alphanumeric text relating to the insertion point for the location of the moiety, the door. The first prompt is "REFERENCE LINE". On the viewport, the user picks the line or corner from or to which the insertion distance is referenced. The program prompts "DISTANCE?", (e.g. the distance to center of door is the default assumption), and then prompts DIRECTION?. The user either defaults to the center of the door by picking the recognized alphanumeric text representing the insertion distance, or the user toggles through "center", "near side" and "far side" and picks the appropriate choice, and pick the insertion distance recognized alphanumeric text. Here the alphanumeric text "12'" is picked and the DIRECTION left arrow is picked. The location of the vectors corresponding to the symbol, e.g. the symbol vector file, is placed in the 3-D object's vector file using a typical AUTOCAD insertion routine.

In step 7.4 the door opening is automatically drawn and the door, the symbol's moiety, is placed in the walls of the house. The program prompts for door swing, if that data wasn't included in the attributes of the attributed symbol. The user responds by picking near the hinge side of the door and then roughly picking the desired swing direction. The program automatically constructs the door in a manner known to the art.

The program then prompts "NEXT FEATURE". A default "yes" answer signifies acceptance of the last attributed symbol placement and insertion distance. The old recognized alphanumeric text for the intersection distance is deleted and new dimensional text is automatically placed in the viewport. Here the recognized alphanumeric text "12'" is deleted and replaced with the dimensional text "12'". The user verifies the alignment and registration of the vectors representing the moiety of the attributed symbol against the raster backdrop as a method of quality control.

In the case of attributed symbols for windows (not shown), the program prompts for insertion distances, e.g., a height, a width, and a distance from the floor to either the bottom or the top of the window opening. The program prompts for whatever data was not included in the attributed window symbol. Location of the window within the 3D object is established in the same manner previously described for doors.

Simple symbols such as symbols for electrical outlets, plumbing fixtures, switches or light fixtures are placed as vectorized symbols on the selected viewport to overlay their raster counterparts and are automatically adjusted to fit the vector wall. At the end of step 7, a vector file exists having the vectors of the moiety associated with the attributed symbol inserted into in the vector file of the 3D object at the insertion point of the symbol. This vector file can be used to create a 3D computer model and is further used to create a scaled 3D model of the house using conventional CAM techniques. Also a new mathematically accurate AUTOCAD drawing file is created which can be displayed, stored, modified, printed, or plotted to create a new hard copy document of the converted architectural plan. This is similar to that shown in FIGS. 1A and 1B for the engineering drawing.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. A computer method of converting alphanumeric text relating to a plurality of physical dimensions and to a plurality of edges of a three dimensional object, from a hard copy source document having recorded thereon the alphanumeric text and a plurality of drawing views of the three dimensional object, into mathematically accurate vectors corresponding to the physical dimensions and the edges of the three dimensional object, the method comprising the steps of:

(a) acquiring a computer useable raster image of a hard copy source document having
 (i) a plurality of drawing views thereon of a three dimensional object having a plurality of physical dimensions and a plurality of edges, said drawing views having a plurality of lines corresponding to said edges of said three dimensional object, said lines oriented in a direction relative to each other; and
 (ii) alphanumeric text relating to said plurality of physical dimensions and to said plurality of edges of said three dimensional object and recorded on said drawing view in association with said lines on said drawing views; and
  organizing said raster image according to an orthographic viewpoint raster file for each said drawing view by selecting one said drawing view and said alphanumeric text associated with said lines on said drawing view;

(b) setting up a drawing file in a CAD applications program in a computer; said CAD applications program having a plurality of orthographic viewports, a coordinate geometry subroutine for creating three dimensional vectors, and an optical character recognition subroutine; and selecting one of said orthographic viewports to correspond in orthogonality to one of said orthographic viewpoint raster files;

(c) importing one said orthographic viewpoint raster file into one said orthographic viewport which corresponds in orthogonality to one said drawing view;

(d) repeating step (c) for each drawing view on said document;

(e) recognizing said alphanumeric text in said optical character recognition subroutine in each said orthographic viewport separately, and creating a recognized alphanumeric text;

(f) converting said recognized alphanumeric text in said coordinate geometry subroutine into said mathematically accurate three dimensional vectors corresponding to said alphanumeric text recorded on said document.

2. The computer method of claim 1, wherein said document for use in step (a) is a mechanical drawing.

3. The computer method of claim 1, wherein said document for use in step (a) is an engineering drawing.

4. The computer method of claim 1, wherein said document for use in step (a) is an architectural plan having a plurality of drawing sheets.

5. The computer method of claim 1, wherein step (a) includes acquiring said raster image of said drawing view of said document and said alphanumeric text by scanning said document in an automated digitizing unit and receiving said raster image from said unit into said CAD applications program in said computer, wherein step (b) of organizing each said viewport includes setting up said drawing file in each said viewport corresponding to each said drawing view on said document;

wherein step (f) includes
 (i) selecting an origin and a start point on a viewpoint raster image of one said drawing view in one of said viewports for the generation of a first vector, corresponding to one said edge;
 (ii) selecting said recognized alphanumeric text corresponding to said one edge and transporting said recognized text into said coordinate geometry subroutine;
 (iii) creating said first vector corresponding to said one edge, said first vector having an endpoint coordinate;
 (iv) selecting an adjacent edge on said raster image of said drawing view in said viewport, selecting said recognized alphanumeric text corresponding to said selected adjacent edge, transporting said recognized text into said coordinate geometry subroutine and creating a next vector corresponding to said adjacent edge, using an endpoint of a last vector generated as a beginning point of a next vector;
 (v) repeating step (iv) until all adjacent edges have been selected and corresponding vectors created;
 (vi) creating next said vectors for each said orthographic viewpoint corresponding to said edges on each said drawing view on said document, until all said adjacent edges have been selected; and
 (vii) generating an orthographic vector file of said mathematically accurate vectors corresponding to said alphanumeric text relating to the physical dimensions and said edges of said three dimensional object.

6. The method of claim 5 wherein step (f)(vi) includes repeating steps (f)(i) through (f)(v) for each said orthographic viewport corresponding to each said drawing views on said document.

7. A computer method of converting alphanumeric text relating to a plurality of physical dimensions and a plurality of edges of a three dimensional object, relating to a plurality of physical dimensions and a plurality of edges of a moiety represented by a symbol and its symbol property and used in association with the three dimensional object, and relating to an insertion point of the moiety which the symbol represents within the three dimensional object, from a hard copy source document having recorded thereon a plurality of drawing views of the three dimensional object, the alphanumeric text, and the symbol, into mathematically accurate vectors corresponding to the physical dimensions and the edges of the three dimensional object and the moiety the symbol represents; the method comprising the steps of:

(a) acquiring a computer useable raster image of a hard copy source document having
  (i) a plurality of drawing views thereon of a three dimensional object having a plurality of physical dimensions and a plurality of edges, said drawing view having a plurality of lines corresponding to said edges of said three dimensional object, said lines oriented in a direction to each other;
  (ii) at least one symbol disposed on at least one said drawing view, said symbol having a symbol property, said symbol associated with a moiety in the three dimensional object; said moiety having a plurality of physical dimensions and a plurality of edges expressed as said symbol property, said symbol having an insertion point on said drawing view corresponding to a moiety insertion point of the moiety in the three dimensional object; and
  (iii) a first alphanumeric text relating to said plurality of physical dimensions and to said plurality of edges of said three dimensional object and recorded on said drawing view in association with said lines on said drawing views; a second alphanumeric text relating to said symbol property for each said symbol; and a third alphanumeric text relating to said insertion point; and
  organizing said raster image according to an orthographic viewpoint raster file for each said drawing view by selecting one said drawing view and said first alphanumeric text associated with said lines on said drawing view, said symbol and said third alphanumeric text; and organizing a symbol property viewpoint raster file for said second alphanumeric text;

(b) setting up a drawing file in a CAD applications program in a computer, said drawing file having a symbol library; said CAD applications program having a coordinate geometry subroutine for creating three dimensional vectors, an optical symbol recognition subroutine, an optical character recognition subroutine and a plurality of viewports; and selecting said viewports into at least one orthographic viewport and customizing at least one floating viewport;

(c) importing said symbol property viewpoint raster file into one said floating viewport;

(d) repeating step (c) for each said second alphanumeric text for each said symbol on said document;

(e) importing one said orthographic viewpoint raster file of one said drawing views into one said orthographic viewport which corresponds in orthogonality to both said drawing view and said orthographic viewpoint raster file;

(f) repeating step (e) for each drawing view on said document;

(g) recognizing in said optical character recognition subroutine said second alphanumeric text in each said floating viewport then recognizing said first and third alphanumeric texts in each said orthographic viewport; and creating a first, a second and a third recognized alphanumeric text;

(h) creating an attributed symbol by converting said second recognized alphanumeric text relating to said symbol property of said symbol into a block of mathematically accurate three dimensional symbol vectors representing said physical dimensions and said edges of the moiety said symbol represents and creating a vector symbol file of said symbol vectors;

(i) recognizing each said symbol in said optical symbol recognition subroutine in each said orthographic viewport separately;

(j) converting in each said orthographic viewpoint said first recognized alphanumeric text in said coordinate geometry subroutine into a plurality of mathematically accurate vectors corresponding to said first alphanumeric text recorded on said drawing and to the physical dimensions and edges of the three dimensional object; and placing said vectors into an orthographic vector file;

(k) selecting said attributed symbol in said orthographic viewport and converting said third recognized alphanumeric text inserting said symbol vector file into said orthographic vector file at said insertion point; and creating a vector file and a drawing file corresponding to the physical dimensions and to the edges of the three dimensional object with the moiety inserted therein.

8. The computer method of claim 7, further comprising the step of:

(l) displaying a drawing view in one said viewport generated by said orthographic vector file of step (j).

9. The computer method of claim 8, further comprising the step of:

(m) displaying a drawing view in one said orthographic viewport of said drawing file of step (k).

10. The method of claim 7, wherein said drawing file of said CAD applications program of step (b) includes a symbol property library and wherein step (h) includes calling up said symbol property library and adding said attributed symbol to said symbol library.

11. The computer method of claim 7, wherein said document for use in step (a) is a mechanical drawing.

12. The computer method of claim 7, wherein said document for use in step (a) is an architectural plan having a plurality of drawing sheets.

13. The computer method of claim 7, wherein said document for use in step (a) is an engineering drawing.

14. The computer method of claim 7,
wherein step (a) includes acquiring said raster image of said drawing view of said document and said alphanumeric text by scanning said document in an automated digitizing unit and receiving said raster image from said unit into said CAD applications program in said computer,
wherein step (b) includes
  (i) setting up a drawing file in each said orthographic viewport corresponding to each said drawing view on said document, and
  (ii) setting up a drawing file in said floating viewport corresponding to said second alphanumeric text;
wherein step (j) includes
  (i) selecting an origin and a start point on said raster viewpoint image of said drawing view in one of said orthographic viewports for the generation of a first vector, corresponding to one said edge;
  (ii) selecting said first recognized alphanumeric text and transporting said first recognized alphanumeric text into said coordinate geometry subroutine;
  (iii) creating said first vector corresponding to said edge, said first vector having an endpoint coordinate;

(iv) selecting an adjacent edge on said raster viewpoint image of said view on said orthographic viewport, selecting said recognized alphanumeric text corresponding to said selected adjacent edge, transporting said recognized text into said CAD applications program, and creating a next vector corresponding to said adjacent edge, using an endpoint of a last vector generated as a beginning point of a next vector;

(v) repeating step (iv) until all adjacent edges have been selected and corresponding vectors created;

(vi) creating said next vectors for each said orthographic viewpoint corresponding to each said drawing view on said document until all said adjacent edges have been selected; and (vii) generating said orthographic vector file of said mathematically accurate vectors corresponding to said alphanumeric text recorded on said drawing relating to said physical dimensions and said edges of said three dimensional object;

wherein in step (h) includes
- (i) selecting one of said orthographic viewports containing said viewpoint raster image of said view containing the most of said symbols;
- (ii) selecting one said symbol; selecting said second recognized alphanumeric text for said symbol and converting said second recognized alphanumeric text into said block of said symbol vector representing said three dimensional properties of said symbol;
- (iii) transporting said block of symbol vectors into said vector symbol file corresponding to said one symbol; and
- (iv) repeating step (h)(i) through step (h)(iii) for each said symbol.

15. The method of claim 14, wherein step (j)(vi) includes repeating steps (j)(i) through step (j)(v) for each said orthographic viewport corresponding to each said drawing view on said document.

16. The method of claim 7, further comprising the step of (n) using said CAD applications program to generating a plurality of orthographic drawings of said drawing file of step (k).

17. An automated conversion system for converting alphanumeric text, relating to a plurality of physical dimensions and a plurality of edges of a three dimensional object and of properties of a symbol used in association with said three dimensional object and of an insertion point of the symbol within the three dimensional object, recorded on a hard copy source document having at least one drawing view of said three dimensional object, said alphanumeric text and at least one said symbol thereon, into mathematically accurate three dimensional vectors corresponding to said physical dimensions and said edges of said three dimensional object and said properties of said symbol and said insertion point, said system comprising in combination an automatic digitizing unit for document scanning and a computer having a three dimensional CAD applications program, said computer including receiving software and recognition software, said program, including conversion software, transport software and vectorization software;

said automatic digitizing unit (i) scanning a hard copy document having at least one drawing view thereon, having at least one symbol thereon and having alphanumeric text relating to a plurality of physical dimensions and a plurality of edges of a three dimensional object and of properties of a symbol used in association with said three dimensional object, and of an insertion point of the symbol within the object (ii) creating a digitized raster file corresponding to said alphanumeric text, said drawing view and said symbol, and (iii) outputting said digitized raster image;

said receiving software operatively associated with said automated digitizing unit, for receiving said digitized raster image into said CAD applications unit and creating a digitized raster viewpoint file, transporting said viewpoint file into a CAD drawing file, having a viewport;

said recognition software for recognizing said digitized raster viewpoint file text in said viewport, and creating an ASCII text file and comprising an optical character recognition subroutine operating in said CAD applications program for recognizing said alphanumeric text, and comprising an optical symbol recognition subroutine operating in said CAD application program for recognizing said symbol;

said conversion software, operatively associated with said recognition software, for converting said ASCII text file into a converted file useable in said coordinate geometry subroutine;

said transport software, responsive to said converted file, for transporting said converted file into said coordinate geometry subroutine; and said vectorization software, operatively associated with said transport means, for converting said converted file into mathematically accurate three dimensional vectors having X, Y, Z coordinates and representing said plurality of physical dimensions and said plurality of edges of said three dimensional object and of said properties of said symbol used in association with said three dimensional object, and comprising a coordinate geometry subroutine.

18. The system of claim 17, wherein said document is a mechanical drawing.

19. The system of claim 17, wherein said document is an engineering drawing.

20. The system of claim 17, wherein said document is an architectural plan having a plurality of drawing sheets.

21. The system of claim 17, wherein said vectorization software further including software for arranging sequentially vectors according to a sequence of adjacent edges of said three dimensional object wherein said arranged vectors form a graphical representation in plurality of orthographic views of said three dimensional object.

22. The system of claim 17, wherein said vectorization software further includes software for arranging said vectors for a graphical representation of said property associated with said symbol and wherein said property of said symbol is introduced into said graphical representation of said object.

23. A computer quality control method for a mechanical drawing, the method comprising the steps of:
(a) scanning a mechanical drawing hard copy source document using an automated digitizing unit, said document having at least one drawing thereon of a three dimensional object and alphanumeric text relating to a physical dimension and an edge of said three dimensional object having a plurality of physical dimensions and a plurality of edges, to yield a digitized output;
(b) receiving said digitized output, said output including said digitized alphanumeric text and a digitized drawing from an automated digitizing unit into a CAD applications program, said CAD applications program having a coordinate geometry subroutine;

(c) displaying said digitized drawing; recognizing said alphanumeric text using a conversion software operating in said CAD applications program, said conversion software having a graphics optical character recognition subroutine, and recognizing said alphanumeric text using said textual optical character recognition subroutine;

(e) transporting said alphanumeric text into said coordinated geometry subroutine;

(f) converting said alphanumeric text in said coordinate geometry subroutine into mathematically accurate vectors representing said physical dimensions and said edges of said three dimensional object;

(g) generating a set of orthographic views of said three dimensional object using said mathematically accurate vectors and overlaying each said orthographic view on a corresponding view of said digitized drawing.

24. The method of claim 23, wherein said mechanical drawing scanned in step (a) is an engineering drawing.

25. The method of claim 23, wherein said mechanical drawing scanned in step (a) is an architectural plan having a plurality of drawing sheets.

26. A computer method of converting a mechanical drawing having alphanumeric text relating to a plurality of physical dimensions and a plurality of edges of a three dimensional object, relating to a plurality of physical dimensions and a plurality of edges of a moiety represented by a symbol and its symbol property and used in association with the three dimensional object, and relating to an insertion point of the moiety the symbol represents within the three dimensional object, from a hard copy source document having recorded thereon a plurality of drawing views of the three dimensional object, the alphanumeric text, and the symbol, into mathematically accurate vectors corresponding to the physical dimensions and the edges of the three dimensional object and the moiety the symbol represents; the method comprising the steps of:

(a) acquiring a computer useable raster image of the mechanical drawing having
  (i) a plurality of drawing views thereon of a three dimensional object having a plurality of physical dimensions and a plurality of edges, said drawing view having a plurality of lines corresponding to said edges of said three dimensional object, said lines oriented in a direction relative to each other;
  (ii) at least one symbol disposed on at least one said drawing view, said symbol having a symbol property, said symbol associated with a moiety in the three dimensional object; said moiety having a plurality of physical dimensions and a plurality of edges expressed as said symbol property, said symbol having an insertion point on said drawing view corresponding to a moiety insertion point of the moiety in the three dimensional object; and
  (iii) a first alphanumeric text relating to said plurality of physical dimensions and to said plurality of edges of said three dimensional object and recorded on said drawing view in association with said lines on said drawing views; a second alphanumeric text relating to each said symbol property; and a third alphanumeric text relating to said insertion point; and organizing said raster image according to an orthographic viewpoint raster file for each said drawing view by selecting one said drawing view and said first alphanumeric text associated with said lines on said drawing view, said symbol and said third alphanumeric text; and organizing a symbol property viewpoint raster file for said second alphanumeric text;

(b) setting up a drawing file in a CAD applications program in a computer; said CAD applications program having a coordinate geometry subroutine for creating three dimensional vectors, an optical symbol recognition subroutine, an optical character recognition subroutine and a plurality of viewports; said drawing file having a preset symbol library, said symbol library having an attributed symbol therein corresponding to said symbol on said drawing view, said attributed symbol having a block of mathematically accurate three dimensional symbol vectors representing said physical dimensions and said edges of the moiety said symbol represents in a vector symbol file; and selecting said viewports into at least one orthographic viewport and customizing at least one floating viewport;

(c) importing said symbol property viewpoint raster file into one said floating viewport;

(d) repeating step (c) for each said second alphanumeric text relating to each said symbol on said document;

(e) importing one said orthographic viewpoint raster file of one said drawing views into one said orthographic viewport which corresponds in orthogonality to both said drawing view and said orthographic viewpoint raster file;

(f) repeating step (e) for each drawing view on said document;

(g) recognizing in said optical character recognition subroutine said second alphanumeric text in each said floating viewport, then recognizing said first and third alphanumeric text for each said orthographic viewport; and creating a first, a second and a third recognized alphanumeric text;

(h) calling up said symbol library and selecting said attributed symbol corresponding to said symbol and selecting said second recognized alphanumeric text for said symbol and incorporating said symbol property into said vector symbol file;

(i) recognizing each said symbol in said optical symbol recognition subroutine in each said orthographic viewport separately;

(j) converting in each said orthographic viewport said recognized first alphanumeric text in said coordinate geometry subroutine into a plurality of mathematically accurate vectors corresponding to said alphanumeric text recorded on said drawing and to the physical dimensions and edges of the three dimensional object; and placing said vectors into an orthographic vector file; and (k) selecting said attributed symbol in said orthographic viewport and converting said third recognized alphanumeric text; inserting said symbol vector file into said orthographic vector file at said insertion point; and creating a vector file and a drawing file corresponding to the physical dimensions and to the edges of the three dimensional object with the moiety inserted therein.

* * * * *